US012253665B2

United States Patent
Friedman et al.

(10) Patent No.: US 12,253,665 B2
(45) Date of Patent: Mar. 18, 2025

(54) MOUNTING SYSTEMS SUITABLE FOR MOUNTING VISION SYSTEMS

(71) Applicant: Swift Universal Optical Systems LLC, Spring Lake, NC (US)

(72) Inventors: Keaton Swift Friedman, Spring Lake, NC (US); Lawson Charles Hawkins, Broadway, NC (US); Luke Austin Moore, Spring Lake, NC (US); Andrew Mark Wermel, Dunn, NC (US)

(73) Assignee: Swift Universal Optical Systems LLC, Spring Lake, NC (US)

( * ) Notice: Subject to any disclaimer, the term of this patent is extended or adjusted under 35 U.S.C. 154(b) by 0 days.

(21) Appl. No.: 18/691,133

(22) PCT Filed: Sep. 23, 2022

(86) PCT No.: PCT/US2022/076935
§ 371 (c)(1),
(2) Date: Mar. 12, 2024

(87) PCT Pub. No.: WO2023/049844
PCT Pub. Date: Mar. 30, 2023

(65) Prior Publication Data
US 2024/0402480 A1    Dec. 5, 2024

Related U.S. Application Data

(60) Provisional application No. 63/248,089, filed on Sep. 24, 2021.

(51) Int. Cl.
G02B 23/18    (2006.01)
F16M 11/10    (2006.01)
(Continued)

(52) U.S. Cl.
CPC ............. *G02B 23/18* (2013.01); *F16M 11/10* (2013.01); *F16M 13/04* (2013.01); *F16M 2200/024* (2013.01); *F41G 11/003* (2013.01)

(58) Field of Classification Search
CPC ...... G02B 23/125; G02B 23/18; A42B 3/042; F16M 11/10; F16M 13/04; F16M 2200/024
See application file for complete search history.

(56) References Cited

U.S. PATENT DOCUMENTS

| 4,689,834 A | 9/1987 | McCarthy et al. |
| 5,542,627 A | 8/1996 | Crenshaw et al. |

(Continued)

OTHER PUBLICATIONS

International Search Report and the Written Opinion of the International Searching Authority corresponding to International Patent Application No. PCT/US2022/076935 (18 pages) (mailed Jul. 19, 2023).

*Primary Examiner* — Bradley Duckworth
(74) *Attorney, Agent, or Firm* — Myers Bigel, P.A.

(57) ABSTRACT

Mounting systems configured to mount vision systems such as goggles to target devices such as helmets include a gantry and carriage assembly having a hinge assembly with a pill and a tilt adjustment assembly that cooperates with the pill to move the carriage between various tilt positions and between a deploy and a stow position that is agnostic of deployed tilt setting. The tilt adjustment assembly includes a tilt member that moves in a front to back direction. The gantry and carriage assembly also includes a bore in an upper portion of the carriage and a stow insert that also cooperates with the pill to lock the pill into a stow detent and secure the gantry and carriage assembly in the stow position.

11 Claims, 84 Drawing Sheets

(51) Int. Cl.
   *F16M 13/04*   (2006.01)
   *F41G 11/00*   (2006.01)

(56) References Cited

U.S. PATENT DOCUMENTS

| | | |
|---|---|---|
| 6,457,179 B1 | 10/2002 | Prendergast |
| 6,462,867 B2 | 10/2002 | Choinere |
| 6,462,894 B1 | 10/2002 | Moody |
| 6,493,137 B1 | 12/2002 | Solinsky et al. |
| 6,662,370 B1 | 12/2003 | Buchanan |
| 6,751,810 B1 | 6/2004 | Prendergast |
| 6,862,748 B2 | 3/2005 | Prendergast |
| 6,938,276 B1 | 9/2005 | Prendergast |
| 6,957,449 B2 | 10/2005 | Prendergast |
| 7,418,738 B2 | 9/2008 | Prendergast |
| 7,735,159 B2 | 6/2010 | Prendergast |
| 7,810,168 B2 | 10/2010 | Reed et al. |
| 7,945,967 B2 | 5/2011 | Barber et al. |
| 8,209,780 B1 | 7/2012 | Lemire |
| 8,239,971 B2 | 8/2012 | Prendergast |
| 8,375,473 B2 | 2/2013 | Celona et al. |
| 8,531,592 B2 | 9/2013 | Teetzel et al. |
| 8,636,375 B2 | 1/2014 | Soto et al. |
| 8,661,571 B1 | 3/2014 | Teetzel et al. |
| 8,677,516 B2 | 3/2014 | Prendergast |
| 8,739,313 B2 | 6/2014 | Teetzel et al. |
| 8,826,463 B2 | 9/2014 | Teetzel et al. |
| 8,908,389 B2 | 12/2014 | Teetzel et al. |
| 8,984,665 B2 | 3/2015 | Celona et al. |
| 9,113,129 B2 | 8/2015 | Teetzel et al. |
| 9,116,355 B2 | 8/2015 | Teetzel et al. |
| 9,203,063 B2 | 12/2015 | Celona et al. |
| 9,625,699 B2 | 4/2017 | Teetzel et al. |
| 9,709,792 B2 | 7/2017 | Teetzel et al. |
| 9,778,453 B2 | 10/2017 | Teetzel et al. |
| 9,781,963 B1 | 10/2017 | Celona et al. |
| 10,004,289 B2 | 6/2018 | Teetzel et al. |
| 10,264,840 B2 | 4/2019 | Teetzel et al. |
| 10,886,646 B2 | 1/2021 | Goupil et al. |
| 2008/0263752 A1 | 10/2008 | Solinsky et al. |
| 2009/0135479 A1 | 5/2009 | Soto et al. |
| 2011/0072562 A1 | 3/2011 | Prendergast |
| 2014/0373423 A1 | 12/2014 | Teetzel et al. |
| 2015/0264229 A1 | 9/2015 | Teetzel et al. |
| 2017/0184835 A1 | 6/2017 | Teetzel et al. |
| 2020/0337406 A1 | 10/2020 | Wall et al. |
| 2020/0391503 A1 | 12/2020 | Prentice et al. |

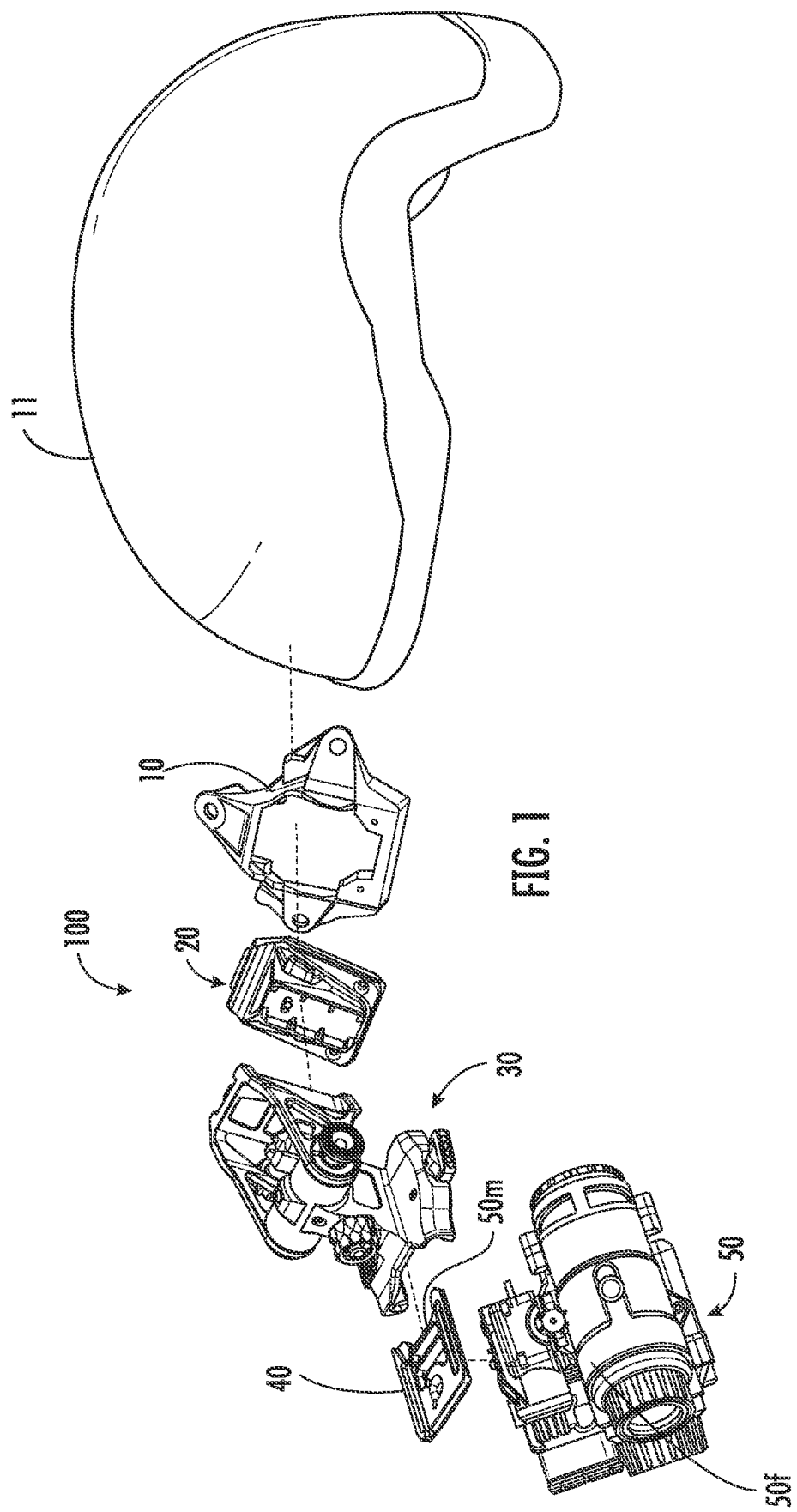

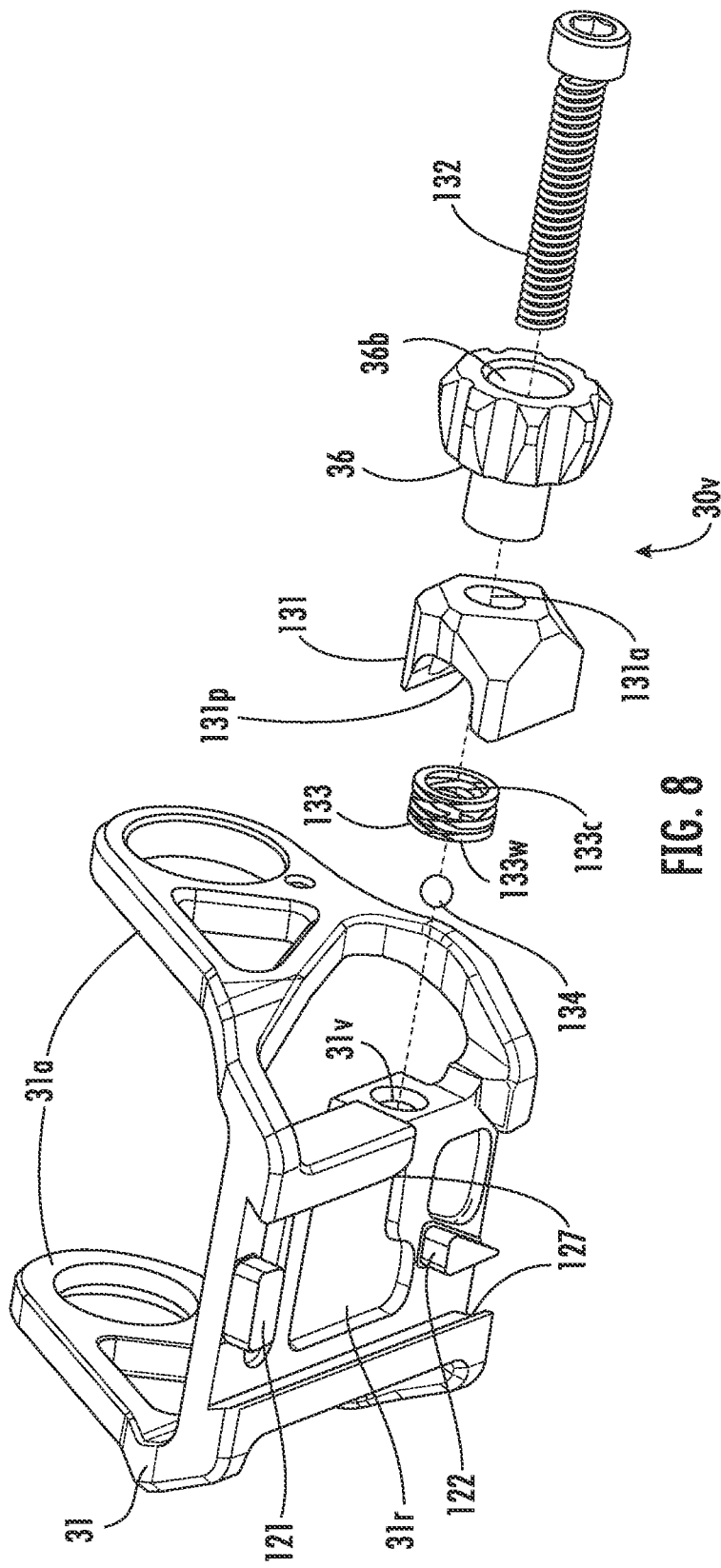

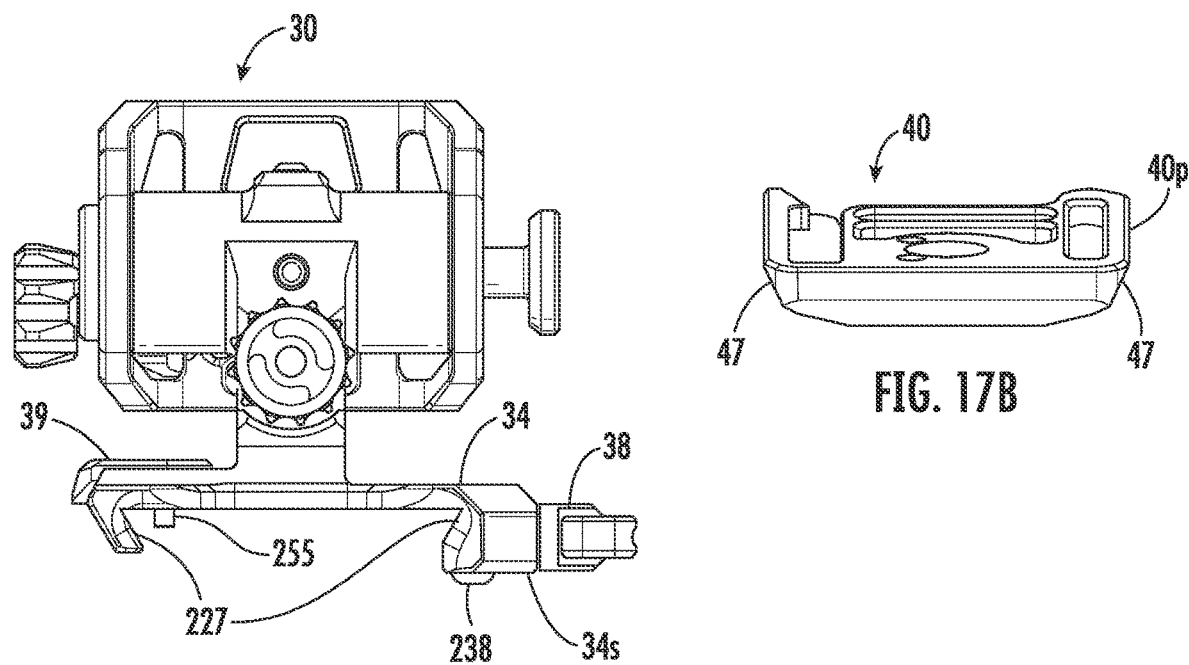
FIG. 17A
FIG. 17B
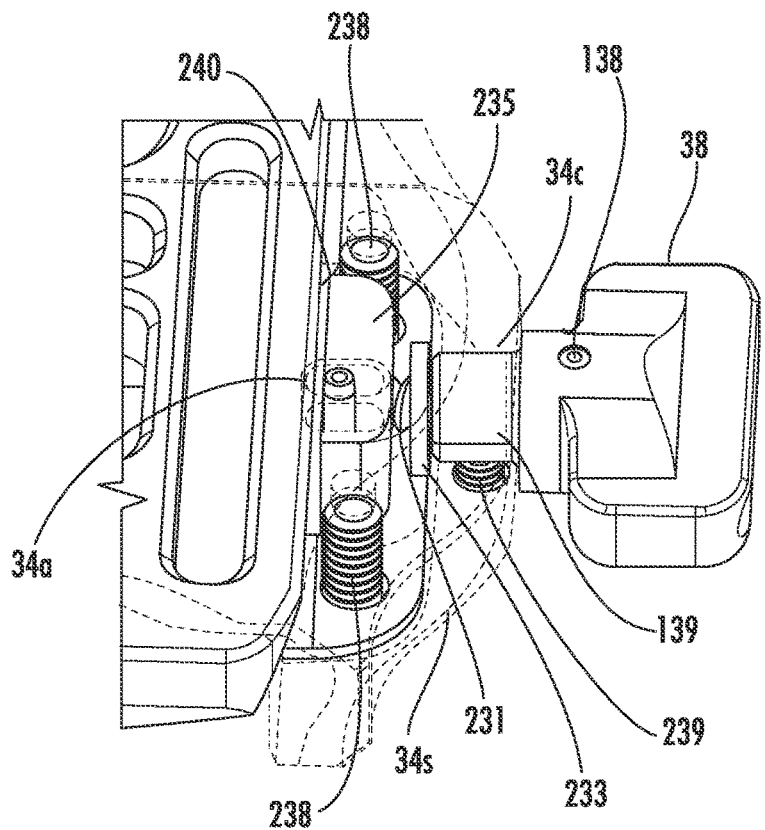
FIG. 17C

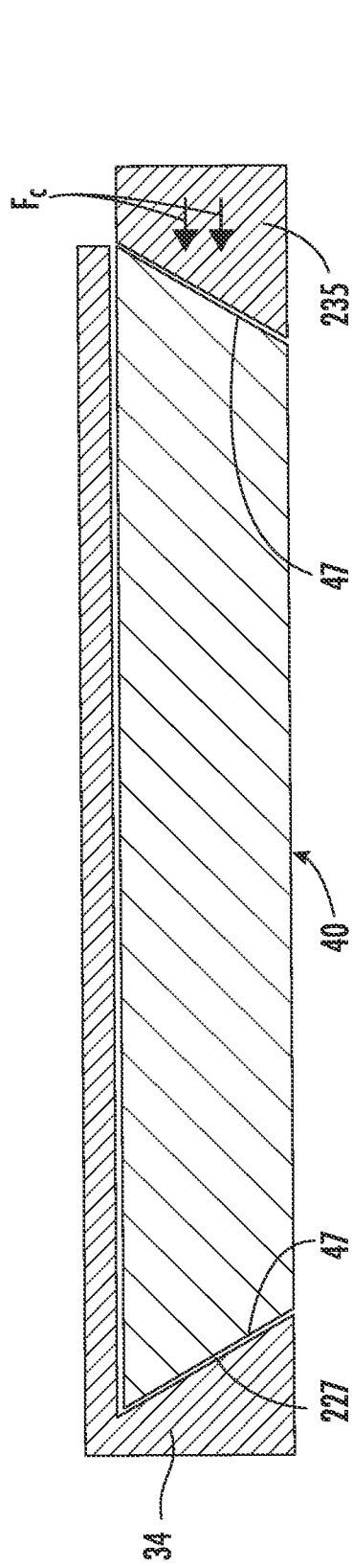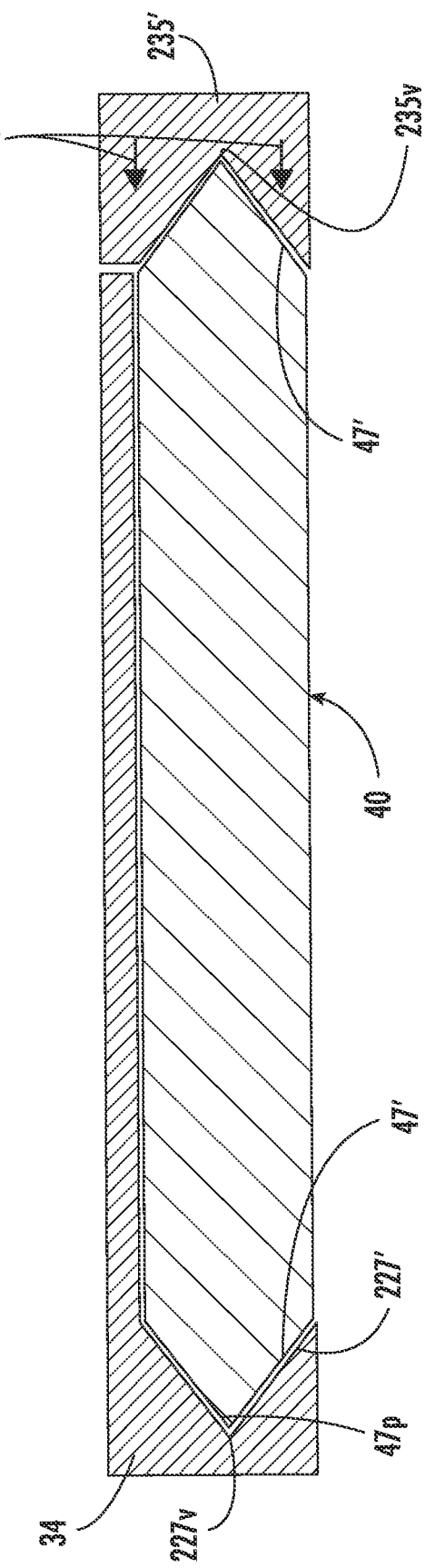

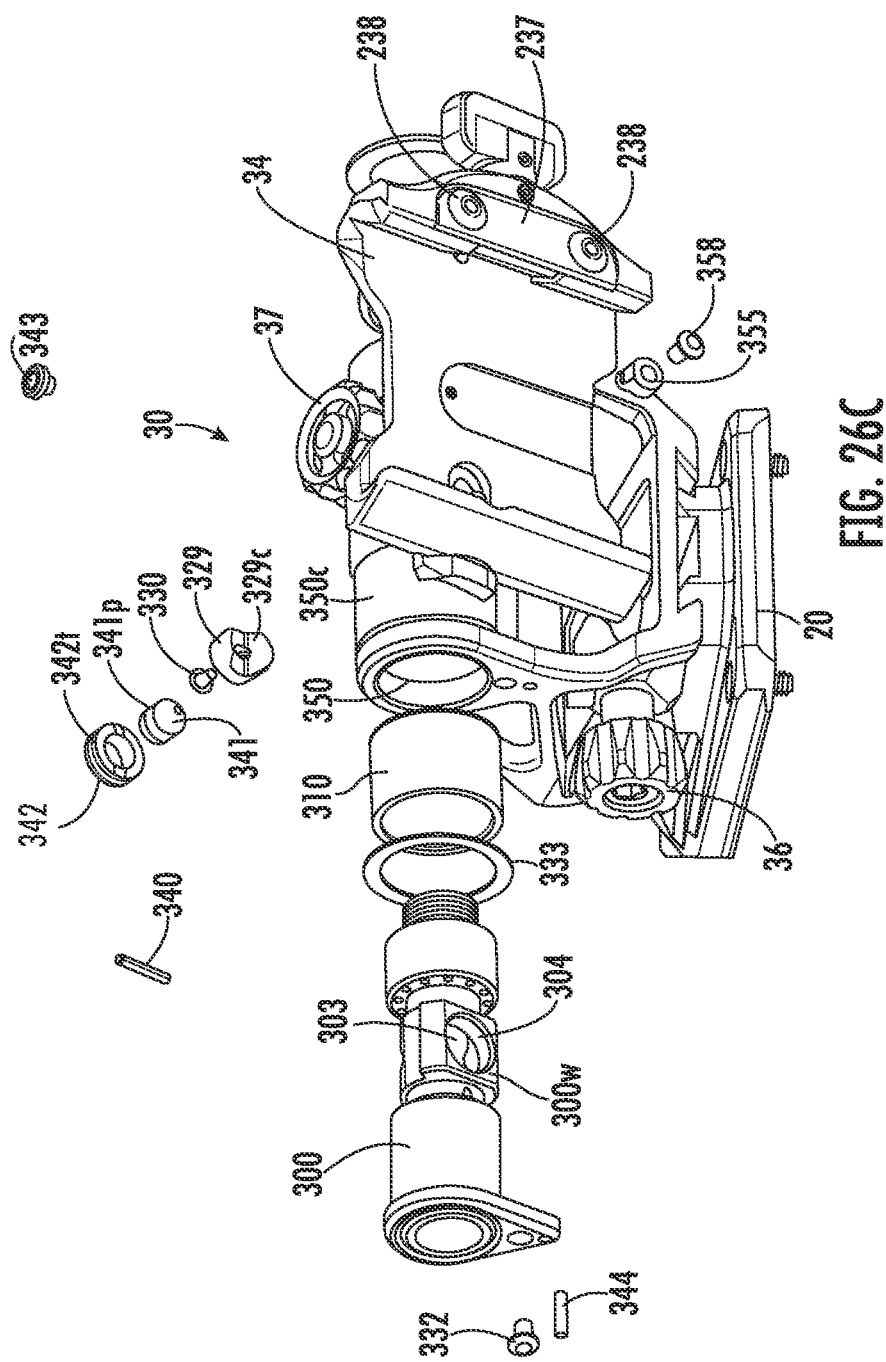

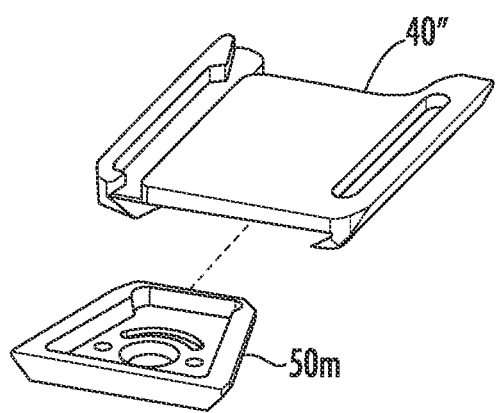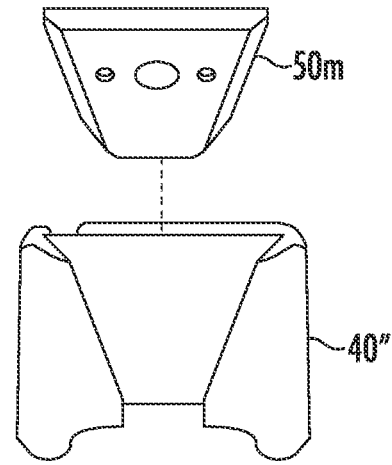
FIG. 37A
FIG. 37B

MOUNTING SYSTEMS SUITABLE FOR MOUNTING VISION SYSTEMS

RELATED APPLICATIONS

This patent application claims the benefit of and priority to U.S. Provisional Patent Application Ser. No. 63/248,089 filed Sep. 24, 2021, the contents of which are hereby incorporated by reference as if recited in full herein.

GOVERNMENT GRANTS

This invention was made with Government support under Agreement No. H92405209P014, awarded by USSOCOM. The United States Government has certain rights in the invention.

FIELD OF THE INVENTION

The invention relates to mounting systems and is particularly suitable for mounting systems suitable for mounting vision systems.

BACKGROUND

Mounts have been used to mount night vision goggles (NVG) or other vision devices/systems to helmets in a manner that serves as the mechanical link between the helmet and the night or other vision devices/systems. It is desired that the mounts provide a means of mechanical adjustment, deployment and stow orientations, and removal/release while accommodating different size/shape helmets/users.

There is a need for vision device mount systems that can provide a rigid structure for consistent positioning and alignment of an NVG or other vision device or system with a user's eyes, wear resistance for durability and positional stability over time, even when exposed to environmental dirt and grime, and/or be configured to accommodate heavier night vision devices such as fused panoramic goggles.

SUMMARY

Embodiments of the present invention provide vision device mount systems configured to provide a consistent stow position irrespective of a tilt orientation selected by a user for a deployed position, and re-deploy to the deployed position, maintaining the selected tilt orientation.

Embodiments of the present invention are directed to a vision mounting system including a gantry, a carriage coupled to the gantry, and a selectable stow position sub-assembly coupled to one or both of the gantry and/or the carriage and configured to provide at least two different selectable stow positions of the vision mounting system to thereby provide a selectable stow position for a respective vision mounting system whereby the vision mounting system is configured to accommodate different configurations and/or types of vision systems.

The selectable stow position sub-assembly can include a shaped aperture provided in one or both of the gantry and/or a hinge axle held by the carriage.

The selectable stow position sub-assembly can further include a member that is configured to be held in the shaped aperture in either one of two or more different orientations to thereby provide at least first and second different stow positions as the at least two different stow positions depending on orientation of the member in the shaped aperture.

The shaped aperture can be elongate in at least one dimension. The selectable stow position sub-assembly can further include a fastener that is configured to be held in the shaped aperture in different lateral and/or longitudinal positions relative to the shaped aperture to thereby provide first and second different stow positions as the at least two different stow positions depending on a position of the fastener in the shaped aperture.

The fastener can be configured to frictionally engage the shaped aperture to lock against the gantry and a flange of the hinge axle.

The shaped aperture can be elongate in at least one dimension and/or has at least one dimension that is greater than a diameter of a fastener held therein.

The shaped aperture can be held by an arm of the gantry or a flange of the hinge axle. The fastener can have a head and an end portion. The head can face inward from the aperture in the gantry and the end portion faces outward from the flange.

A hinge axle can be held by the carriage. The selectable stow position sub-assembly can include at least one cam held by or defined by a flange of the hinge axle and/or an arm of the gantry whereby the at least one cam is configured to rotationally change a position of the hinge axle relative to the gantry to provide the at least two different stow positions for the selectable stow position.

The selectable stow position sub-assembly can include at least first and second apertures extending through a flange of a hinge axle held by the carriage, with the flange coupled to an arm of the gantry. A fixation member can extend through only the first aperture to define a first stow position and the fixation member can extend only through the second aperture to define a second stow position as the selectable stow position.

The selectable stow position sub-assembly can include a plurality of circumferentially spaced apart apertures in a sleeve extending in the carriage. The sleeve can be rotatable in the carriage and lockable in position therein in a desired orientation thereby providing different stow detent positions corresponding to one of the circumferentially spaced apart apertures to provide the at least two different stow positions.

The selectable stow position sub-assembly can include a plurality of spaced apart apertures in a sleeve extending in the carriage. The carriage can be positionally rotatable relative to the gantry then fixed in position using a subset of the spaced apart apertures to provide the at least two different stow positions.

Embodiments of the present invention are directed to a vision mounting system including at least first and second stow detents that are circumferentially spaced apart about a hinge axle in a range of 2 degrees and 90 degrees thereby providing different selectable stow positions to thereby allow a stow position of different vision systems to be optimized.

The at least first and second stow detents can be provided, at least in part, in a sleeve in a carriage that surrounds the hinge axle and the stow position is tilt agnostic across a full range of motion tilt provided by the vision mounting system.

The system can further include a floatable interlock member that travels radially with respect to a selected one of the first and second stow detents to lock and release the vision mounting system from a respective selected stow position.

Embodiments of the present invention are directed to a vision mounting system with a gantry and a cooperating carriage and including a fore/aft adjustment sub-assembly. The fore/aft adjustment sub-assembly can be configured to provide a vision device release whereby components of the fore/aft adjustment sub-assembly are configured to release the vision device from the vision mounting system.

The carriage can have a lower end portion with rails and a clamp that laterally translates in a first direction to lock the vision device in a fore/aft position and that laterally translates in a second opposing direction to allow the vision device to be slidably removed from the mounting system.

Embodiments of the present invention are directed to a vision mounting system with a gantry coupled to a device mount and to a cooperating carriage and including a vertical adjustment sub-assembly that is configured to provide a device release whereby components of the vertical adjustment sub-assembly are configured to release the vision mounting system from the device mount.

The device mount can include a shroud or shroud adapter defined by or coupled to a helmet. The components can include laterally spaced apart, longitudinally extending rails, and upper and lower stop members provided by a rear surface of the gantry, with the upper and lower stop members and a pin that is attached to a user input member and provided by a device mount assembly. The pin can travel laterally in a slot of the device mount assembly in response to actuation of the user input member.

Embodiments of the present invention are directed to a mounting system including a tilt adjustment assembly having a knob in communication with a tilt adjustment member. The tilt adjustment member can be movable in a front to back direction, in response to rotation of the knob, to provide a tilt adjustment. The tilt adjustment member can cooperate with a floatable interlock member to position the mounting system at a desired tilt position.

The tilt adjustment assembly can include a carriage that has a first channel at a top portion thereof that extends laterally. The carriage can have a second channel that is orthogonal to the first channel and that extends in a front to back direction under the first channel. The second channel can hold the tilt adjustment member.

The tilt adjustment member can include a tilt adjustment piston.

The floatable interlock member can be a pill. The mounting system can further include a gantry that is coupled to the carriage. The first channel of the carriage can include a hinge axle therein whereby the carriage is configured to rotate relative to the gantry. A pill pusher can extend laterally in the hinge axle and is coupled to a hinge release knob or defines a hinge release knob. The pill pusher can have an outer surface that resides over the pill.

The pill pusher can have a first lateral position when a hinge release button is in a disengaged position corresponding to a locked position of the mounting system whereby the pill pusher pushes the pill in a position that is partially external to the first channel thereby blocking rotation of the carriage relative to the gantry. The pill pusher can have a second lateral position in response to a user's depression of the hinge release button whereby the outer surface has a segment with increased height relative to the first lateral position that is configured to allow the pill to move upward to reside entirely in the first channel thereby allowing the carriage to rotate relative to the gantry.

The system can further include at least one stow detent. In a stowed position, an end portion of the pill can reside in one of the at least one stow detent and locks the mounting system in a stow position.

The tilt adjustment member can include a cavity sized and configured to releasably couple to an end portion of the floatable interlock member.

The pill can have a curvilinear profile and can be formed of a rigid, non-deformable material.

The system can further include a biasing member coupled to the pill pusher to thereby provide a biasing force to the pill pusher.

The system can further include a bushing coupled to a tension screw held in the first cylindrical channel whereby a user can adjust tension applied to the bushing.

The system can further include a vision device mounting plate removably attached to the carriage and a gantry removably attached to a shroud adapter assembly.

The mounting system can be configured to provide a defined or selected stow position relative to a helmet that is the same at any tilt position provided by the tilt adjustment assembly.

The system can further include a shroud adapter assembly having a pin held in a laterally extending slot coupled to a spring-loaded mount release button.

The gantry can include a rear facing surface having upper and lower stops. The pin can reside between the upper and lower stops, when assembled, and one or more of the lower stop and/or the upper stop can include auto-engaging geometry thereby cooperating with the pin to guide the pin to a desired position as the pin slides with the gantry relative thereto.

The system can further include a vertical adjustment sub-assembly having a knob rotatably coupled to a side of the gantry.

The vertical adjustment sub-assembly can further include a clamp in communication with the knob. In response to rotation of the knob in a first direction, the clamp can move to unclamp from features on a surface of the shroud adapter assembly and features of the gantry to allow for vertical adjustment of the gantry relative to the shroud adapter assembly. In response to rotation of the knob in a second direction, the clamp can move to clamp against features of the surface of the shroud adapter to clamp the mounting system to the shroud adapter assembly and the gantry.

The clamp can include angled clamp surfaces.

The system can further include a carriage having a lower end portion with laterally spaced apart right and left sides with corresponding right and left side rails that extend in a front to back direction and that slidably couple to a vision device mount plate. One of the right and left sides can include a shoulder. A fore/aft adjustment knob can extend from the shoulder and is coupled to a laterally extendable clamp whereby a user rotates the fore/aft adjustment knob to linearly translate the laterally extendable clamp to a clamping position to thereby lock the vision device mounting plate at a desired fore/aft position.

The system can further include a device release button on the lower end portion of the carriage, above a corresponding right or left side rail. The device release button can be coupled to a downwardly extending pin. The device release button can be configured to slide the pin laterally to engage and disengage a channel in the vision device mount plate.

The vision device mount plate can be configured with auto-engaging geometry that slidably cooperates with the downwardly extending pin to force the pin into a desired lateral position as the vision device mount plate moves in a front to back and/or back to front direction.

The system can include a carriage coupled to a gantry, with the gantry releasably attached to a shroud adapter. The carriage can have a lower end portion with a device-to-vision device release assembly to thereby allow a vision device to be released from the mounting system.

The floatable interlock member can have a long centerline axis that is orthogonal to a long centerline axis of the tilt adjustment member in a first position of tilt. In a second position of tilt, the long centerline axis of the floatable interlock member can be greater than 90 degrees from the long centerline axis of the tilt adjustment member. In a third position of tilt, the long centerline axis of the floatable interlock member can be less than 90 degrees from the long centerline axis of the tilt adjustment member.

The system can further include a carriage having a lower end portion with laterally spaced apart right and left sides with corresponding right and left side rails that extend in a front to back direction and that slidably, interchangeably and serially couple to at least first and second different configurations of vision device mount plates thereby attaching different types of vision devices to the vision mounting system.

The system can further include first and second stow detents that are circumferentially spaced apart about a hinge axle in a range of 2 degrees and 90 degrees thereby providing different selectable stow positions to thereby optimize stow positions of different vision systems.

The tilt adjustment assembly can include a knob and an axially extending sleeve surrounding the tilt adjustment member, and a first thrust washer residing inside a wall of the carriage and a second thrust washer residing outside the wall of the carriage, closer to the knob than the first thrust washer.

The sleeve can include a flange on an end portion that is away from the knob. The flange can be fixed to the carriage and defines a load path for transmission of an external blunt force applied against a vision system coupled to the mounting system due to inadvertent contact with an object to thereby protect components of the mounting system from blunt force damage.

The knob can be attached to a tilt nut to define a unitary assembly. The tilt nut can be threadably coupled to an end portion of the tilt adjustment member. The first and second thrust washers can reside about the tilt nut.

The system can further include an O-ring arranged about the second thrust washer and residing between the knob and the carriage to thereby define a seal interface between the carriage and the knob.

The system can further include a carriage having a lower end portion with laterally spaced apart right and left sides having corresponding right and left side rails that extend in a front to back direction. The carriage can include a knob coupled to a clamp with an angled profile that tapers inward from a medial to bottom portion whereby rotation of the knob linearly translates the clamp against first and second clamp surfaces provided by the carriage. The first and second clamp surfaces can be spaced apart in a front to back direction. The clamp surfaces of the carriage can taper inward toward each other to mateably receive the clamp to thereby prevent downward movement of the clamp during clamping into a locked fore/aft position.

Embodiments of the present invention are directed to a vision mounting system including a gantry, a carriage rotatably coupled to the gantry to move to stow and deployed positions, and a floatable interlock member coupled to the hinge axle and configured to move radially between locked and unlocked positions to thereby lock the carriage in the respective stow and the deployed positions and to release the carriage to rotate between the stow and deployed positions.

The system can further include a tilt adjustment member coupled to the floatable interlock member. The tilt adjustment member can be moveable in forward and aft directions.

The tilt adjustment member and the floatable interlock member can have cooperating contact surfaces.

The floatable interlock member can have at least one dome-shaped rounded end.

The floatable interlock member can include a channel extending axially a portion of a length of the interlock member.

The floatable interlock member can have a solid body.

Embodiments of the present invention are directed to a vision mounting system including a tilt adjustment member configured to travel in fore and aft directions, a floatable interlock member that cooperates with the tilt adjustment member, and a pusher member configured to travel laterally and that is configured to push against the floatable interlock member.

The floatable interlock member can have at least one rounded end portion.

The floatable interlock member can have a second end portion that is axially spaced apart from the first end portion and that has a rounded circumferentially extending outer edge.

The floatable interlock member can include a center channel extending a partial length of the floatable interlock member.

The system can further include a stow detent inside of and affixed to a carriage holding a hinge defining a hinge axis. The carriage can hold the tilt adjustment member and the pusher member whereby the pusher member travels inside the hinge.

The system can further include a tilt member sleeve that surrounds the tilt member. The tilt member sleeve can include an aperture in an outer wall thereof that aligns with a cavity in the tilt adjustment member.

The stow detent can include a stow sleeve. The stow sleeve can include at least one aperture that aligns with the aperture in the tilt member sleeve and the cavity in the tilt adjustment member.

Embodiments of the present invention are directed to a vision mounting system including a carriage, and a gantry coupled to the carriage. The carriage and gantry can cooperate to provide an adjustable stow position that is fixed across a full tilt range of motion provided by the vision mounting system to thereby provide an adjustable stow position that is tilt agnostic and adjustable for different vision systems.

The vision mounting system can further include a hinge axle in the carriage. The carriage can be rotatably coupled to the gantry to move between stow and deployed positions. The vision mounting system can further include a floatable interlock member coupled to the hinge axle and configured to move radially between locked and unlocked positions to thereby lock the carriage in respective stow and the deployed positions and to release the carriage to rotate between the stow and deployed positions. The floatable interlock member can be configured to access a single one of at least two different selectable stow detents to provide the stow position to thereby optimize stow position for different vision systems.

Embodiments of the present invention are directed to a vision mounting system including a gantry, a carriage including a hinge axle coupled to the gantry whereby the carriage is configured to rotate relative to the gantry, and a vertical adjustment sub-assembly including a knob coupled to the gantry and a laterally extendable clamp whereby rotational input to the knob moves the clamp linearly inward in a lateral direction to clamp against features on a surface of a target mating surface, optionally provided by a shroud adapter assembly or helmet, and against features of the gantry to thereby lock the vision mounting system in a desired vertical position and allow for vertical adjustment of the gantry.

Embodiments of the present invention are directed to a vision mounting system including a gantry, a carriage including a hinge axle coupled to the gantry whereby the carriage is configured to rotate relative to the gantry, and a fore/aft adjustment sub-assembly and a laterally extendable clamp whereby rotational input to the knob moves the clamp linearly inward in a lateral direction to clamp against features on a surface of a vision device adapter plate to thereby lock the vision mounting system in a desired fore/aft position against the carriage.

Embodiments of the present invention are directed to a vision mounting system including a carriage with a wall extending about a channel that extends laterally, and a hinge axle in the channel. The wall can have at least one through aperture that is configured to allow a floatable interlock member to move radially.

Embodiments of the present invention are directed to a vision mounting system including a gantry, a carriage including a hinge axle coupled to the gantry whereby the carriage is configured to rotate relative to the gantry, and a first stow position fixation aperture through a flange of the hinge axle and a second stow position fixation aperture extending through an arm of the gantry. The second fixation aperture can be formed after the gantry and carriage are assembled to define a stop location for a stow position, and a fixation member extending laterally through the first and second fixation apertures to thereby provide a fixed stow position that accounts for assembly tolerances of components of the mounting system.

The vision mounting system can further include a tilt adjustment assembly with a tilt adjustment member that is movable in a front to back direction and that cooperates with a floatable interlock member to provide the full tilt range of motion for the mounting system.

Embodiments of the present invention are directed to methods of assembling a vision mounting system to accommodate manufacturing tolerances of components thereof and provide a precise stow position. A method includes providing a vision mounting system including a gantry and a carriage with a hinge axle; rotating the carriage relative to the gantry to a stow position; placing a shim between the gantry and the carriage; placing the rotated carriage and gantry with the shim in a vise fixture; and forming at least one aperture into an arm of the gantry and/or a flange of the hinge axle; then inserting a fixation member into the at least one formed aperture to define a stow position; then removing the shim; and taking the vision mounting system with the fixation member in place out of the assembly vise before, during or after removing the shim thereby providing an assembly that accommodates manufacturing tolerances and provides a precise lockable stow position.

The forming step of the method can be carried out using a pilot hole in the flange of the hinge axle as a guide path to the arm of the gantry.

The rotating step of the method can be carried out with a floatable interlock in a stow detent position.

Other devices and/or methods according to embodiments of the invention will be or become apparent to one with skill in the art upon review of the following drawings and detailed description. It is intended that all such additional devices and methods be included within this description, be within the scope of the present invention, and be protected by the accompanying claims.

BRIEF DESCRIPTION OF THE DRAWINGS

Features of the present invention will be more readily understood from the following detailed description of exemplary embodiments thereof when read in conjunction with the accompanying drawings.

FIG. 1 is a partially exploded side perspective view of an example mounting system suitable for mounting vision systems according to embodiments of the present invention.

FIG. 8 is an exploded view of a gantry assembly of the gantry and carriage assembly shown in FIG. 1 according to embodiments of the present invention.

FIG. 17A is a front view of the gantry and carriage assembly shown in FIG. 1.

FIG. 17B is a front, top perspective view of the device mount plate shown in FIG. 1.

FIG. 17C is a partially transparent view of the fore/aft adjustment assembly and cooperating portion of the device mount plate shown in FIGS. 17A, 17B, according to embodiments of the present invention.

FIGS. 20A and 20B are schematic illustrations of other embodiments of the carriage and fore/aft clamp configurations according to embodiments of the present invention.

FIG. 26C is a partially exploded, section view of the mounting system shown in FIG. 26B with the hinge axle shown outside and above the channel of the carriage.

FIG. 37A and FIG. 37B illustrate a device mount plate with a different mount interface that can be attached to the mounting system without requiring modification to the carriage thereby providing an agnostic mounting system accommodating different types of vision systems according to embodiments of the present invention.

FIG. 48A is a rear perspective view of an eccentric single cam. FIG. 48B is a front view of the single cam of FIG. 48A which would require a wrench or other tool for adjustment. FIG. 48C is a front perspective view of an alternative single cam which would not require a wrench or other tool for adjustment.

FIG. 55A illustrates the mounting system configured to function with a Heads-Up Display. FIG. 55B illustrates the mounting system configured to function with a monocular that can be positioned in front of either eye. FIG. 55C illustrates the mounting system configured to function with a binocular.

DETAILED DESCRIPTION

Figure 2A:
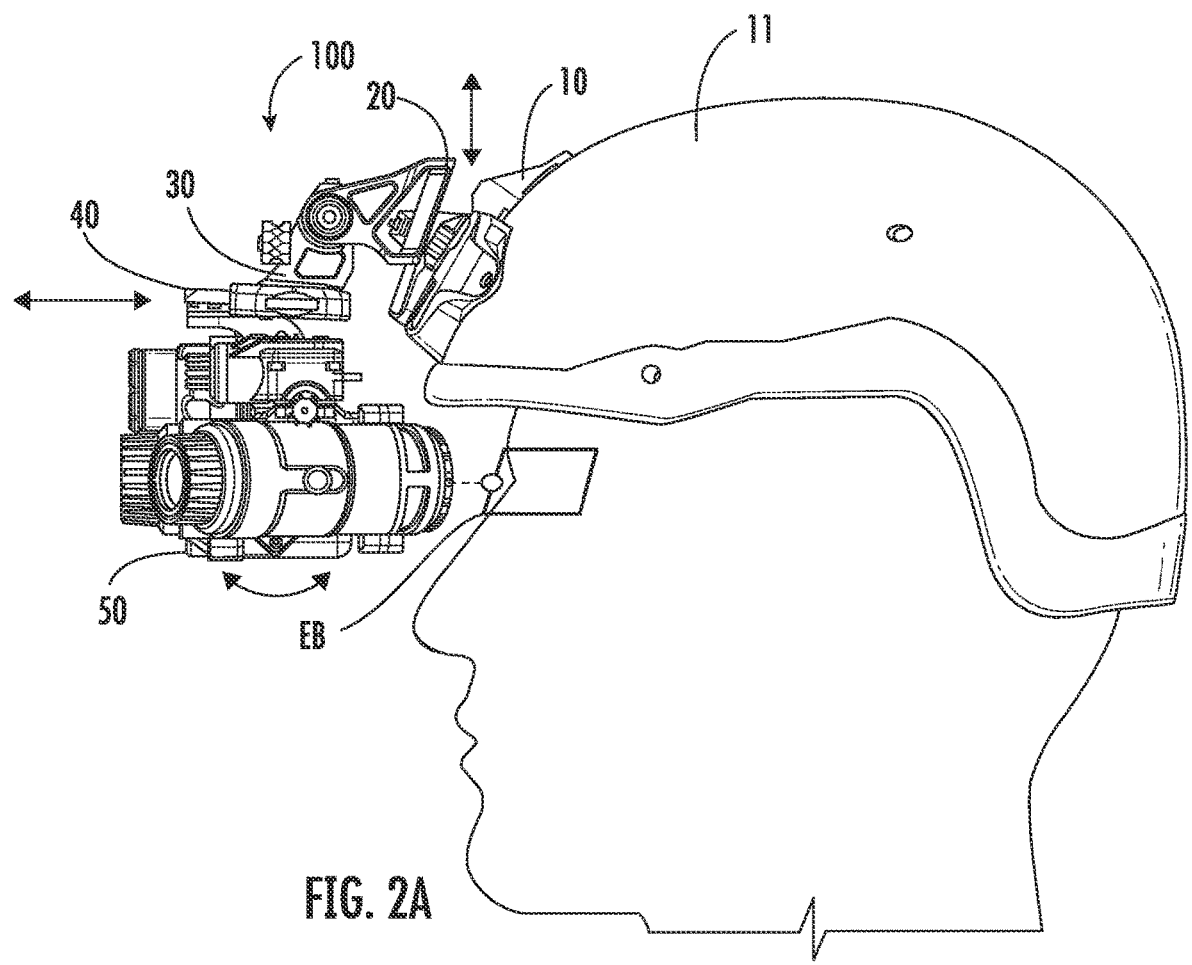
FIG. 2A is a side view of the mounting system shown in FIG. 1, illustrated in an example deployed position according to embodiments of the present invention.

While the invention may be made in modified and alternative forms, specific embodiments thereof are shown by way of example in the drawings and will be described in detail. It should be understood, however, that there is no intent to limit the invention to the particular forms disclosed, but on the contrary, the invention is to cover all modifications, equivalents, and alternatives falling within the spirit and scope of the invention. Like reference numbers signify like elements throughout the description of the figures.

In the figures, the thickness of certain lines, layers, components, elements, or features may be exaggerated for clarity. Broken lines illustrate optional features or operations unless specified otherwise. The sequence of operations (or steps) is not limited to the order presented in the claims or figures unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The term "about" when used with a number means that the numerical value can vary by between +/−10%.

The term "night vision goggle" (or "NVG") refers to a goggle, which can be a monocular, binocular, or panoramic goggle device that amplifies ambient visible and near-infrared (IR) light ($I^2$) to allow a user to see (image intensification) in low-light conditions. The NVG cooperates with a mounting system that is configured to place the NVG in front of a user's eye(s) for enhanced viewing in low light such as night conditions. The NVG can be a fused panoramic goggle that combines the $I^2$ with a thermal camera that allows a user to see light and temperature profiles/images. The fused panoramic goggle can be significantly heavier than conventional NVGs. The thermal camera can comprise a Bolometer that detects heat rather than amplifies light.

The term "AO complex" or "AO joint" refers to the Atlanto-occipital complex which is the pivot point where the skull and spine are joined. The term "pitch torque" refers to the static torque exerted on the AO complex that biases a user's head to pitch or nod forward, typically caused by the mass and position of the NVG and mounting system used.

The term "eye box" refers to a volume of space in which the pupil of an eye can move, relative to the NVG, while still maintaining the optical performance of the device. Moving the NVG to a position where the pupil is outside the eye-box results in blurring, distortion and/or reduced field of view.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the goggle mounting systems may be particularly suitable for use with helmets for humans but may also be used to mount to other structures and subjects or objects including stationary or mobile objects. The goggle mounting systems described herein may be used with other headgear or with a rail interface of a firearm, for example.

Turning now to FIG. 1, a mounting system 100 is shown. The mounting system 100 of the present invention may be used with night vision systems (e.g., monocular, binocular, or panoramic), thermal imaging vision systems, fused night/thermal vision systems, or other visions systems (e.g., binoculars, magnifying monoculars, laser range finders, cameras, etc.), personal protective equipment (e.g., eye protection, ballistic face protection, etc.), or a Heads-Up Display 51 (see also, FIGS. 55A-55C). The mounting system 100 of the present invention may also be used with other helmet mounted equipment that interacts with or protects the eyes or face and can couple to other devices rather than a helmet. The mounting system 100 comprises a shroud adapter assembly or other target mating structure 20, a gantry and carriage assembly 30 and a vision device mount plate 40. In some embodiments, the mounting system 100 further comprises a shroud or other target mating feature 10. As shown, the shroud or other target mating feature 10 can be attached to or integral with a helmet 11. In some instances, the shroud adapter assembly or other target mating structure 20 can also be attached to or integral with the helmet 11. The device mount plate 40 is attached to the NVG 50 via a device mount interface 50m. In the embodiment shown in FIGS. 1 and 2, the NVG 50 is a fused panoramic goggle 50F. Two examples of goggle manufacturers are L3Harris Technologies, Melbourne, FL and Elbit Systems, Ft. Worth, TX. However, as noted above, the mounting system 100 can be used with other NVGs of various configurations or other vision systems and have various mount plate interfaces to attach to corresponding device mount plates 40 of the mounting system 100.

The shroud 10 can be any suitable shroud. Commercially available shrouds 10 and helmets 11 are provided by companies such as Gentex Corporation, Carbondale, PA, with the OPS-CORE Fast SF Super High Cut Helmet and Team Wendy, Cleveland, OH, with the EXFIL Ballistic SL helmet. However, the mounting system 100 is not limited to use with these devices and the shroud adapter assembly or target mating structure 20 can be modified to accommodate other shrouds or target mating features 10 and/or may be attached to or integral with the helmet 11.

Figure 2B:
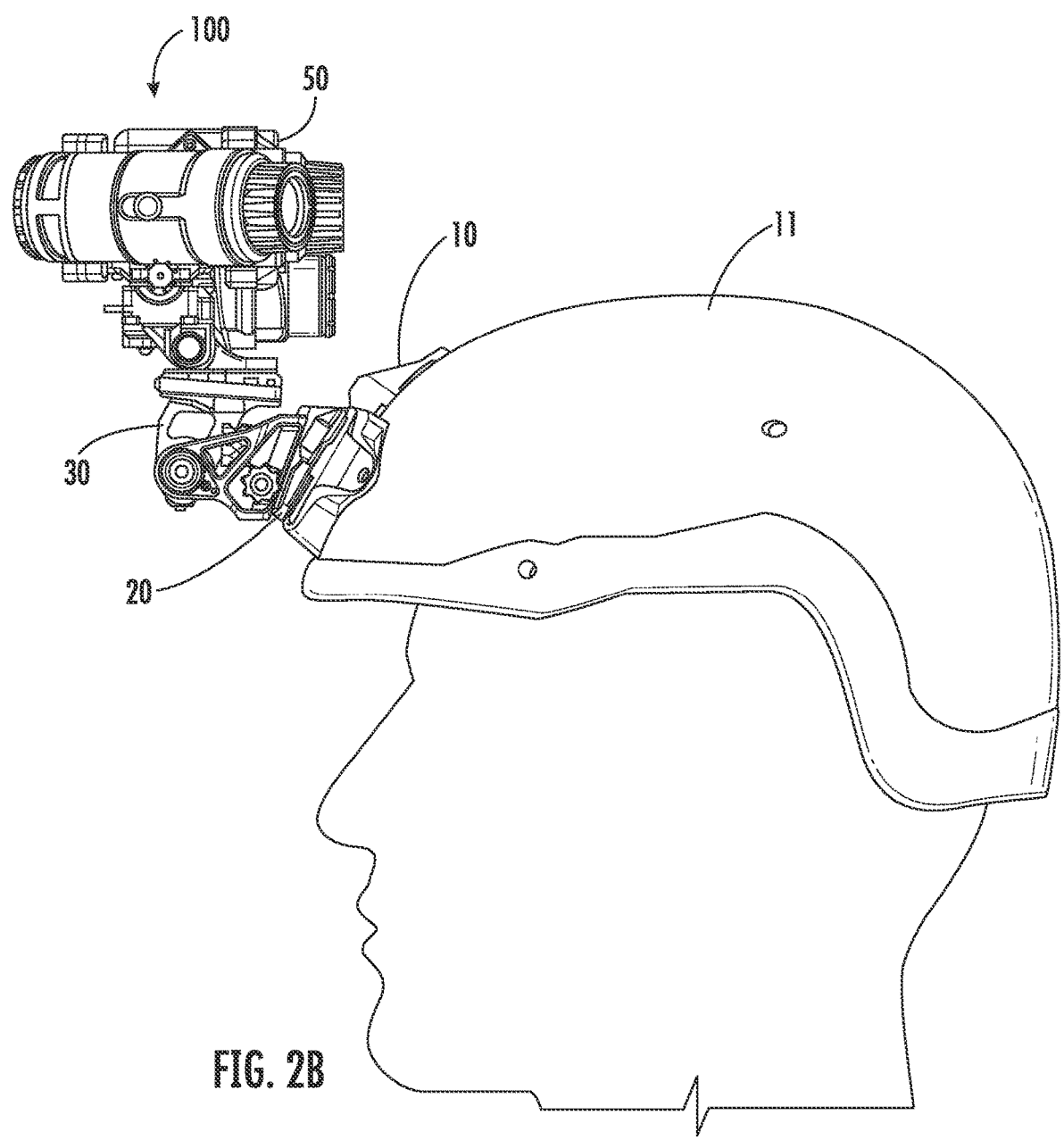
FIG. 2B is a side view of the mounting system shown in FIG. 1, illustrated in stowed position according to embodiments of the present invention.

Referencing FIGS. 2A and 2B, the mounting system 100 can provide six (6) degrees of freedom: up/down adjustment as indicated by the arrow above the helmet 11 in FIG. 2A; a fore/aft adjustment as indicated by the arrow in front of the mounting system 100 in FIG. 2A; a tilt adjustment as indicated by the curved arrow under the goggle 50 in FIG. 2A; stow and deploy positions (FIG. 2B, FIG. 2A, respectively); a goggle or "device" release whereby the device 50 is removable from the gantry and carriage assembly 30; and a mount release whereby the gantry and carriage assembly 30 is detachable from a target mating surface, optionally provided the shroud adapter assembly 20 or helmet 11, or the shroud adapter assembly 20 is detachable from the shroud or target mating feature 10, typically the former. The mounting system 100 can be configured to rotate the device mount plate 40 with the carriage 34 of the gantry and carriage assembly 30 upward relative to the gantry 31 to stow the goggle 50 outside the line of sight in the stow position (FIG. 2B) and rotate downward to re-position the goggle 50 when re-deployed to the user-selected deployed position within the eye box EB (FIG. 2A).

It is contemplated that the mounting system 100 can be modified so that the shroud or target mating feature 10 can be configured to directly couple to the gantry and carriage assembly 30 (not shown) without requiring a separate shroud adapter assembly 20.

In some embodiments, the gantry and carriage assembly 30 can be removably attached to the target mating surface, e.g., the shroud adapter assembly 20 shown in FIGS. 2A, 2B (where used) or the shroud 10 itself to provide the mount release.

In some embodiments, the mount release (the sixth degree of freedom discussed above) is not required and the mount system 100 can be configured so as to not have a mount release from any of the helmet 11, the shroud 10 or the shroud adapter assembly 20.

Figure 3:
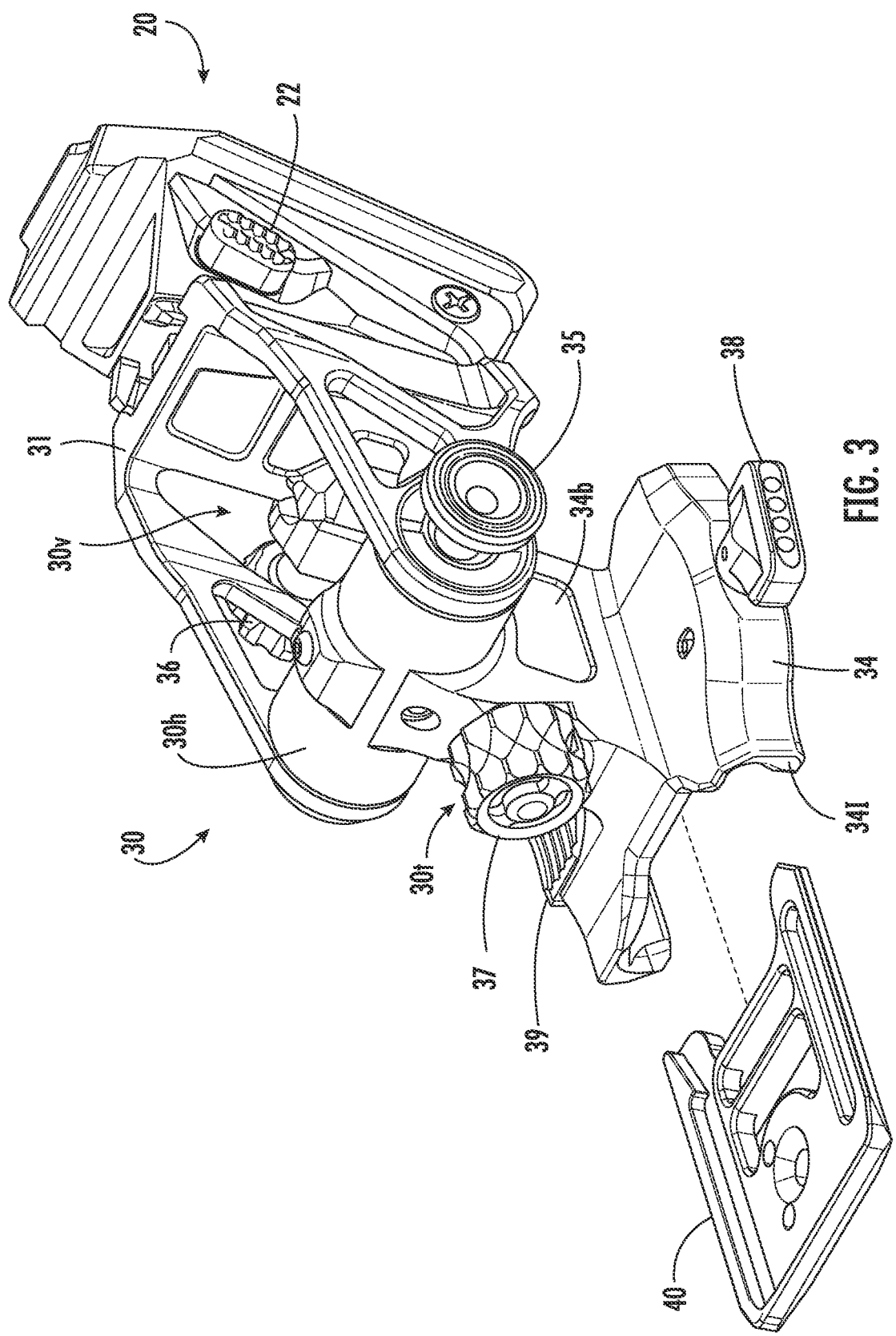
FIG. 3 is an enlarged side perspective view of a gantry and carriage assembly shown in FIG. 1, aligned with a device mount plate and attached to a shroud adapter assembly.

Referring to FIG. 3, the shroud adapter assembly 20 is shown attached to the gantry and carriage assembly 30. The device mount plate 40 is shown aligned with a carriage 34 of the gantry and carriage assembly 30. The carriage 34 is coupled to the gantry 31 at an upper portion thereof and is configured to couple to the device mount plate 40 at a bottom portion thereof. The gantry 31 is shown attached to the shroud adapter assembly 20.

The carriage 34 has a carriage body 34b that houses a hinge assembly 30h (see also, FIG. 26A) with a hinge release button 35. The carriage body 34b extends a distance beneath the hinge assembly 30h to provide the attachment interface 34I for the device mount plate 40.

As shown in FIG. 3, the gantry and carriage assembly 30 also includes a hinge assembly 30h (see also, FIGS. 26A-26C) with a hinge release button 35, a vertical adjustment knob 36 of a vertical adjustment assembly 30v (FIGS. 8, 9A-9C), a tilt adjustment assembly 30t with a tilt adjustment knob 37 (see also, FIG. 28), a fore/aft adjustment knob 38, and a goggle release button 39. The shroud adapter assembly 20 can comprise a mount release button 22.

It is noted that the use of the terms "knob" and "button" are used for ease of description and each refers to a manual user input interface for various releases and adjustments. A button can be configured to be pushed inward to deploy a corresponding mechanism while a knob can be configured to rotate to allow the corresponding mechanism to carry out the desired release or adjustment. It is contemplated that the example embodiments of the manual user input interfaces may be modified to use other manual interfaces, e.g., a "knob" input can be reconfigured to use the "button" input.

Figure 4:
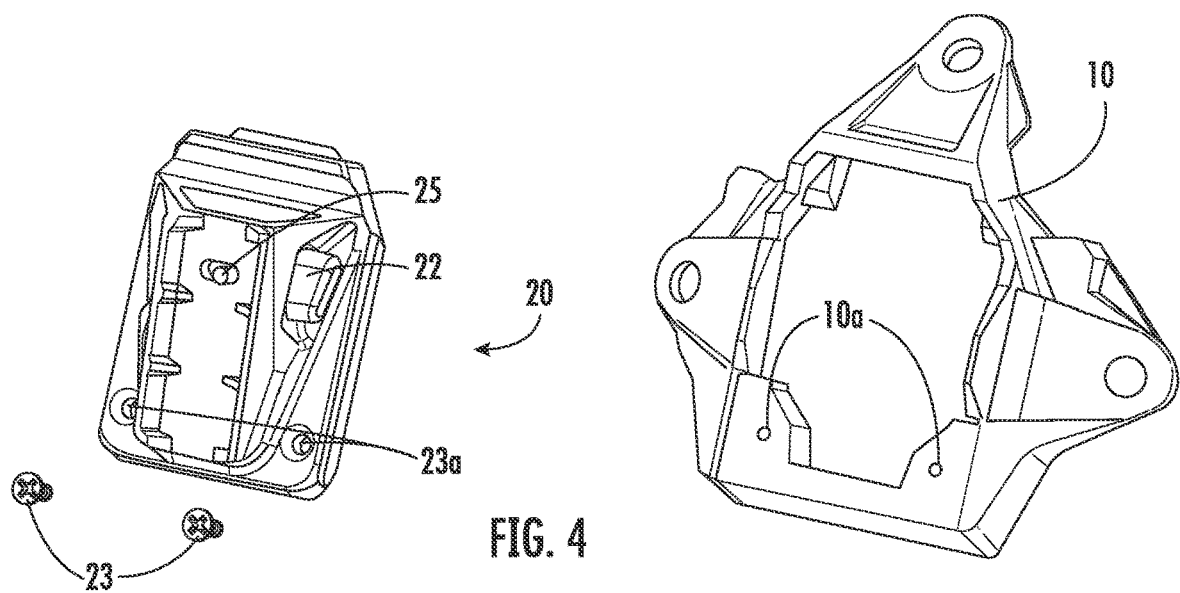
FIG. 4 is a side perspective view of the shroud adapter assembly and shroud shown in FIG. 1.
Figure 5A:
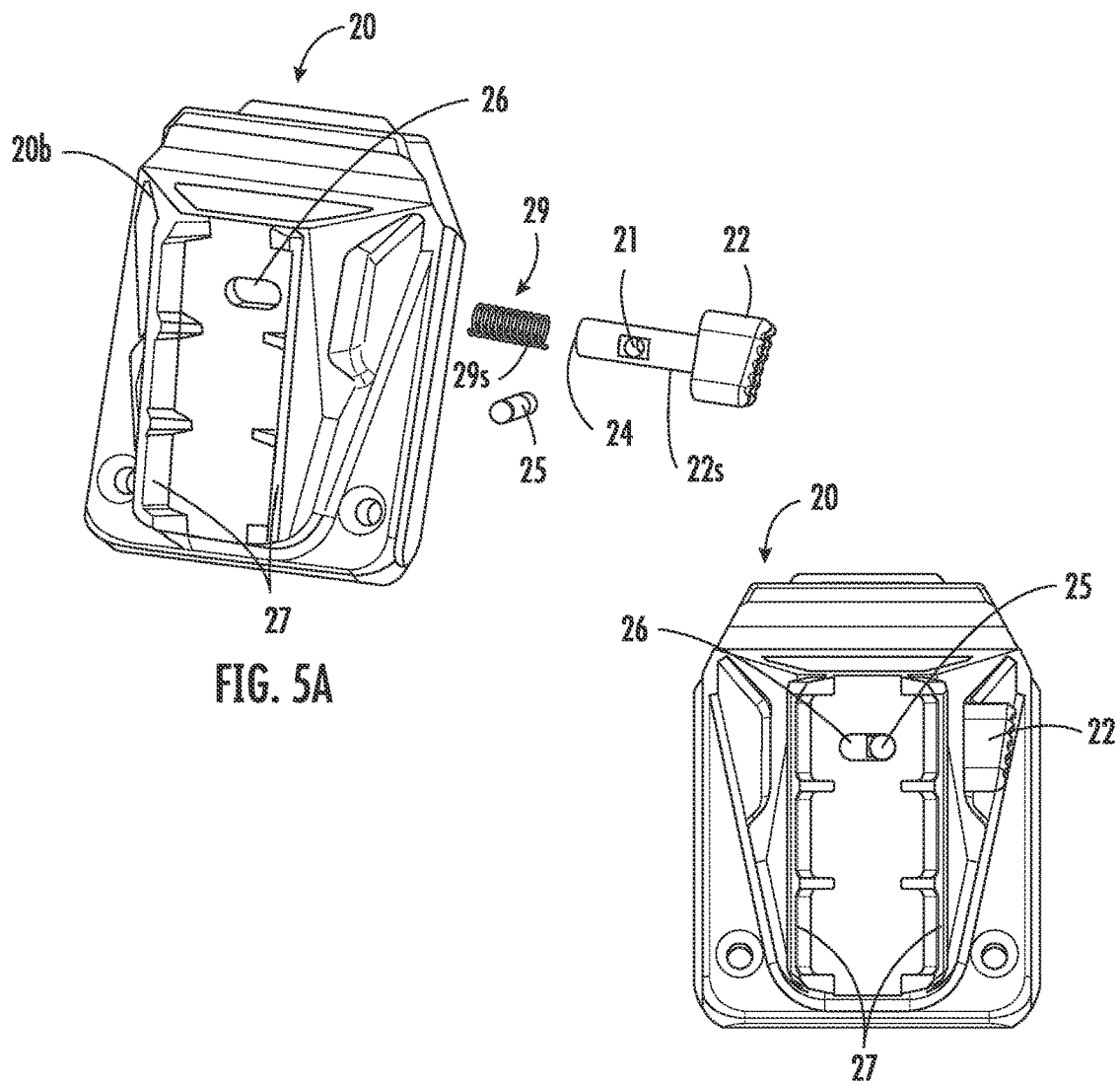
FIG. 5A is an exploded view of components of the shroud adapter assembly shown in FIG. 4 according to embodiments of the present invention.
Figure 5B:
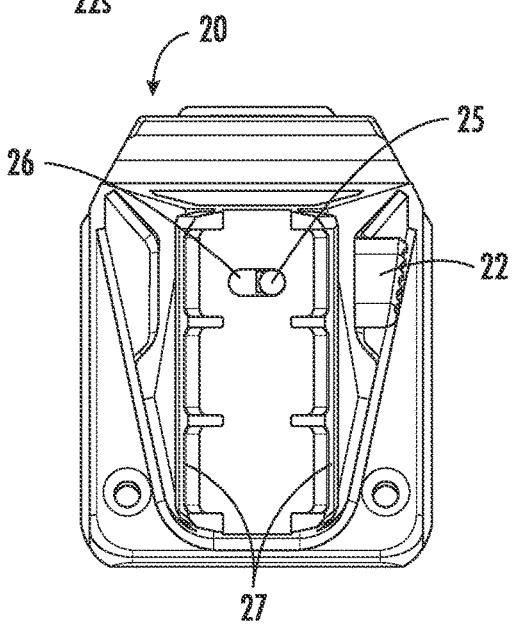
FIG. 5B is a front view of the shroud adapter assembly shown in FIG. 5A.

Turning now to FIGS. 4, 5A and 5B, an example shroud adapter assembly 20 is shown. The shroud adapter assembly 20 can include the mount release button 22 as discussed above. The mount release button 22 can define the releasable attachment of the gantry and carriage assembly 30 and mount plate 40, coupled as a unit, to be released from the helmet 11 or other mounting structure.

The shroud adapter can have a rigid body 20b that can include apertures 23a that receive fasteners 23 to couple to apertures 10a in the shroud 10. The shroud adapter assembly 20 can be configured to remain attached to the helmet 11 when the other portions of the mounting system 100 are detached by detaching the gantry and carriage assembly 30 from the shroud adapter assembly 20.

The mount release button 22 can be coupled to a release pin 25 that resides in a laterally extending slot 26 of the body 20*b* of the shroud adapter assembly 20. The mount release button 22 can include a laterally extending shaft 22*s* with an axially extending bore 24.

Figure 9A:
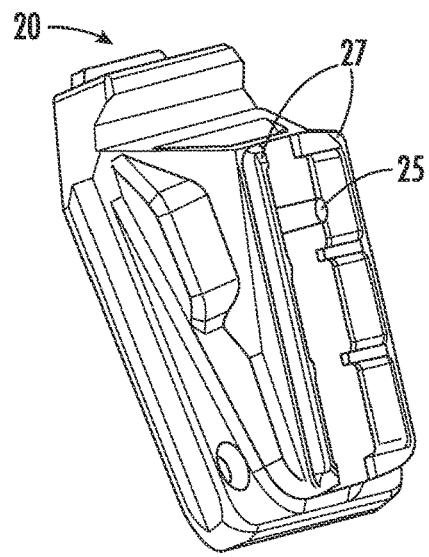
FIG. 9A is a side perspective view of the shroud adapter assembly shown in FIG. 1.
Figure 9B:
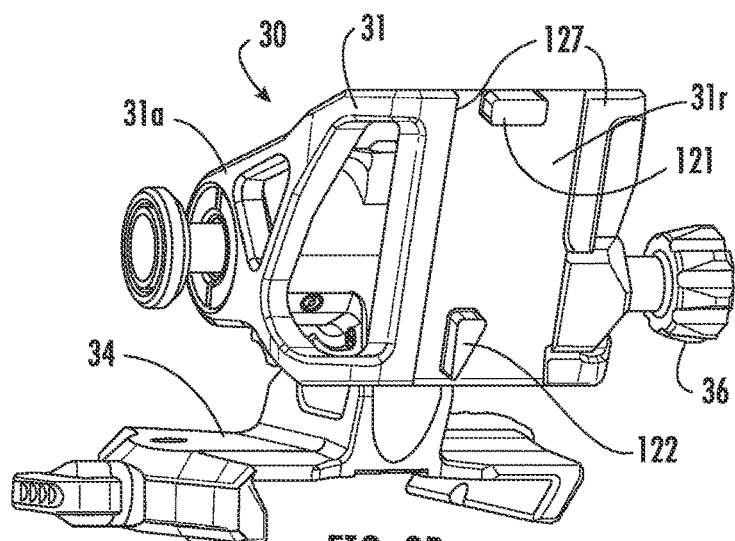
FIG. 9B is a rear view of the gantry assembly shown in FIG. 8 according to embodiments of the present invention.
Figure 9C:
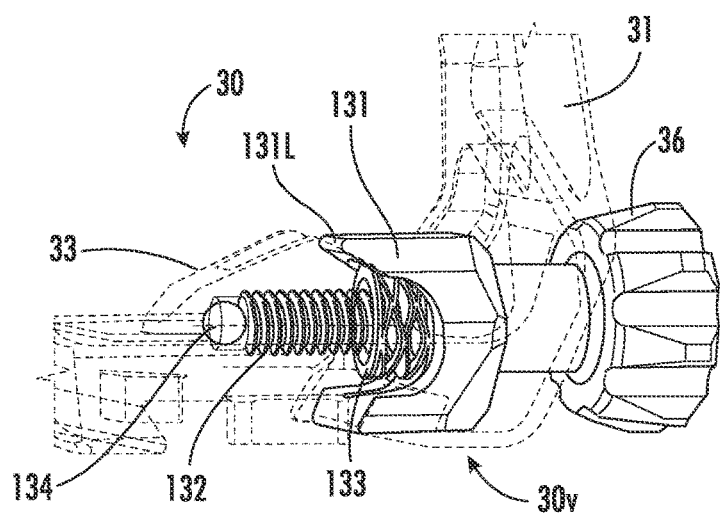
FIG. 9C is a transparent view of a portion of the gantry assembly shown in FIG. 9B and the shroud adapter assembly shown in FIG. 9A according to embodiments of the present invention.

The shaft 22*s* can cooperate with a biasing member 29, such as a coil spring 29*s*. The biasing member 29 can be configured as a leaf spring, a resilient solid plug, a wave spring and the like or combinations of same. As shown, the release pin 25 is orthogonal to and resides in an aperture 21 in an outer wall of the shaft 22*s* of the mount release button 22. The aperture 21 can be a through aperture that extends through both sides of the outer wall of the shaft 22*s*, across the axially extending bore 24. The body 20*b* of the shroud adapter assembly 20 also includes a pair of laterally spaced apart rails 27, which may be configured as dovetail rails. The rails 27 slidably cooperate with rails 127 provided by a rear surface of the gantry 31 (FIG. 9B) and allow the vertical adjustment of the gantry 31 relative to the shroud adapter assembly 20 between defined upper and lower stops 121, 122 (FIG. 9B). The rails 27 and 127 can each be provided as a pair of longitudinally extending and laterally spaced apart slidably cooperating dovetail rails. As used herein, the term "longitudinal" includes an upward or downward direction which may be substantially vertical. As is well known to those of skill in the art, the term "dovetail rail" refers to any straight mounting bracket with an inverted trapezoid (dovetail) cross-section. However, it is contemplated that other rail configurations may be used.

Figure 6A:
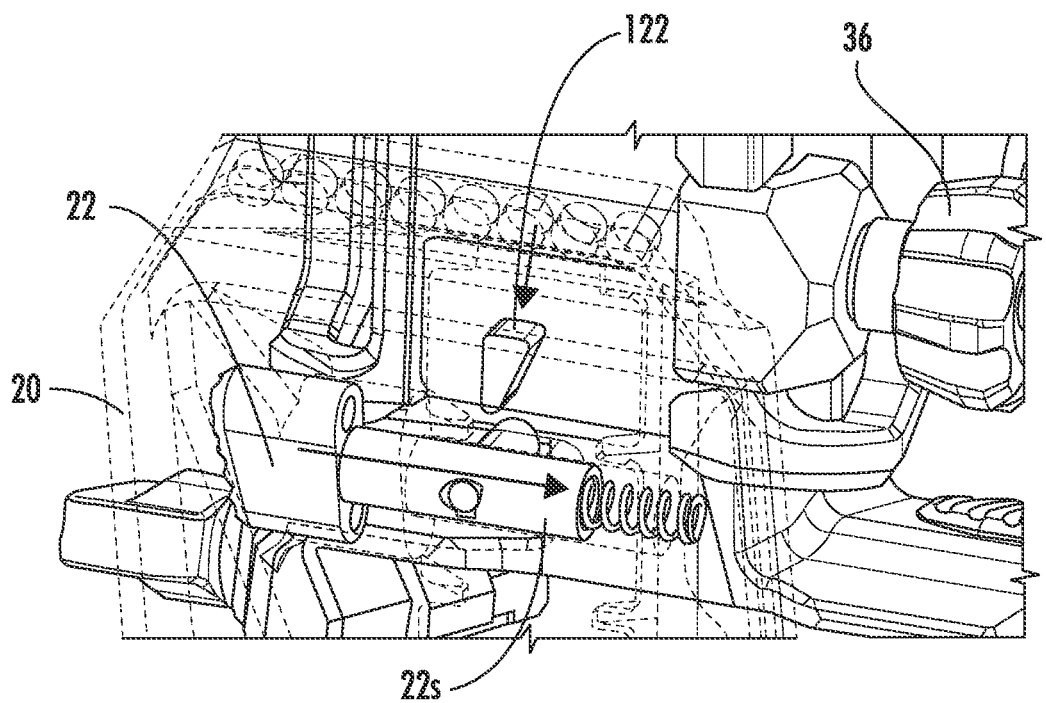
FIGS. 6A-6D illustrate a series of actions that can be controlled by the vertical release button of the shroud adapter assembly shown in FIG. 5B to move the gantry and carriage assembly shown in FIG. 1 relative to the shroud adapter assembly according to embodiments of the present invention.
Figure 6B:
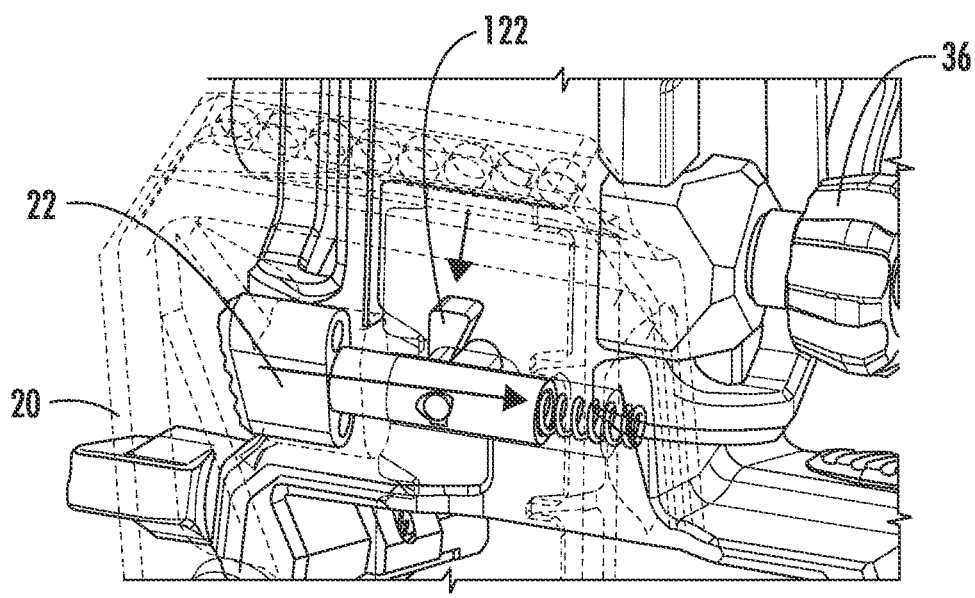
Figure 6C:
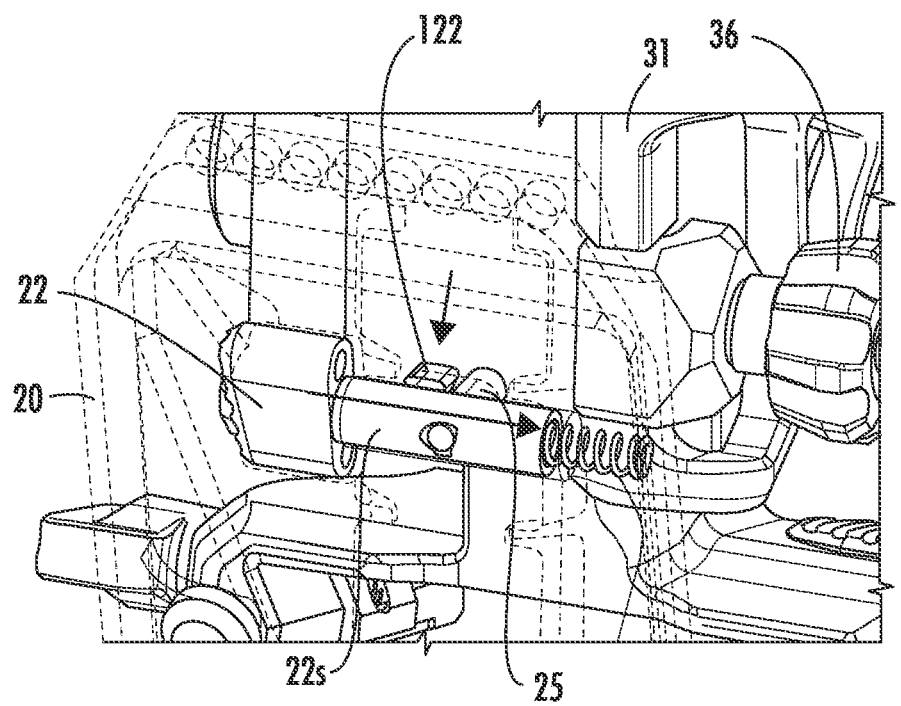
Figure 6D:
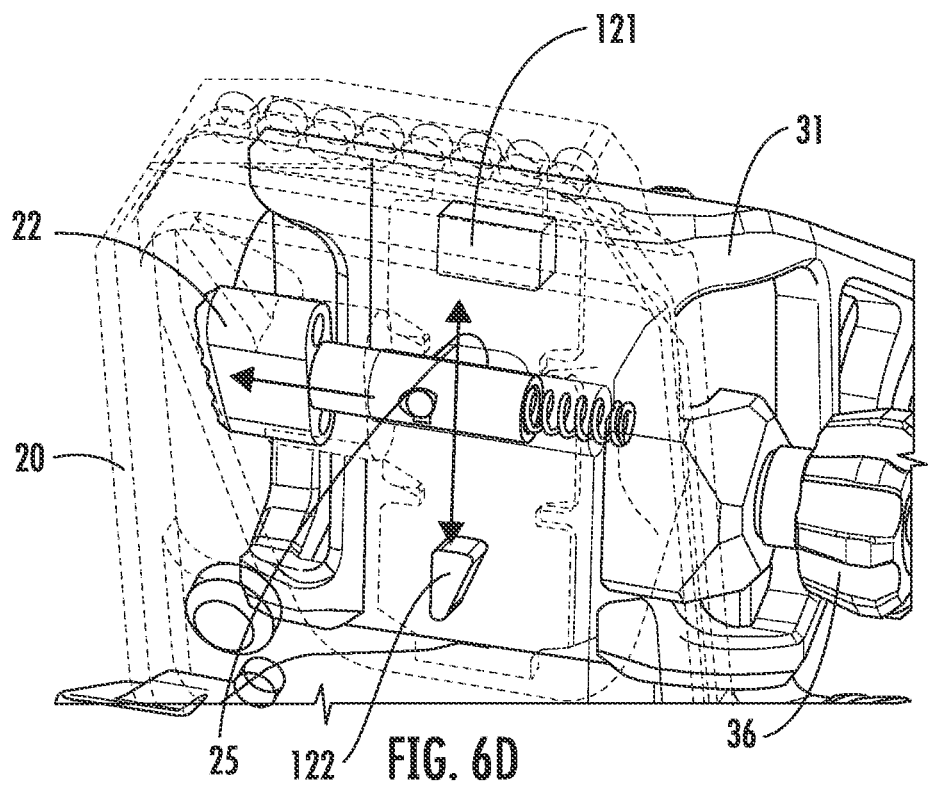
Figure 7A:
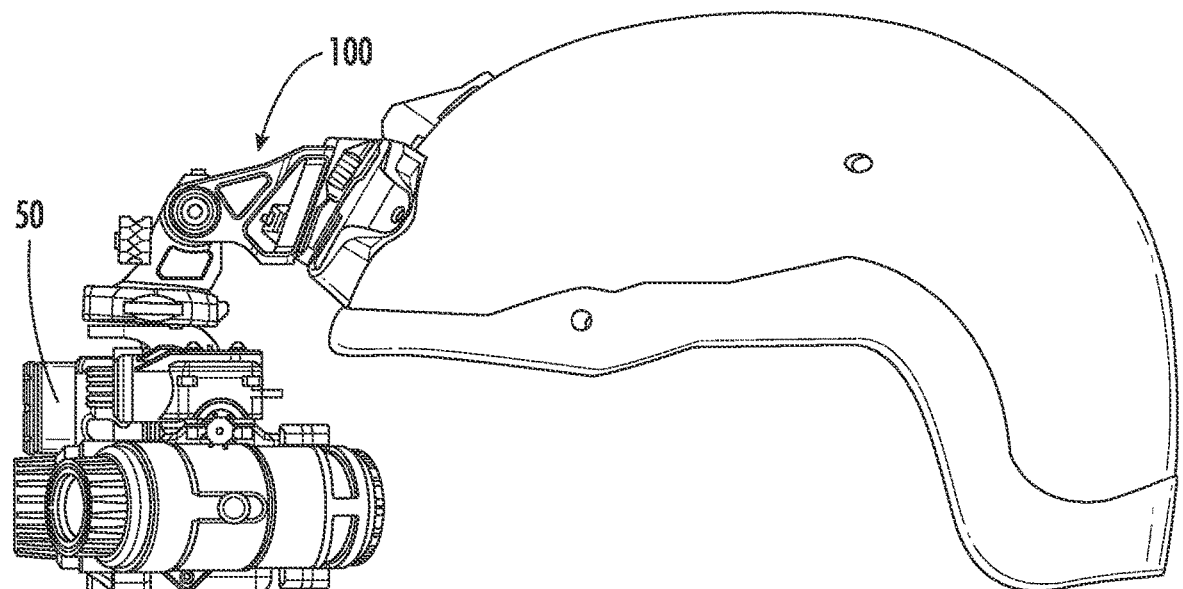
FIG. 7A is a side view of the mounting system shown in FIG. 1 illustrating a vertically downward adjustment according to embodiments of the present invention.
Figure 7B:
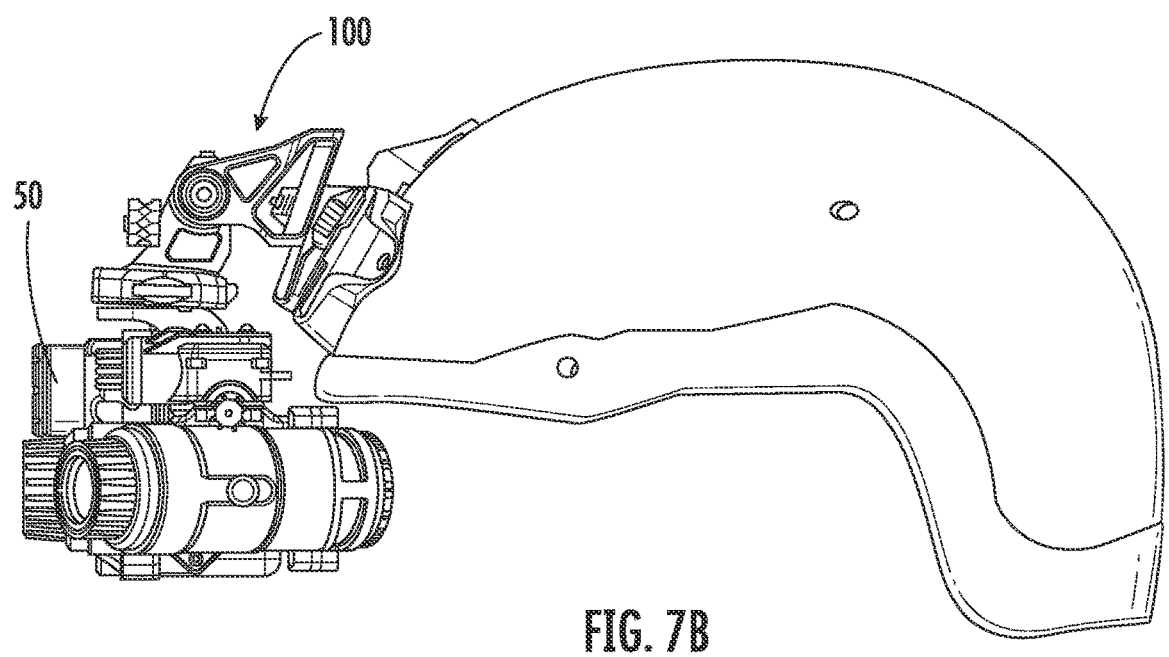
FIG. 7B is a side view of the mounting system shown in FIG. 1 illustrating a vertically upward adjustment according to embodiments of the present invention.

Turning now to FIGS. 6A-6D, example movements (shown by the arrows) of cooperating components providing the mount release are shown. When the mount release button 22 is pushed inward, the shaft 22*s* pushes the pin 25 laterally inward in the slot 26, allowing the rear 31*r* of the gantry 31 to slide up past the lower stop 122 with the pin 25 on the inside of and clearing the lower stop 122 to allow a user to remove the gantry and carriage assembly 30, with the mount plate 40 and goggle 50, from the shroud adapter assembly 20 and hence the helmet 11. FIG. 6D illustrates the vertical release button 22 in a non-deployed state with the release pin 25 in the slot 26 in line with (shown by the longitudinally extending center arrow) both stop surfaces of the upper and lower stops 121, 122.

Figure 10:
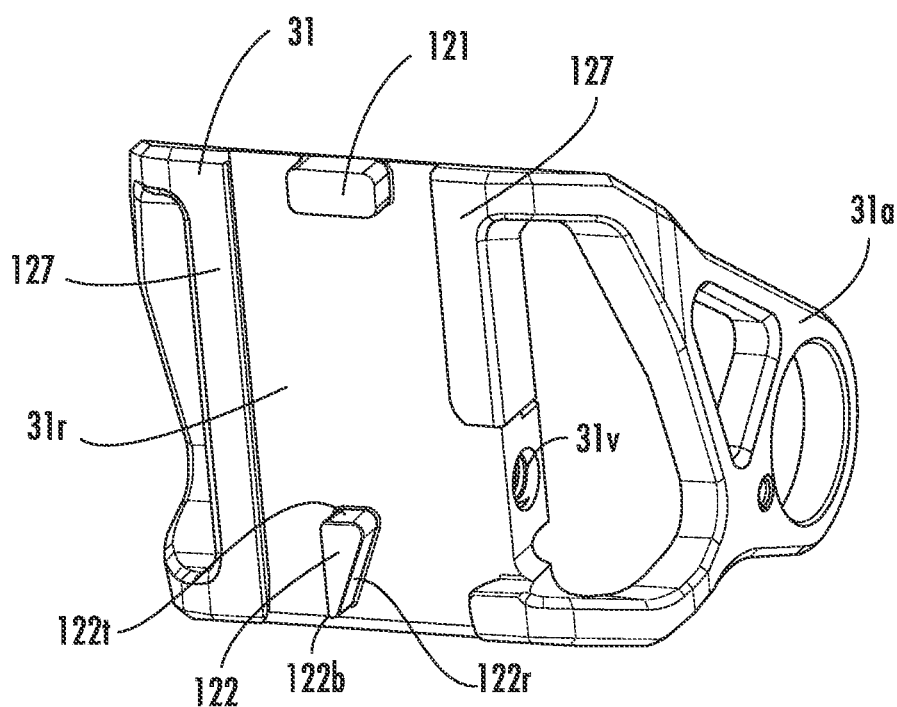
FIG. 10 is an enlarged rear view of the gantry shown in FIG. 8 according to embodiments of the present invention.

When the gantry 31 of the gantry and carriage assembly 30 is slidably coupled to the shroud adapter assembly 20, the release pin 25 travels up a ramp (tapered inner wall or surface) 122*r* of the lower stop 122 that increases in lateral extent from a bottom 122*b* to a top 122*t* thereof of the lower stop 122 (FIG. 10), which pushes the release pin 25 laterally inward, then the release pin 25 is released to automatically travel laterally outward above the lower stop 122 as the spring 29 pushes the release pin 25 to travel in the slot 26 and pushes the mount release button 22 outward to lock the body 20*b* of the shroud adapter assembly 20 to the gantry 31 between upper and lower stops 121, 122 (FIG. 6D). In some embodiments, the upper stop 121 may alternatively or also have a similar geometry to that of the lower stop 122 (i.e., tapered inner wall or surface) and is configured to cooperate with the release pin 25 to guide the release pin 25 to a desired position as the release pin 25 slides with the gantry 31 relative thereto.

Turning now to FIGS. 7A, 7B, 8, 9A-9C and 10, the vertical adjustment assembly 30*v* is discussed further. The vertical adjustment provided by the vertical adjustment assembly 30*v* allows a user to align the optical axis of the goggle 50 with an optical axis of their eye (eyes). The vertical adjustment assembly 30*v* is configured to provide a device release whereby components of the vertical adjustment assembly 30*v* are configured to release the vision mounting system 100 from the shroud adapter assembly or other target mating structure 20. The vertical adjustment assembly 30*v* comprises the vertical adjustment knob 36 which is coupled to a laterally extending screw 132 and clamp 131. The vertical adjustment assembly 30*v* is attached to the gantry 31 and cooperates with the longitudinally extending rails 27 provided by the shroud adapter assembly 20.

As shown, the gantry 31 has a rear surface 31*r* with the upper (vertical travel) stop 121 and the lower (vertical travel) stop 122, and the rails 127 that slidably cooperate with the rails 27 of the shroud adapter assembly 20. The gantry 31 also provides a pair of hinge attachment arms 31*a* that project forward from the rear surface 31*r* and slidably receive components of the hinge assembly 30*h* (FIG. 26A) as will be discussed further below.

Figure 11A:
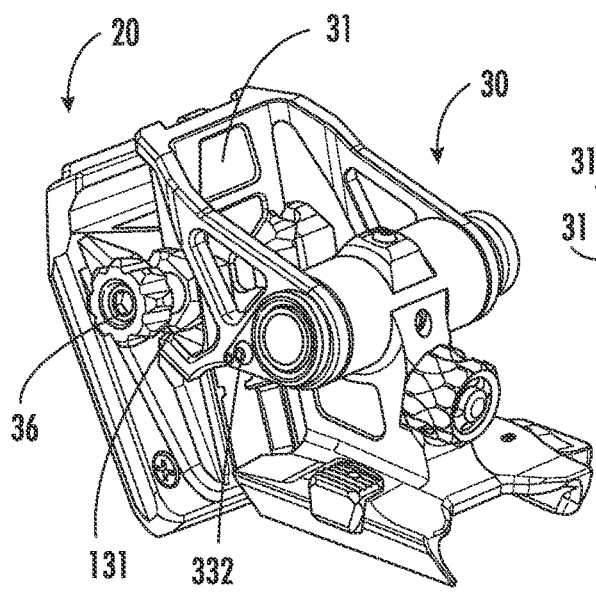
FIG. 11A is a side perspective view of the shroud assembly and gantry and carriage assembly shown in FIGS. 9A and 9B.
Figure 11B:
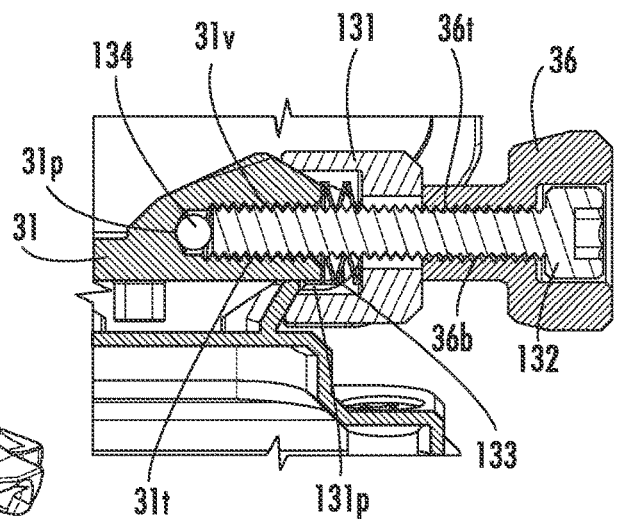
FIGS. 11B and 11C are section views of the vertical adjustment subassembly shown in FIG. 8 cooperatively coupled to the shroud assembly shown in FIG. 11A, with FIG. 11B illustrating the vertical adjustment knob turned, which disengages the clamp as shown in FIG. 11C, allowing for sliding vertical adjustment according to embodiments of the present invention.
Figure 11C:
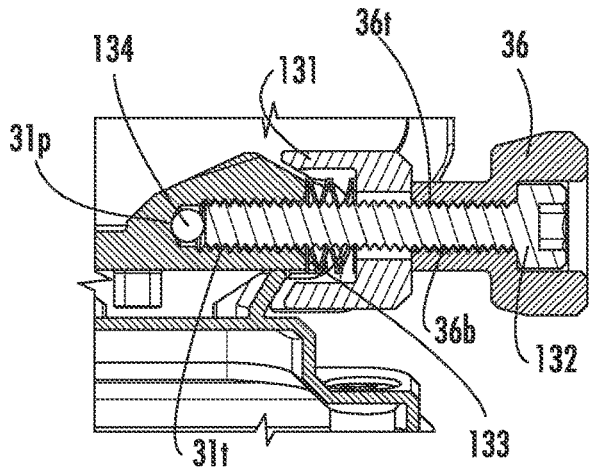

The vertical adjustment assembly 30*v* also includes a spring 133 and a spacer 134. The spring 133 can reside inside an open pocket 131*p* of the clamp 131. The spring 133 can be a wave spring 133*w*. The gantry 31 has a laterally extending internal channel 31*v* with a threaded inner wall segment 31*t* (FIGS. 11B, 11C, for example) on one side that holds a sub-length and end segment of the screw 132 of the vertical adjustment assembly 30*v*. The spacer 134 can be configured as a ball bearing held in a pocket 31*p* formed at the inner end portion of the channel 31*v*. The spacer 134 can be provided in different sizes, with one of the different sizes selectable at manufacturing to maintain the spacer 134 as a stand-off against the bottom of the channel 31*v* and position the spacer 134 firmly against both the boss 33 and the inner end of the screw 132 thereby providing assembly tolerances.

Figure 11D:
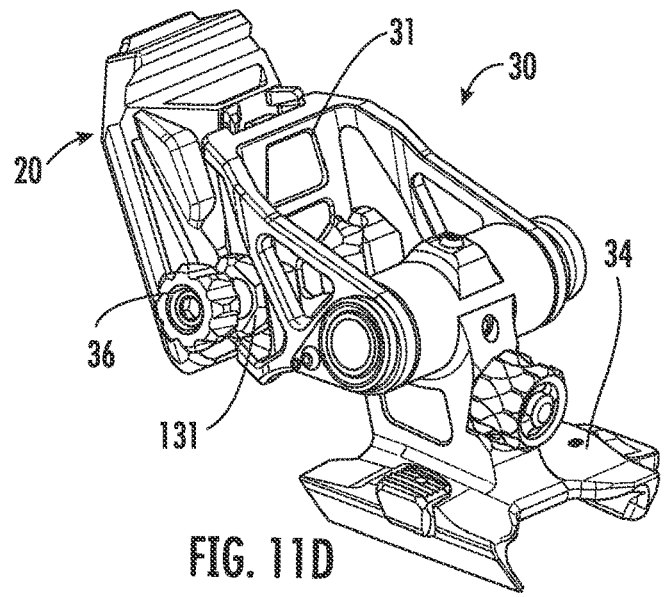
FIG. 11D is a side perspective view of the shroud assembly and gantry and carriage assembly shown in FIG. 11A, with the gantry and carriage assembly slid down relative to the shroud adapter assembly.

The screw 132 can be affixed to be stationary and can extend laterally into the gantry 31 inside a bore 36*b* of the vertical adjustment knob 36 and a center through aperture 131*a* of the clamp 131, through an open center channel 133*c* in the spring 133. The bore 36*b* of the knob 36 can have a threaded inner wall 36*t* that cooperates with the threads of the screw 132. The knob 36 is rotatable about the (fixed) screw 132 to move the clamp 131 laterally inward and laterally outward between a locked position FIGS. 11A, 11B, and an unlocked position FIGS. 11C, 11D. In some embodiments, the knob 36 and screw 132 may be formed as a single integral component that is rotatable to move the clamp 131 laterally, captive within the gantry 31. In the unlocked position, the clamp 131 is an unclamped position, and the gantry 31 can slide freely up or down relative to the shroud adapter assembly 20 and along the rails 27. When tightened, the knob 36 applies a force to the clamp 131 which provides a clamping force against an adjacent rail 27 of the shroud adapter assembly 20 and a matching feature on the gantry 31, locking the gantry 31 into position. When the knob 36 is loosened, the spring 133 pushes the clamp 131 laterally outward from the adjacent rail 27 of the shroud adapter assembly 20 to prevent interference with the sliding vertical adjustment between the upper and lower stops 121, 122.

Figure 12:
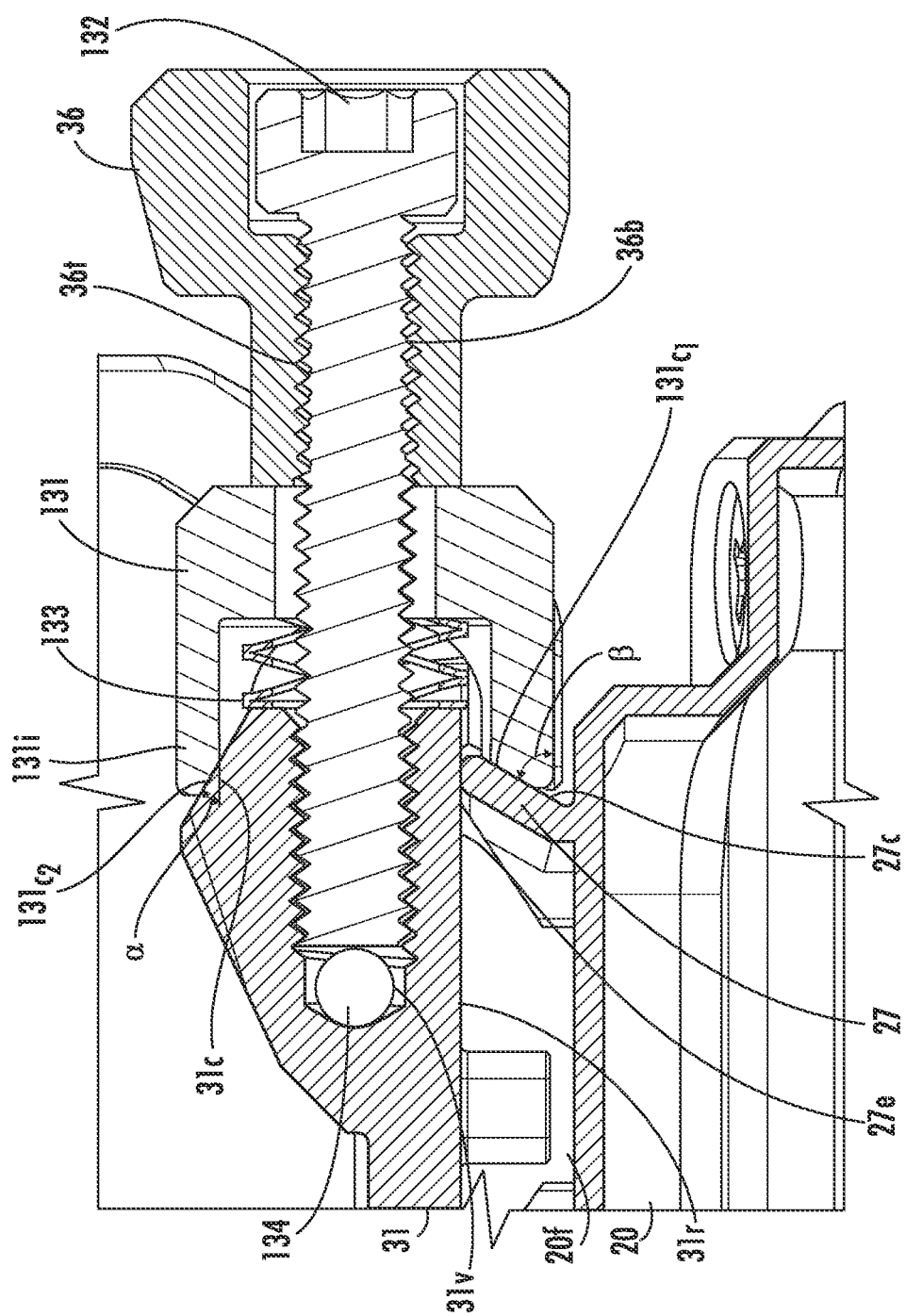
FIG. 12 is a greatly enlarged partial section view of the vertical adjustment assembly and shroud adapter assembly interface according to embodiments of the present invention.

FIG. 12 is greatly enlarged to illustrate first and second clamping surfaces 131$c_1$, 131$c_2$ provided by the inner facing end 131*i* of the clamp 131 and a clamping surface 27*c* provided by a rail 27 of the shroud adapter assembly 20 and a clamping surface 31*c* provided by the gantry 31. The rear or back surface 31*r* of the gantry 31 is pulled tightly against the outer facing end 27*e* of the adjacent rail 27. The clamping surface 27*c* can project outwardly from the front face 20*f* of the shroud adapter assembly 20 at a clamping angle that corresponds to the clamping angle of the neighboring clamping surface 131$c_1$ of the clamp 131. The outer or second clamping surface $131c_2$ of the clamp 131 and the adjacent clamping surface 31c of the gantry 31 can extend at a clamping angle α (measured from horizontal in the orientation shown) that is less than the clamping angle β (measured from horizontal in the orientation shown) of the inner clamping surfaces 27c, $131c_1$. In some embodiments, the angle β may be equal to or less than angle α. This configuration can increase a force component of the clamping force that holds the back surface 31r of the gantry 31 in contact with the end 27e of the rail 27 of the shroud adapter assembly 20. Where disparate clamping angles are used, this can also or alternatively allow the vertical adjustment assembly 30v to absorb misalignment and/or manufacturing tolerance issues.

Figure 13:
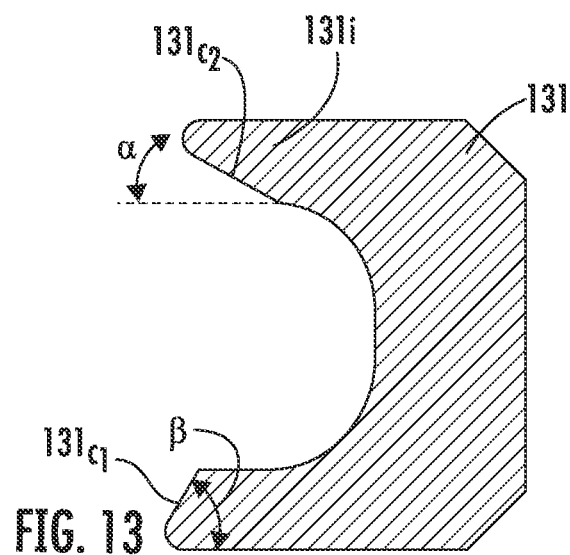
FIG. 13 and FIG. 14 are side views of example alternate clamp configurations for the vertical adjustment assembly shown in FIG. 12 according to embodiments of the present invention.
Figure 14:
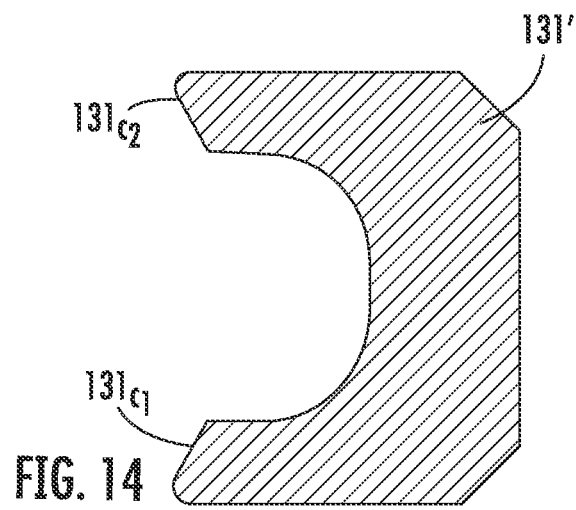

FIG. 13 illustrates the clamp 131 shown in FIG. 12. FIG. 14 shows an alternate embodiment of the clamp 131' with the clamp surfaces $131c_1$, $131c_2$ having the same clamping angle, as would the corresponding clamping surfaces 27c, 31c of the rail 27 and gantry 31, respectively (not shown).

Figure 15A:
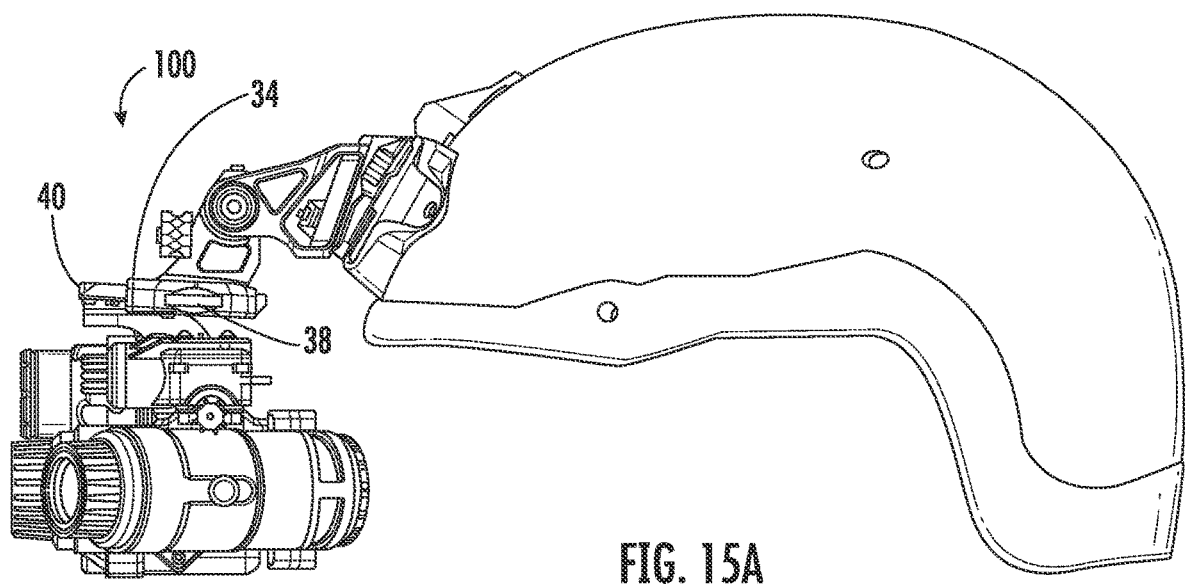
FIG. 15A is a side view of the mounting system shown in FIG. 1 illustrating a fore position of a fore/aft adjustment according to embodiments of the present invention.
Figure 15B:
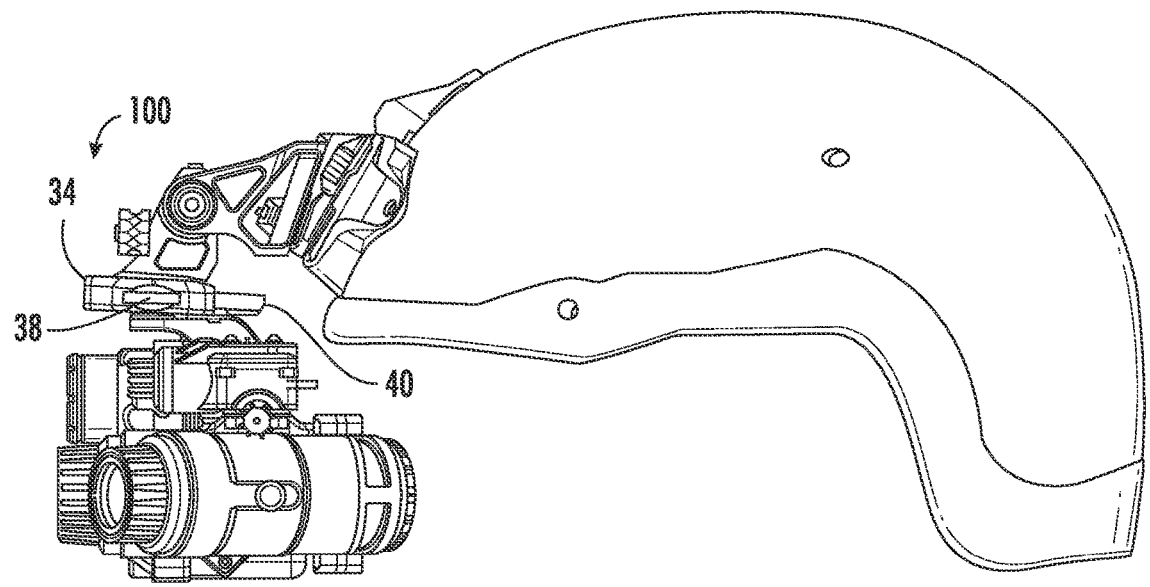
FIG. 15B is a side view of the mounting system shown in FIG. 1 illustrating an aft position of a fore/aft adjustment according to embodiments of the present invention.
Figure 16:
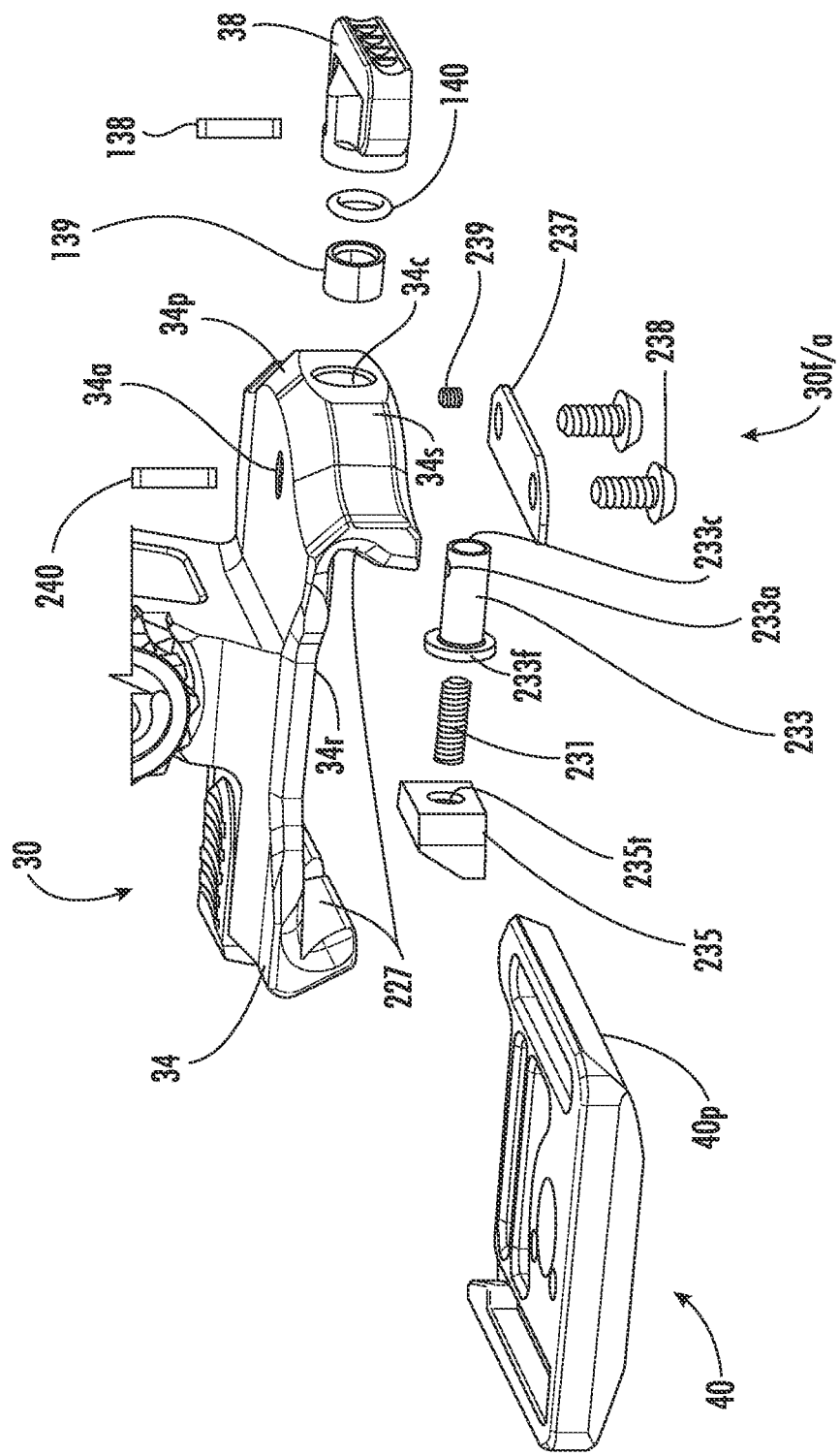
FIG. 16 is an exploded view of the fore/aft adjustment assembly provided by the gantry and carriage assembly aligned with the goggle mount plate shown in FIG. 1 according to embodiments of the present invention.
Figure 18A:
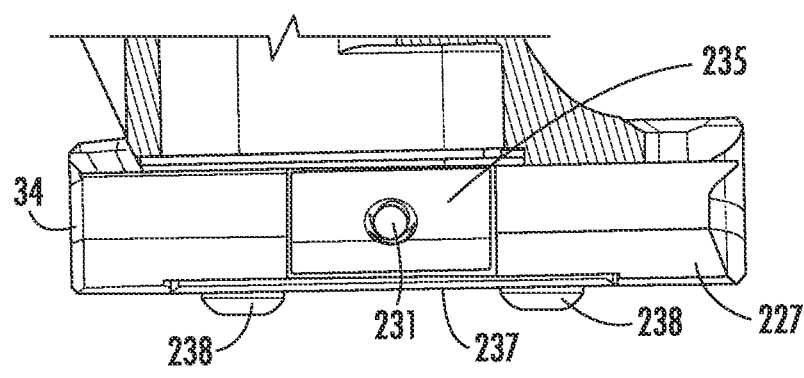
FIG. 18A is an enlarged partial section side view of the gantry and carriage assembly of FIG. 17A.
Figure 18B:
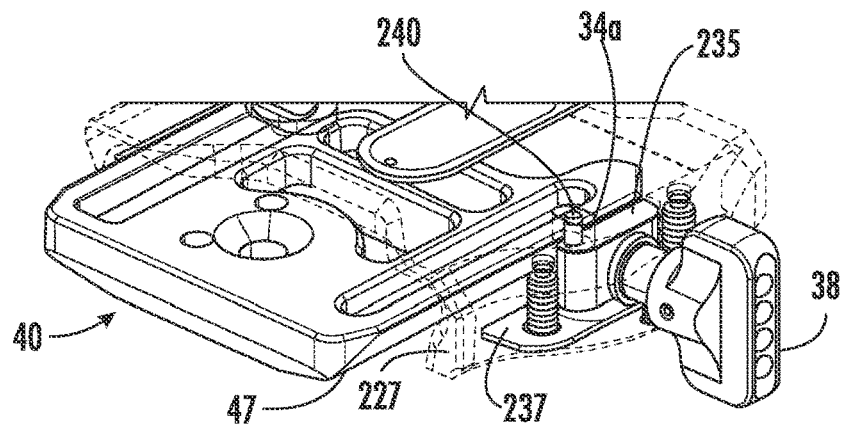
FIG. 18B is an enlarged partially transparent top, side perspective view of the fore/aft adjustment assembly shown in FIG. 16 coupled to the device mount plate shown in FIG. 17B.

Turning now to FIGS. 15A, 15B and 16, an example embodiment of a fore/aft adjustment and corresponding fore/aft adjustment assembly 30f/a with the fore/aft adjustment knob 38 for allowing the positional adjustment of the device mount plate 40 with respect to the carriage 34 is shown. The fore/aft adjustment assembly 30f/a is configured to provide a vision device release whereby components of the fore/aft adjustment assembly 30f/a are configured to release the vision device from the vision mounting system 100. FIG. 15A illustrates an example fore position and FIG. 15B illustrates an example aft position provided by the fore/aft adjustment assembly 30f/a. The fore/aft adjustment allows a user to position the mounting system 100 with the proper eye relief and to accommodate other equipment such as eye protection or gas mask. The device mount plate 40 may be permanently affixed to the night vision goggle 50. The night vision goggle 50 moves fore and aft by sliding the device mount plate 40 relative to the carriage 34. The device mount plate 40 can cooperate with the fore/aft adjustment assembly 30f/a to provide an auto-engagement feature as will be discussed further below.

Referring to FIGS. 16, 17A-17C, 18A-18B, 19A and 19B, the fore/aft adjustment assembly 30f/a comprises rails 227, optionally configured as dovetail rails, on an outer perimeter 34p of a bottom of the carriage 34. The rails 227 extend in a front to back direction on opposing sides of a recessed region 34r on the bottom of the carriage 34. The mount plate 40 comprises an outer perimeter 40p configured to mateably engage the rails 227 of the carriage 34. The outer perimeter 40p can have opposing sides 47 that are tapered to define rails 47 such as corresponding dovetail rails 47 that slidingly engage the rails 227 of the bottom of the carriage 34.

The carriage 34 can have a lower end portion with laterally spaced apart right and left sides with corresponding right and left side rail 227 that extend in a front to back direction and that slidably, interchangeably and serially couple to first and second different configurations of device mount plates 40 thereby attaching different types of goggles 50 or other vision devices to the system.

One side of the perimeter 34p of the bottom of the carriage 34 can have a shoulder 34s that projects laterally outward further than an opposing side of the carriage across the recessed region 34r and provides a laterally inwardly extending channel 34c. An adjustment screw 231 that can be configured to have a fixed position and an elongate nut 233 can extend laterally in the channel 34c connecting a clamp 235 to the knob 38. An O-ring 140 can be placed between a (polymer) bushing 139 and the knob 38 with a (polymer) bushing 139 that can also extend into the channel 34c. As used herein, the term "bushing" is used broadly to encompass a bearing such as a simple or plain bearing. The bushing 139 can extend about a sub-length of the nut 233. The bushing 139 can be pressed in/held captive in the carriage 34 and the nut 233 can slide into the bushing 139. A knob retaining fastener 138 can extend into the knob 38 and into an aperture 233a in the outer wall of the nut 233.

The screw 231 extends into a threaded channel 235t of the clamp 235. The knob 38 is connected to the nut 233, which is rotatable around the fixed screw 231, to move the clamp 235 between a locked (clamped) and unlocked position relative to the mount plate 40.

A bushing tension screw 239 can project upward from a bottom of the carriage 34 and can apply an adjustable tension onto the bushing 139. This feature allows a user a way to adjust, over time, the tightness of the bore of the channel 34c as it wears to maintain rigidity of the system as well as provide resistance to the knob 38.

Figure 19A:
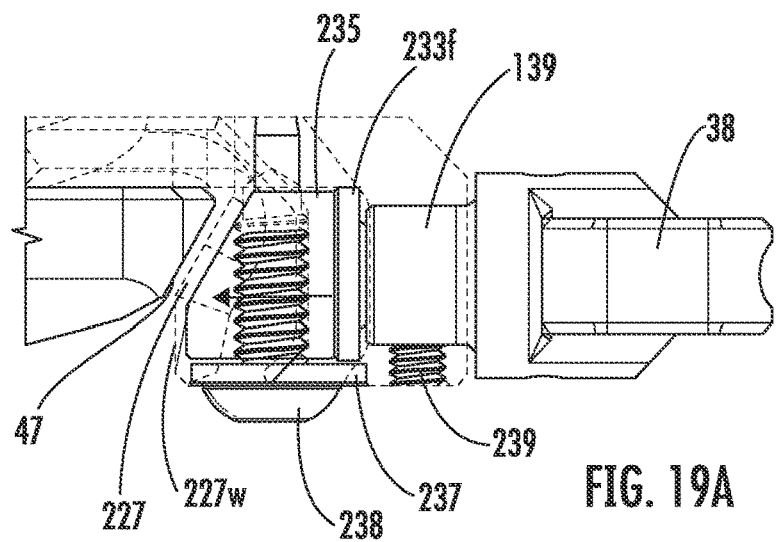
FIG. 19A is a greatly enlarged, partial transparent front view of the fore/aft adjustment assembly shown in FIG. 16, with the fore/aft adjustment knob turned to direct the clamp to move inwardly as shown by the arrow.
Figure 19B:
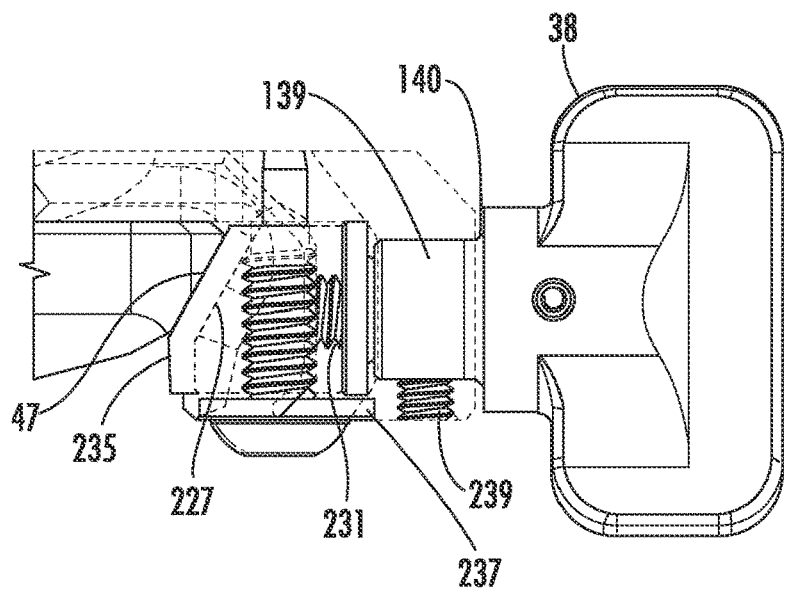
FIG. 19B is a greatly enlarged, partial transparent front view of the fore/aft adjustment assembly shown in FIG. 19A, with the fore/aft adjustment knob rotated and with the clamp moved inwardly toward the device mount plate relative to the position shown in FIG. 19A according to embodiments of the present invention.

The O-ring 140 can be configured to pre-load the fore/aft adjustment assembly 30f/a to push the assembly outward (to the right as viewed in FIG. 17A) and can also provide resistance to turning of the knob 38. The O-ring 140 can reduce the need for tight assembly dimensional tolerances as it is compliant. FIG. 19A shows the clamp 235 in a retracted position and FIG. 19B shows a deployed, locked/clamped position.

The fore/aft adjustment assembly 30f/a can also comprise a clamp retaining plate 237 affixed to the carriage 34 using fasteners 238. The retaining plate 237 can prevent downward movement of the clamp 235 while clamping. The retaining plate 237 may be optional but can provide a dirt barrier and can be made of a polymer or metal, where used. The fore/aft adjustment assembly 30f/a can also include a travel limit member 240 that extends down into a laterally elongate slot or aperture 34a in an upper surface of the bottom of the carriage 34 over the channel 34c. The travel limit member 240 can define lateral inward and outward travel limits of the clamp 235.

Another example embodiment of the fore/aft clamp mechanism 30f/a' comprises the screw 231' extending through the lateral channel 34c and is illustrated in FIGS. 43A-43E. A knob 38' can be epoxied or otherwise affixed to the screw 231'. The screw 231' and the knob 38' can comprise a screw clamp 235" that cooperates with thrust washers 3559. As used herein, the term "thrust washer" may be used interchangeably with "thrust bearing."

Figure 21:
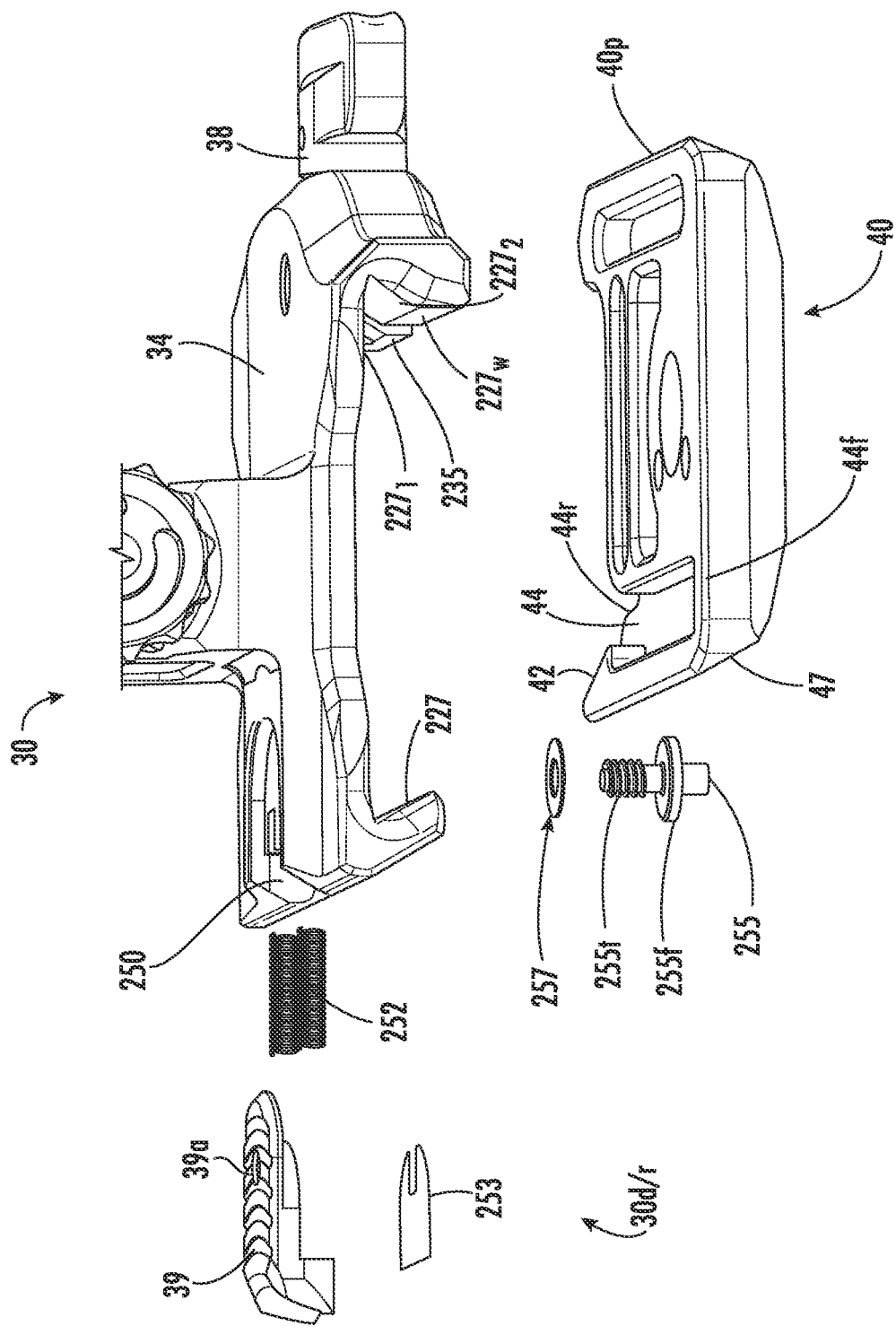
FIG. 21 is an exploded view of a device release assembly provided by the gantry and carriage assembly shown in FIG. 1 according to embodiments of the present invention.
Figure 22A:
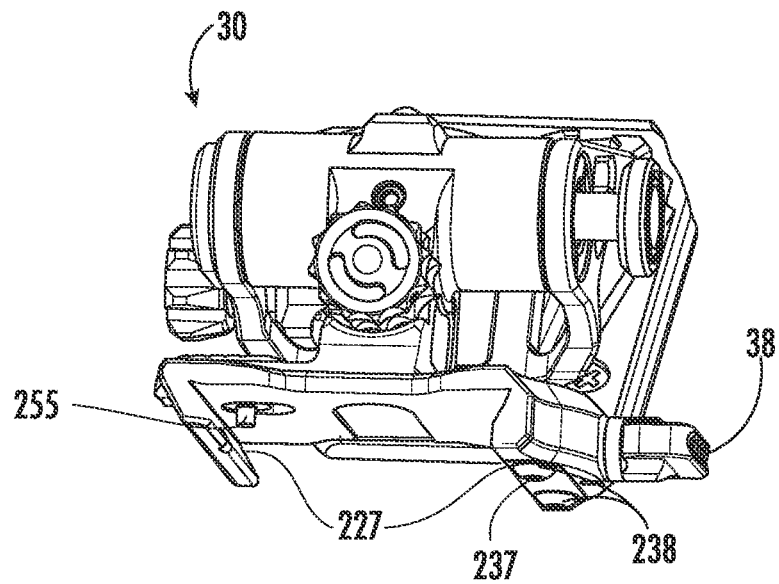
FIG. 22A is a front, bottom perspective view of the gantry and carriage assembly shown in FIG. 1 showing a fore/aft release pin according to embodiments of the present invention.
Figure 22B:
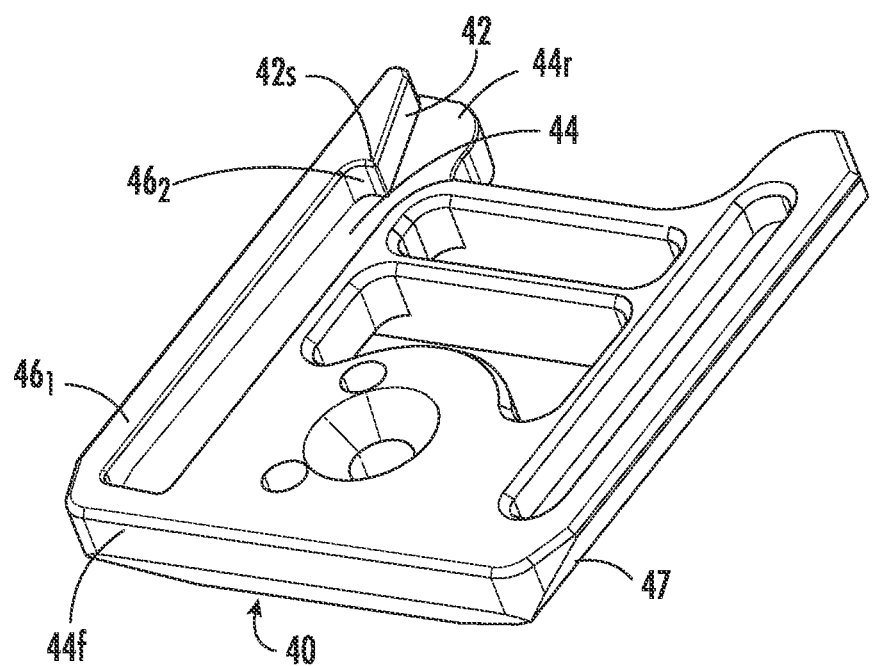
FIG. 22B is an enlarged top perspective view of the device mount plate shown in FIG. 1 illustrating features that cooperate with the fore/aft release pin shown in FIG. 22A according to embodiments of the present invention.

The screw 231' extends into the threaded channel 235t' of the clamp 235". The knob 38' and screw 231' rotate together to move the clamp 235" between a locked (clamped) and unlocked position relative to the mount plate 40. The clamp 235" has an angled profile that tapers inward from a medial to bottom portion. The carriage 34 provides clamp surfaces 227a', 227b' that are spaced apart in a front to back direction and reside on opposing sides of the clamp 235". The clamp surfaces 227a', 227b' taper inward toward each other to mateably receive and retain the clamp 235" within the carriage 34. Rotation of the knob 38' linearly translates the clamp 235" against the clamp surface 47 of the device mount plate 40. The retaining geometry in the carriage 34 (i.e., the inward taper of the clamp surfaces 227a', 227b') prevents downward movement of the clamp 235" while clamping. The fore/aft adjustment assembly 30f/a' can also include a travel limit member 240 that extends down into a laterally elongate slot or aperture 34a in an upper surface of the bottom of the carriage 34 over the channel 34c. In some embodiments, the elongate slot or aperture 34a may be offset from the channel 34c. The travel limit member 240 can define lateral inward and outward travel limits of the clamp 235". Referring to FIG. 21, one rail 227 on the side with the knob 38 can have first and second segments $227_1$, $227_2$ with the clamp 235 positioned therebetween (FIG. 21), held above the retaining plate 237, where used. The clamp 235 can be aluminum and reside beyond an outer wall 227w of the first and second segments $227_1$, $227_2$ to provide a clamp force to the device mount plate 40 (FIG. 19B) and be retracted to be flush with or recessed relative to the outer wall of the first and second segments $227_1$, $227_2$ to allow for fore/aft sliding adjustment of the mount plate 40 (FIG. 19A).

FIG. 20A schematically illustrates the carriage 34 with the clamp 235 applying a clamp force Fc against rail 47. The clamp 235, when pressed against the goggle mount rail 47, can drive the mount plate 40 against the opposing rail 227 as well as push the top surface of the mount plate 40 against a bottom surface over the recessed region 34r of the carriage 34 to lock the mount plate 40 in position on the gantry and carriage assembly 30. The friction-based clamp configuration provides a very good rigid mounting structure and tolerates dirt/grime build-up.

FIG. 20B illustrates another embodiment of the mount plate 40' and carriage 34' with the rail 227' having two angled surfaces that meet at a medial segment (in a top to bottom direction) at a valley 227v. The clamp 235' has a corresponding configuration with the clamp surface having a valley 235v. The mount plate rail 47' has corresponding angled surfaces that meet at a peak 47p at a medial segment (in a top to bottom direction) so that the peak 47p resides in the valley 227v on one side and the peak 47p resides in the valley 235v of the clamp 235'. Thus, when clamped, the clamp 235' presses the rail 47' against the opposite side rail 227', centered so that the peak 47p is in the aligned valley 227v.

Turning now to FIGS. 21, 22A, 22B, and 23A-23D, the device release assembly 30d/r is shown. The device release assembly/mechanism retains the goggle 50 in the carriage 34 of the mounting system 100, preventing the device from being removed during normal fore/aft adjustment, until the device release button 39 is depressed.

The device release button 39 is slidably coupled to a side of the carriage 34 to slide laterally inward to a release position and outward to a lock position. The device release assembly 30d/r comprises a downwardly (vertically) extending pin 255 coupled to the device release button 39. A laterally extending biasing member 252, such as a spring(s) is/are coupled to the button 39 and held in a cavity 250 of a bottom portion of the carriage 34 above one rail 227, on a side opposing the knob 38. In some embodiments, the device release assembly 30d/r may reside on the same side of the carriage 34 as the knob 38. The pin 255 can be coupled to the button 39 with a spacer 257 positioned about a flange 255f of the pin 255 beneath a threaded shaft 255t. A planar elongate button spacer 253 can be positioned over the spring(s) 252 and under the button 39 in the cavity 250 of the carriage. The spacers 257, 253 may be optional.

The pin 255 can slidably engage a channel 44 in the mount plate 40, that extends in a front to back direction. The channel 44 can have an open rear end 44r and a closed front end 44f. A ramp 42 that tapers inwardly to define a laterally extending step 42s can reside adjacent the open rear end 44r. The fore and aft travel limits 46 can be defined by the step 42s and forward closed end 44f of the channel 44. The pin 255 can slide laterally in a laterally extending channel 251 provided by the carriage 34, under the button 39.

Figure 23A:
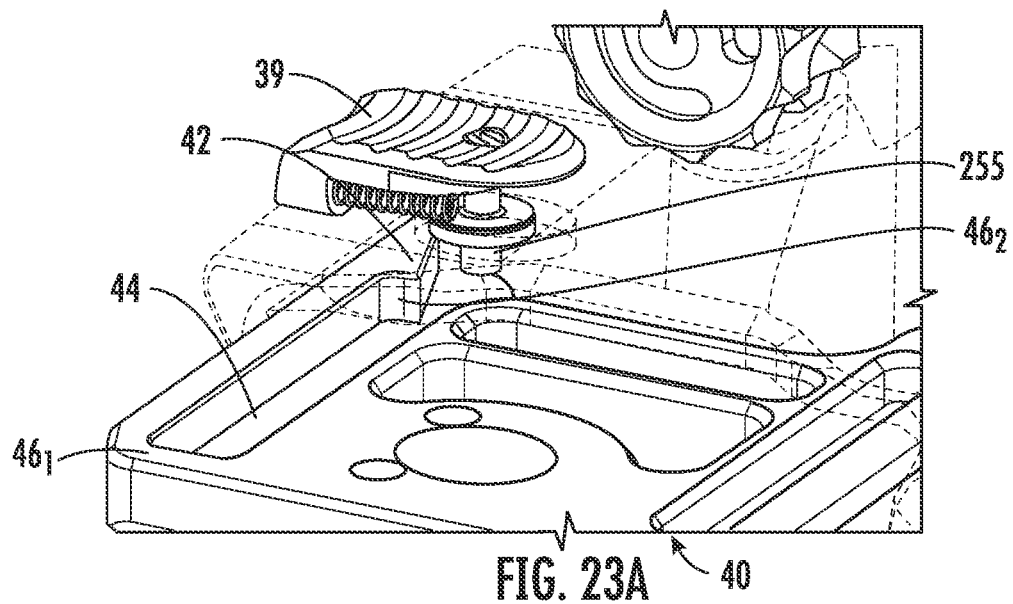
FIGS. 23A-23D are partially transparent top perspective views of the fore/aft release assembly and the cooperating features of the goggle mount plate according to embodiments of the present invention.
Figure 23B:
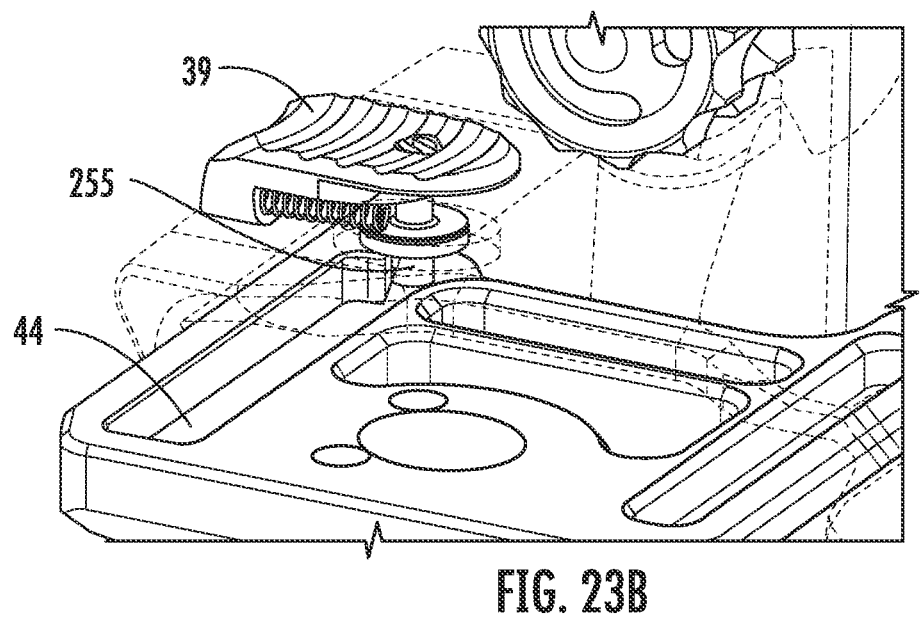
Figure 23C:
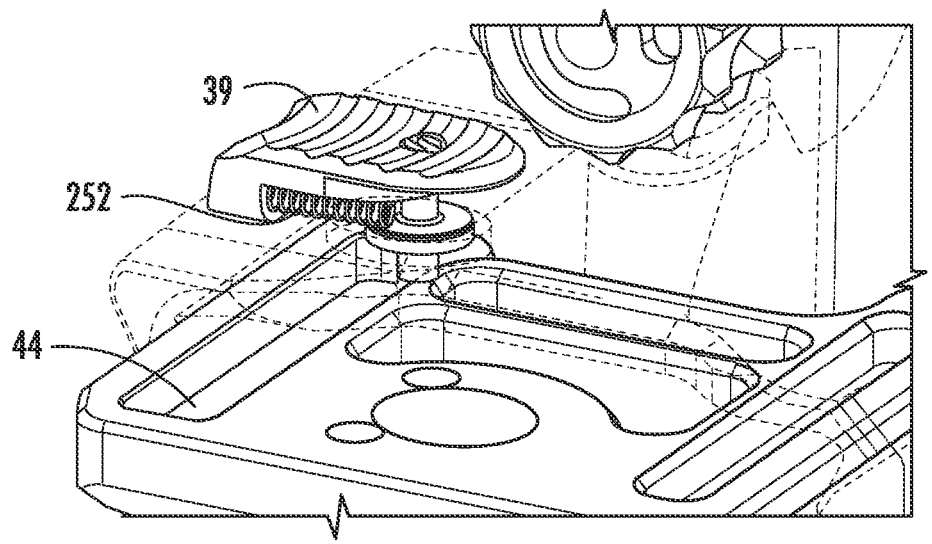
Figure 23D:
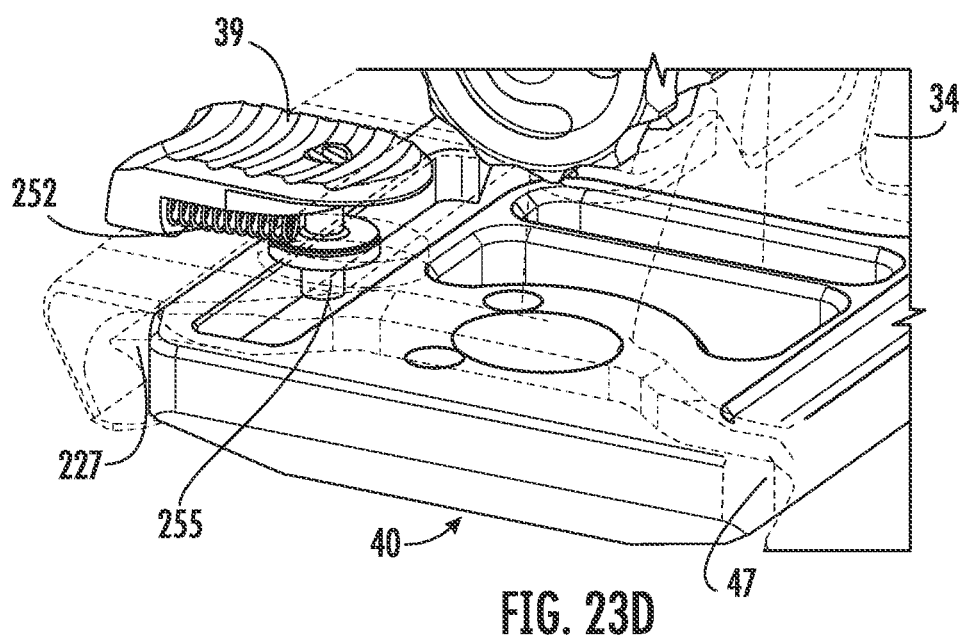

FIGS. 23A-23C illustrate that a user can depress the button 39 inward which pushes the pin 255 laterally inward in the channel 44. To disengage the mount plate 40, the mount plate 40 is slid forward to allow the pin 255 to exit the rear open end 44r after it passes the ramp 42. To attach the mount plate 40, the user slides the rear of the mount plate 40 into the front of the carriage 34. The pin 255 travels up the ramp 42 then pops into the channel 44 thereby creating an auto-engaging mechanism without requiring user interaction to push the pin 255 inward. Once the pin 255 clears the ramp 42, the pin 255 is trapped in the channel 44 in front of the stepped segment 42s which defines a travel stop. The button 39 is then moved outward by a biasing member 252, such as a spring(s), and the fore/aft release is in a locked configuration (FIG. 23D).

Figure 24:
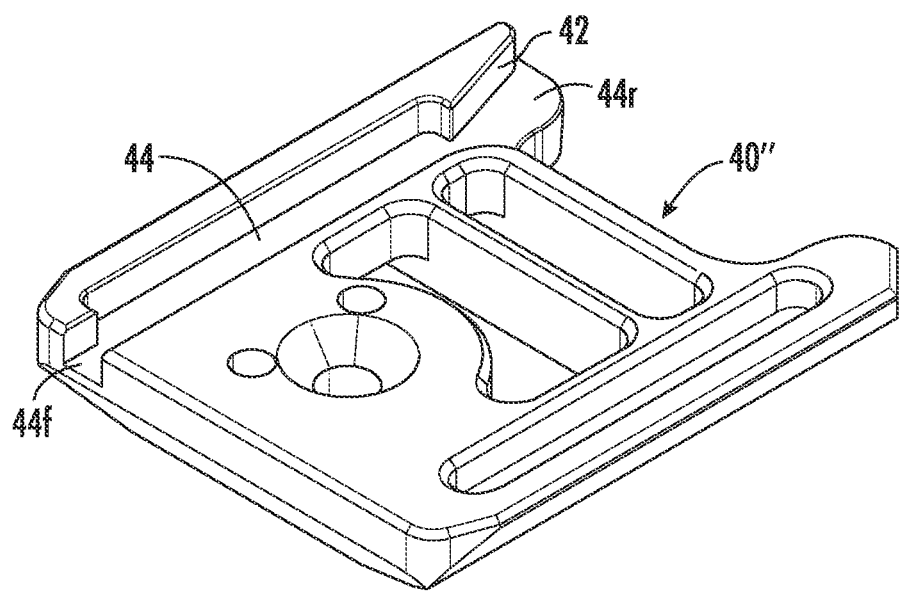
FIG. 24 is an enlarged side perspective view of another embodiment of a device mount plate according to embodiments of the present invention.

FIG. 24 illustrates another embodiment of the device mount plate 40". In this embodiment, the front 44f of the channel 44 is open, allowing the mount plate 40" to be released from the carriage 34 in the forward and rearward directions.

Figure 25:
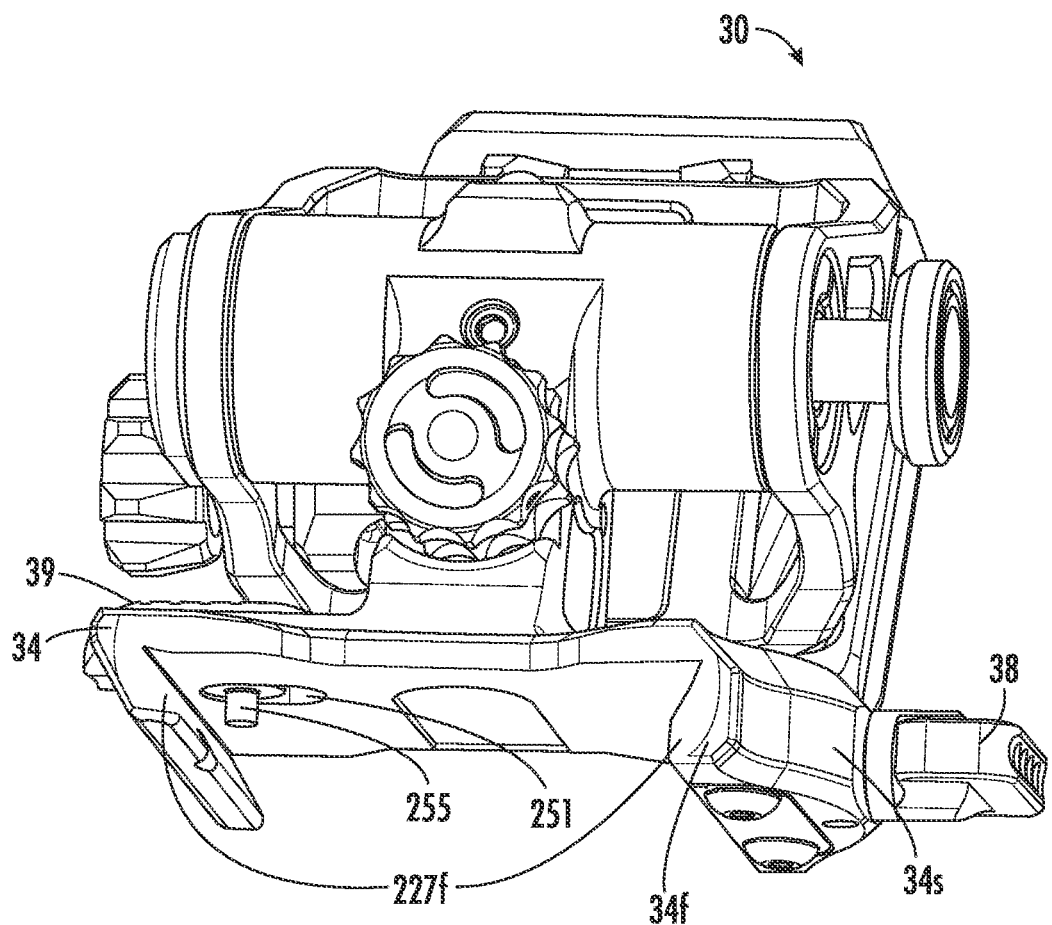
FIG. 25 is an enlarged bottom, side perspective view of the gantry and carriage assembly shown in FIG. 22A with the optional funnel channel configuration to facilitate proper orientation of a slidable entry of the goggle mounting plate according to embodiments of the present invention.

Referring to FIG. 25, a front segment 227f of the rails 227 provided by the bottom of the carriage 34 can have a funnel configuration whereby the desired entry orientation, for example, the back of the mount plate 40 slides into the front 34f of the carriage 34 which can have a funnel configuration 227f to facilitate correct orientation and ease of sliding coupling to the carriage without requiring complex indexing features, which may be dirt intolerant. However, it is contemplated that other embodiments can configure the funneling geometry on the device mount plate 40 or even omit the funnel altogether.

Figure 26A:
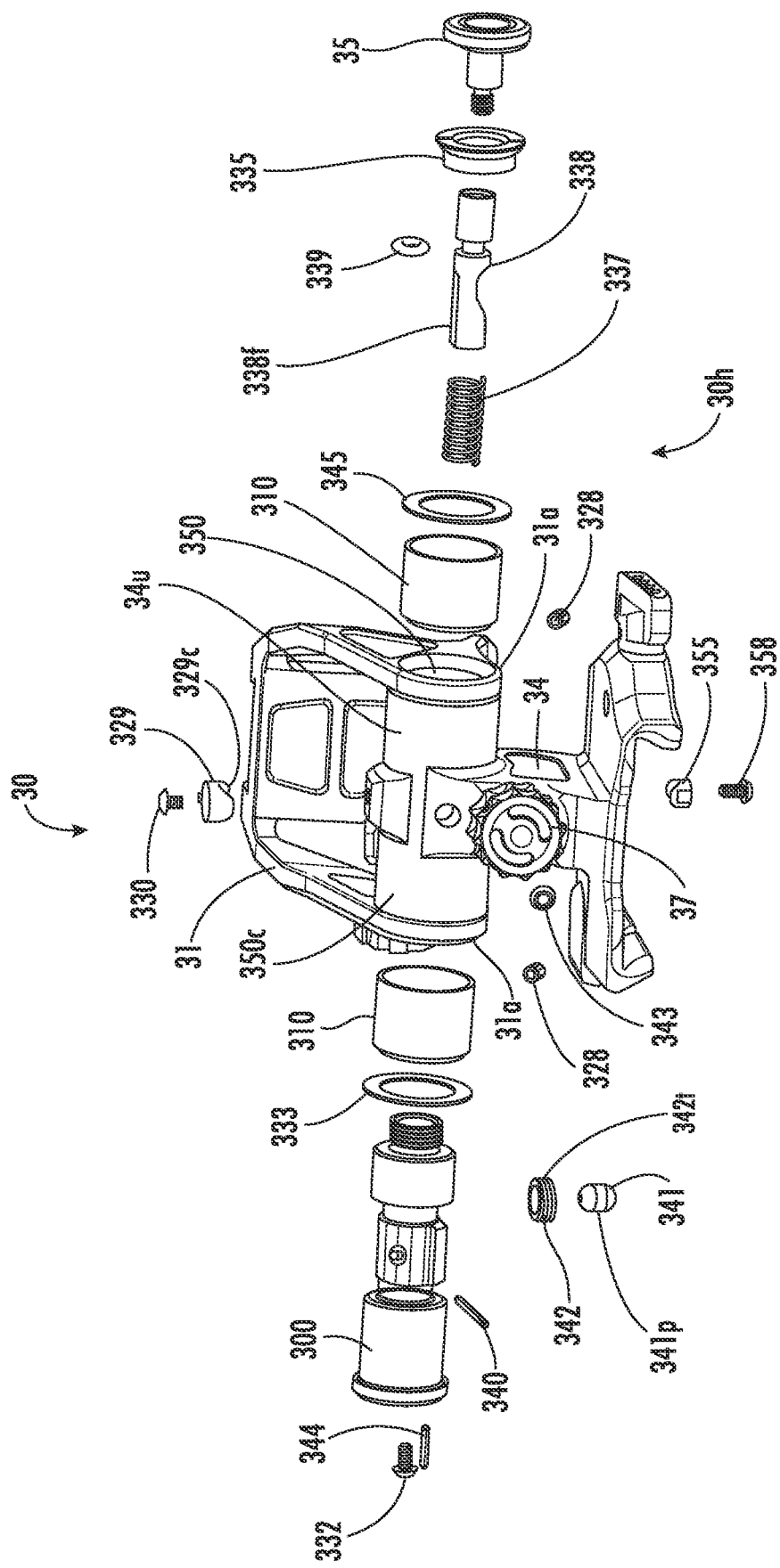
FIG. 26A is a front, side exploded view of a hinge assembly of the gantry and carriage assembly shown in FIG. 1 according to embodiments of the present invention.
Figure 26B:
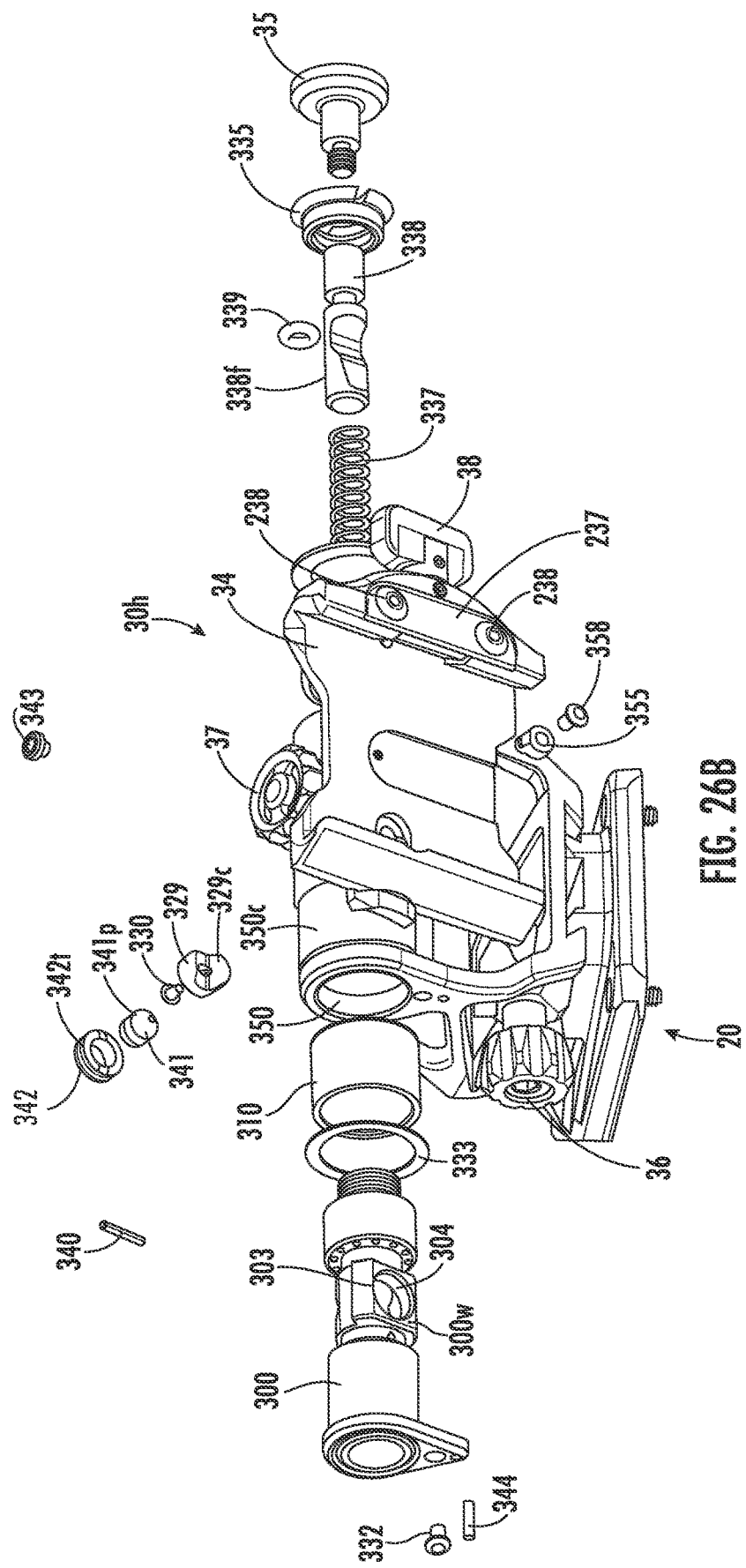
FIG. 26B is a bottom side perspective exploded view of the mounting system shown in FIG. 1.
Figure 26D:
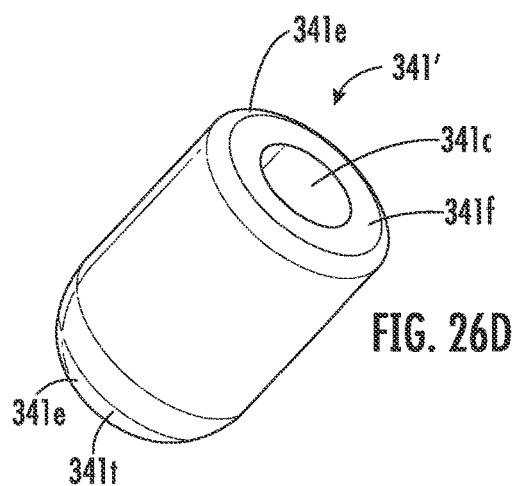
FIG. 26D is a side, end perspective view of another embodiment of a floatable interlock member according to embodiments of the present invention.
Figure 26E:
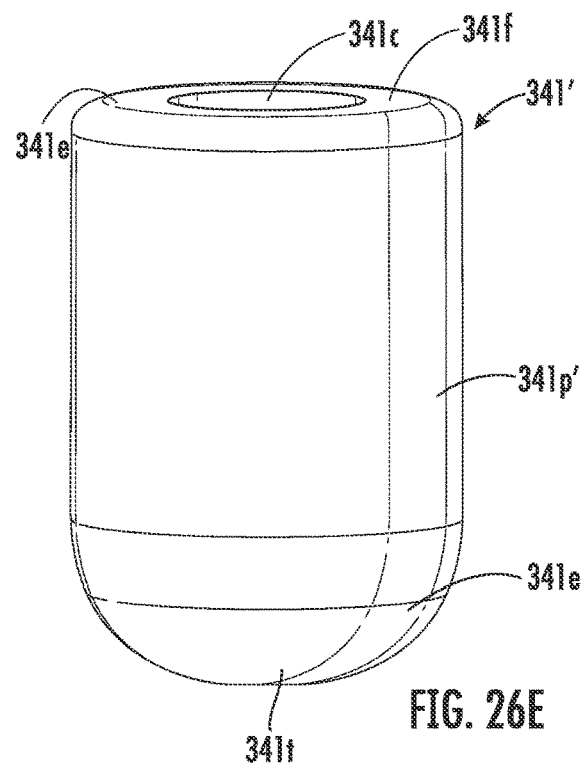
FIG. 26E is a side perspective view of the floatable interlock member shown in FIG. 26D.
Figure 26F:
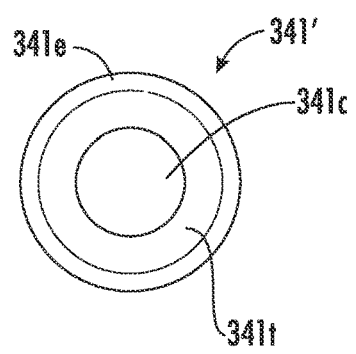
FIG. 26F is an end view of the floatable interlock member shown in FIG. 26D.
Figure 26G:
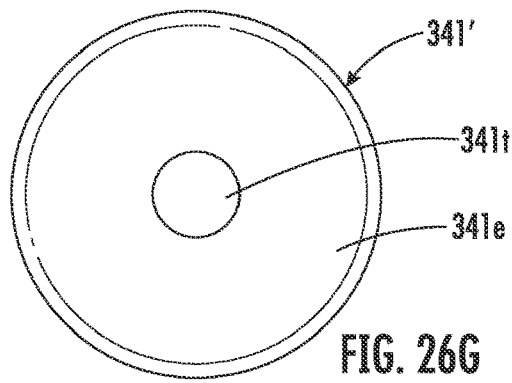
FIG. 26G is an opposing end view of the floatable interlock member shown in FIG. 26D.

Turning now to FIGS. 26A-26C, a hinge assembly 30h of the gantry and carriage assembly 30 is shown. As shown, the hinge assembly 30h comprises a hinge axle 300, bushings 310, a floatable interlock member 341, which may optionally have the form of a capsular pill 341p, and a floatable interlock sleeve 342. The term "floatable" refers to the movement of the floatable interlock between locked and unlocked positions. The term "pill" refers to an elongate rigid capsule shaped body and can have a cylindrical configuration with one or more rounded ends. However, the floatable interlock member 341 can have other configurations, such as, by way of example, a sphere.

Figure 38:
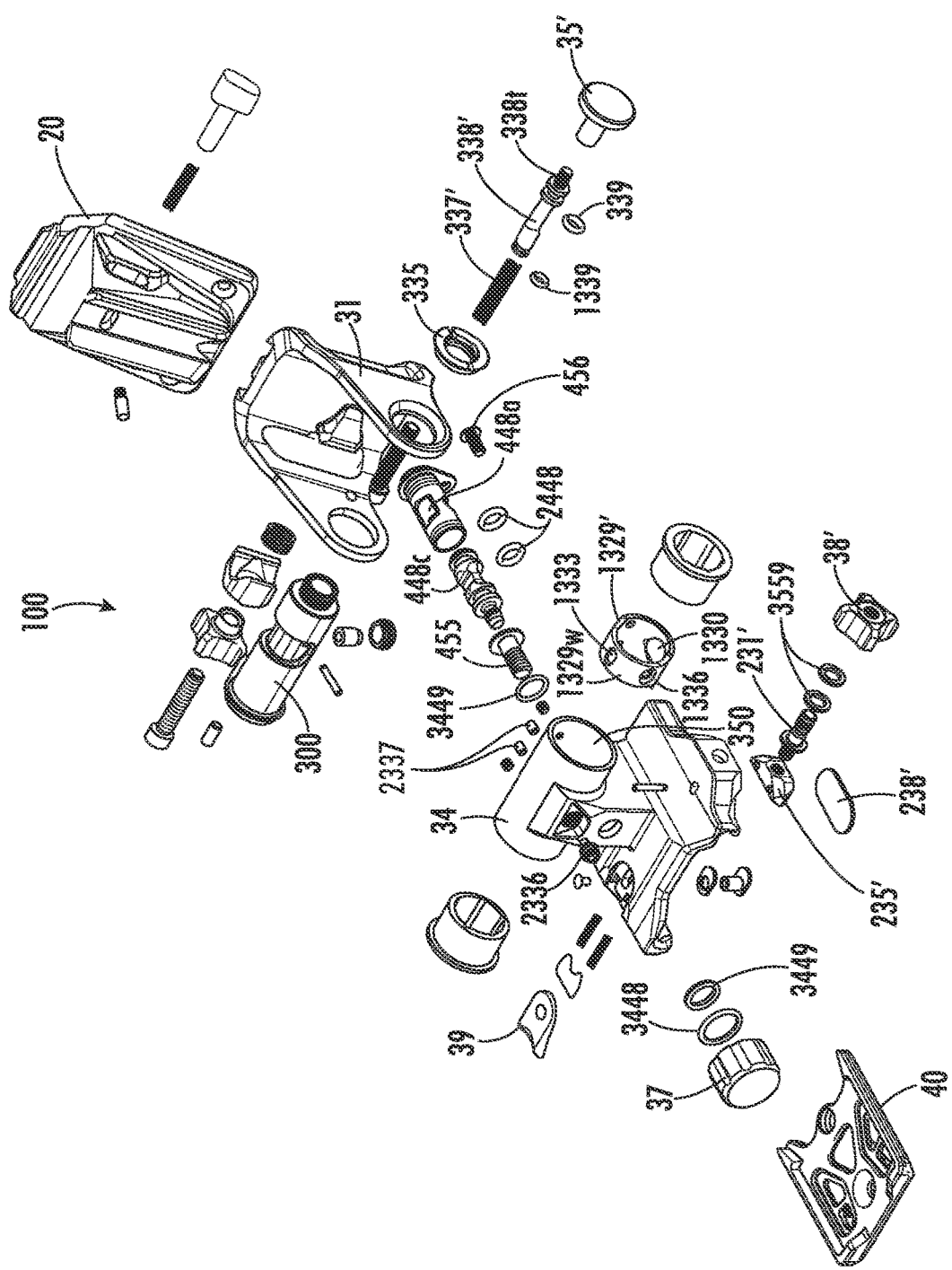
FIG. 38 is an exploded view of another embodiment of a mounting system according to embodiments of the present invention.

FIGS. 26D-26G illustrate another example embodiment of the floatable interlock member 341'. In this embodiment, the floatable interlock member 341' has axially opposing ends 341e with different shapes. One end 341e can have a rounded outer perimeter edge extending about a planar surface 341f and the other can have a tapered or dome-shaped, rounded shape 341t. The end 341e with the planar surface 341f can have an open center channel 341c. The open center channel 341c can extend a partial length of the floatable interlock member 341'. The planar end 341f can be oriented to face upward when assembled (FIG. 38). The open center channel of the floatable interlock member 341' can provide for weight reduction while the body thickness, material and shape provide sufficient structural rigidity. In some embodiments, at least one end 341e of the floatable interlock member 341' can have a curvilinear profile with rounded outer edge.

Figure 26H:
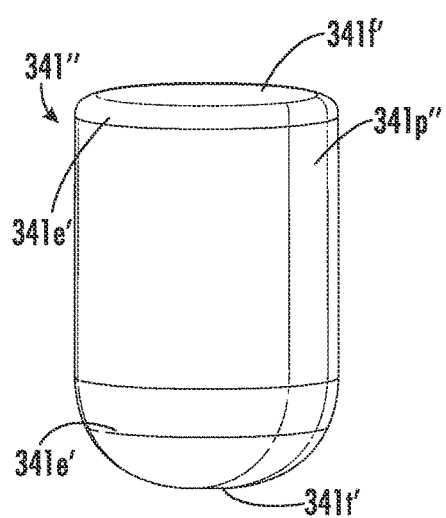
FIG. 26H is a side perspective view of another embodiment of a floatable interlock member according to embodiments of the present invention.
Figure 26I:
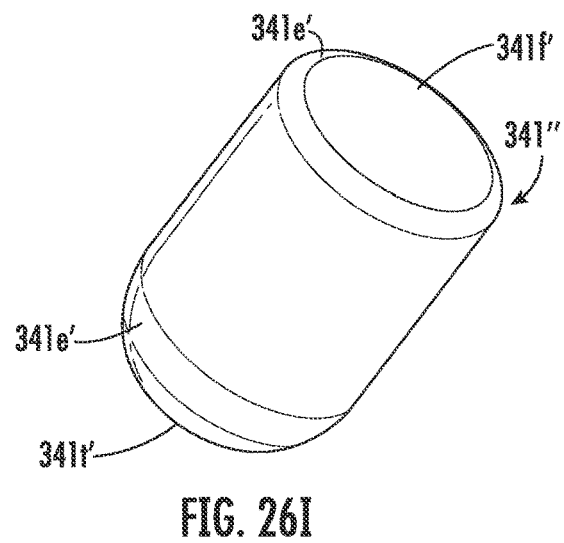
FIG. 26I is a side, end perspective view of the floatable interlock member of FIG. 26H.

FIG. 26H and FIG. 26I illustrate another example embodiment of the floatable interlock member 341". Similar to the floatable interlock member 341' described herein, in this embodiment, the floatable interlock member 341" has axially opposing ends 341e' with different shapes. One end 341e' has a rounded outer edge 341f' extending about a planar surface and/or the one end can have a curvilinear profile and the other can have a tapered or dome-shaped, rounded end 341*t'*. As shown in FIG. 26H and FIG. 26I, the floatable interlock member 341" differs from floatable interlock member 341' in that the planar surface 341*f* does not have an open center channel, i.e., the floatable interlock member 341" has a solid body.

Figure 33A:
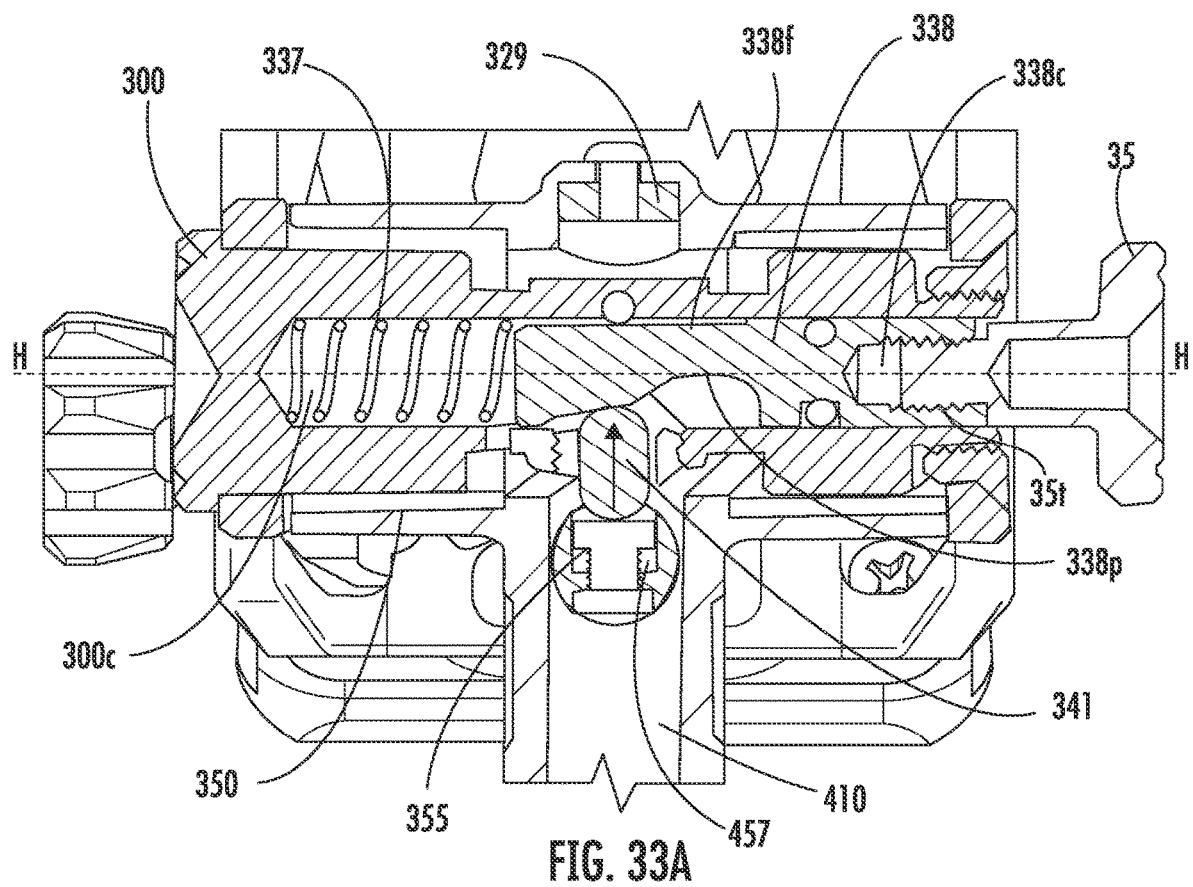
FIG. 33A and FIG. 33B are greatly enlarged section views of a portion of the gantry and carriage assembly shown in FIGS. 32A-32C, illustrating the floatable interlock member in locked and unlocked positions of cooperating components according to embodiments of the present invention.

The floatable interlock member 341, 341', 341" is formed of a rigid, non-deformable material, i.e., non-deformable at typical applied forces. The floatable interlock member 341, 341', 341" is typically formed of metal but may be formed of other materials including, but not limited to, non-metal, ceramic, high-strength polymers (with or without fiber reinforcement), and fiber-reinforced composite material. The floatable interlock member 341, 341', 341" is used to provide the tilt adjustment and the lock engagement of the carriage 34 in the deploy and stow positions because the floatable interlock member 341, 341', 341" can be directed to radially travel back and forth between locked and unlocked positions whereby in the unlocked position, the floatable interlock member 341, 341', 341" allows the carriage 34 to rotate about the hinge axis H-H (FIG. 33A). The floatable interlock member 341, 341', 341" does not rotate with the carriage 34 but travels radially in and out (up and down) along its track in the axle. The floatable interlock member 341, 341', 341" can be in the same position when interlocked in the deployed position, optionally using a tilt insert 355 as it is when interlocked in the stowed position, optionally using the stow insert or detent 329, but it doesn't need to be that way.

The carriage 34 rotates about an axially extending centerline or hinge axis H-H (FIGS. 33A, 33B) defined by the hinge axle 300 which is affixed to the gantry 31 to position the goggle 50 in the stow position FIG. 31B as will be discussed further below. The gantry 31 determines the location of the hinge axis H-H relative to the helmet 11 and dictates stow position. For ease of discussion, the term "pill" with respect to the floatable interlock member 341, 341', 341" will be primarily used below.

Figure 33B:
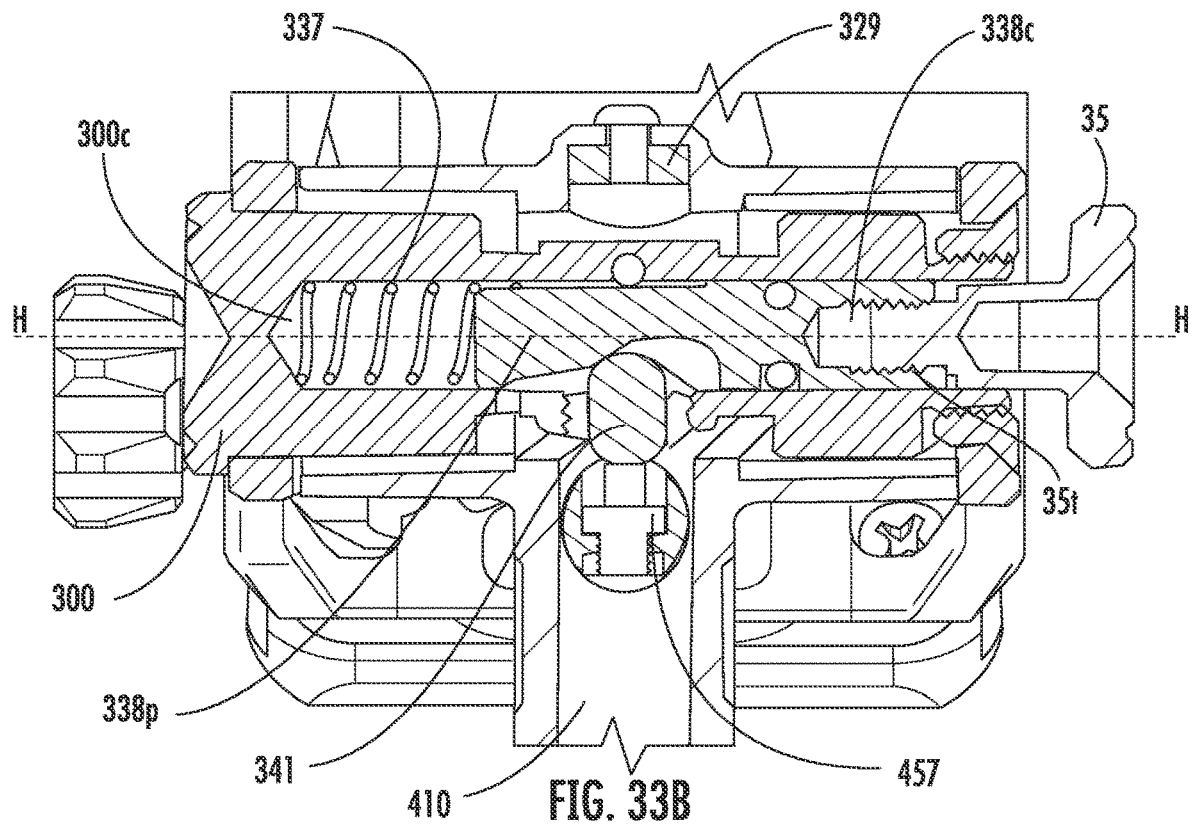
Figure 42A:
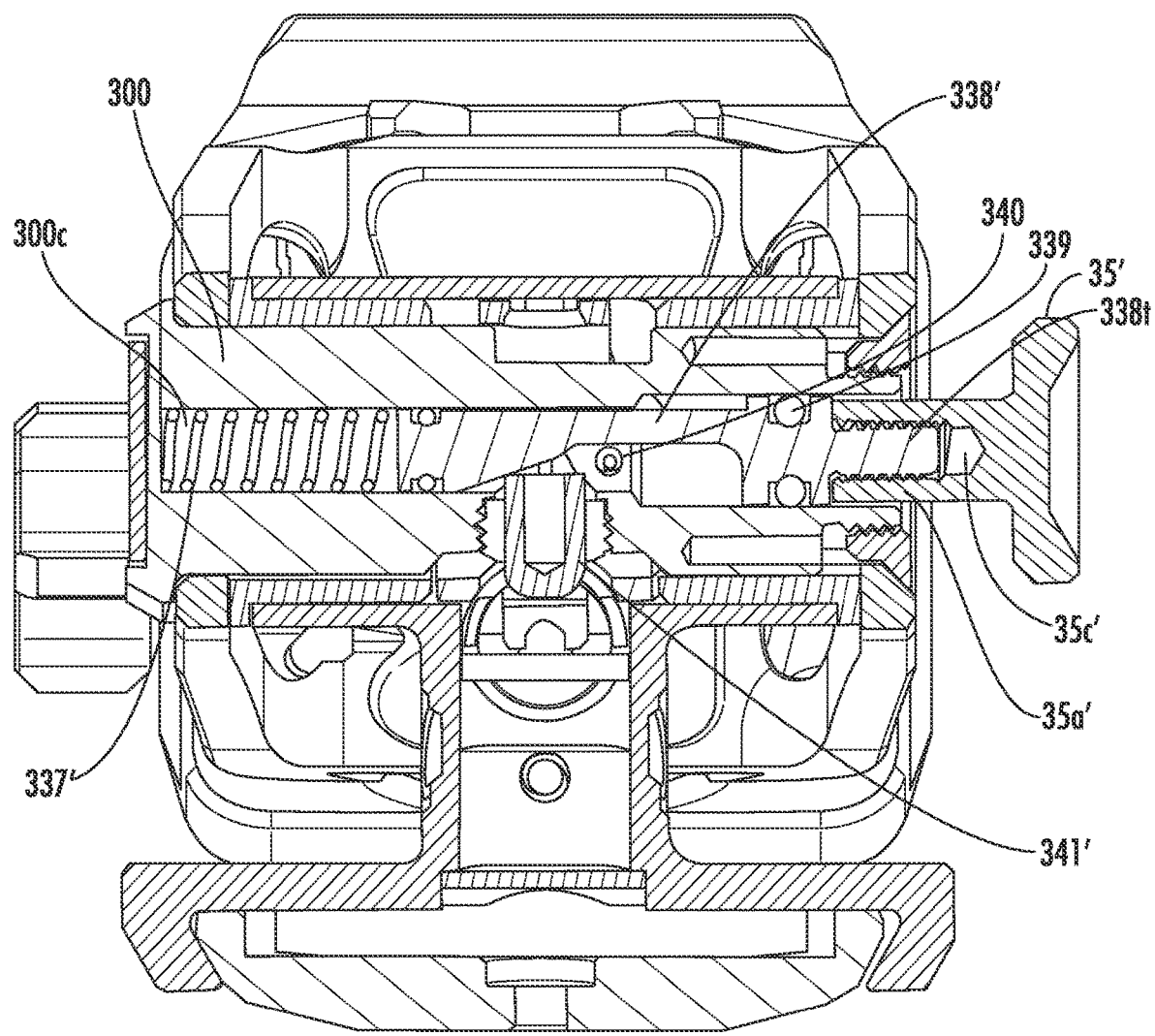
FIG. 42A and FIG. 42B are partial section views of another embodiment of the hinge assembly according to embodiments of the present invention.
Figure 42B:
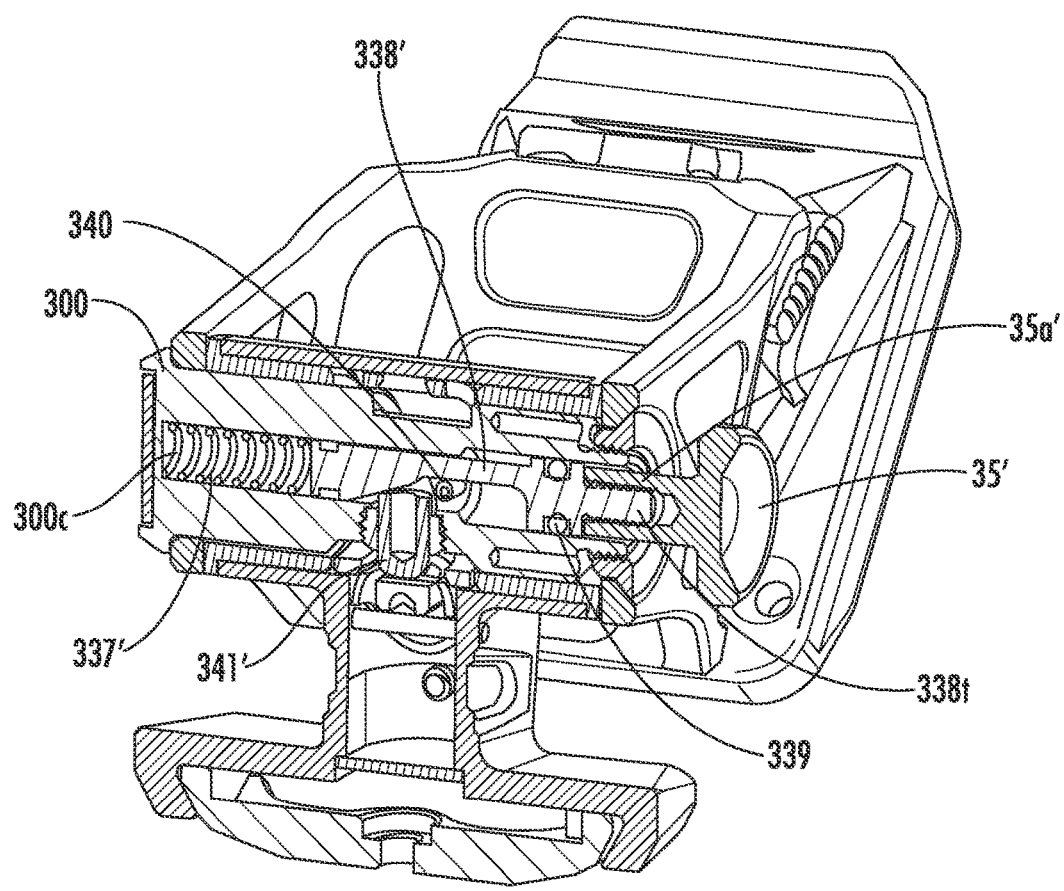
Figure 42C:
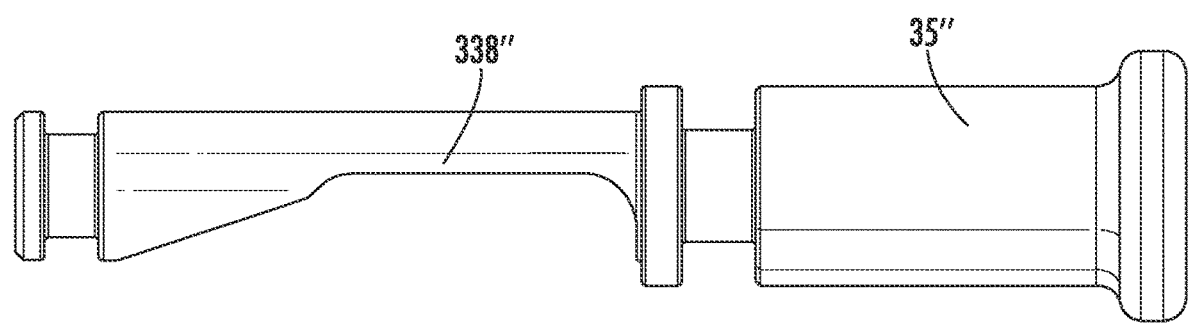
FIG. 42C is a side view of another embodiment showing the pill pusher and hinge release button formed as single integral component.
Figure 43A:
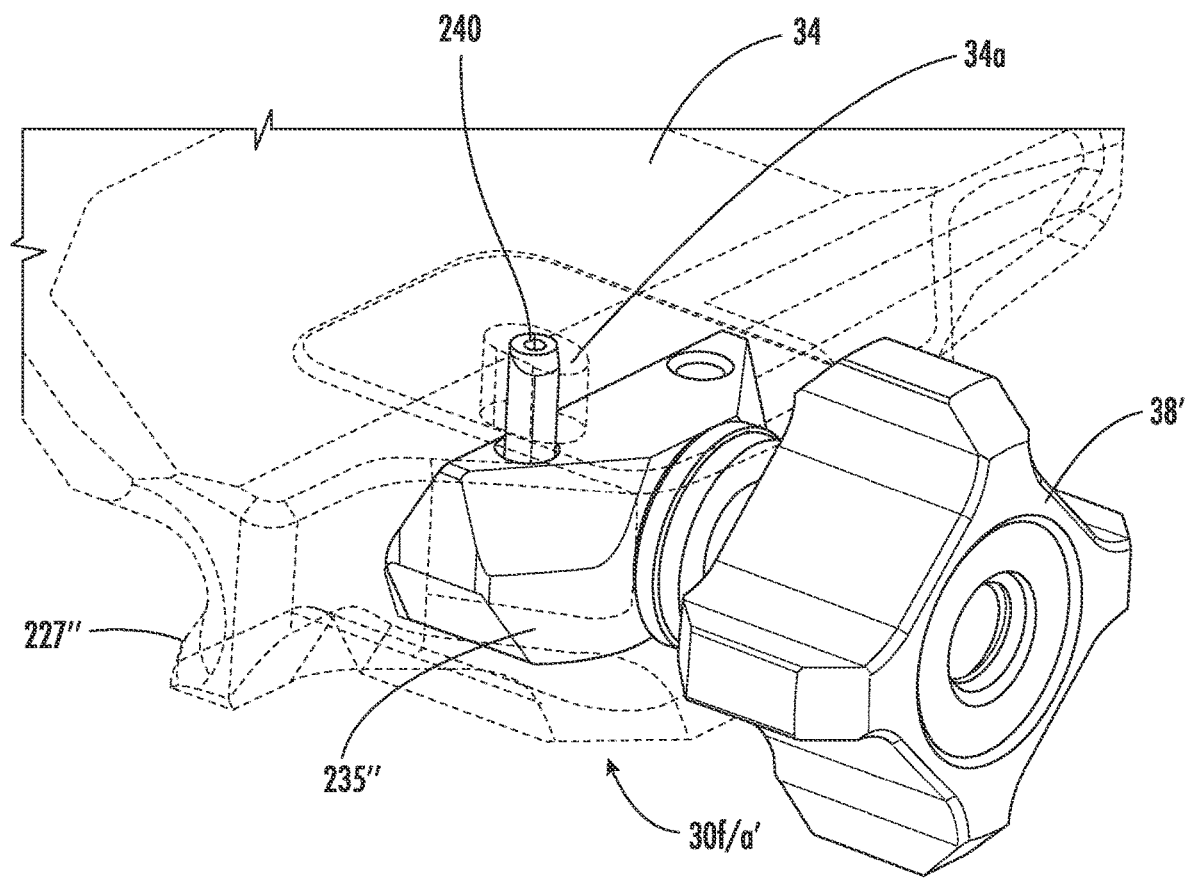
FIGS. 43A-43C are enlarged partially transparent top, side perspective views of another embodiment of the fore/aft assembly coupled to the device mount plate.
Figure 43B:
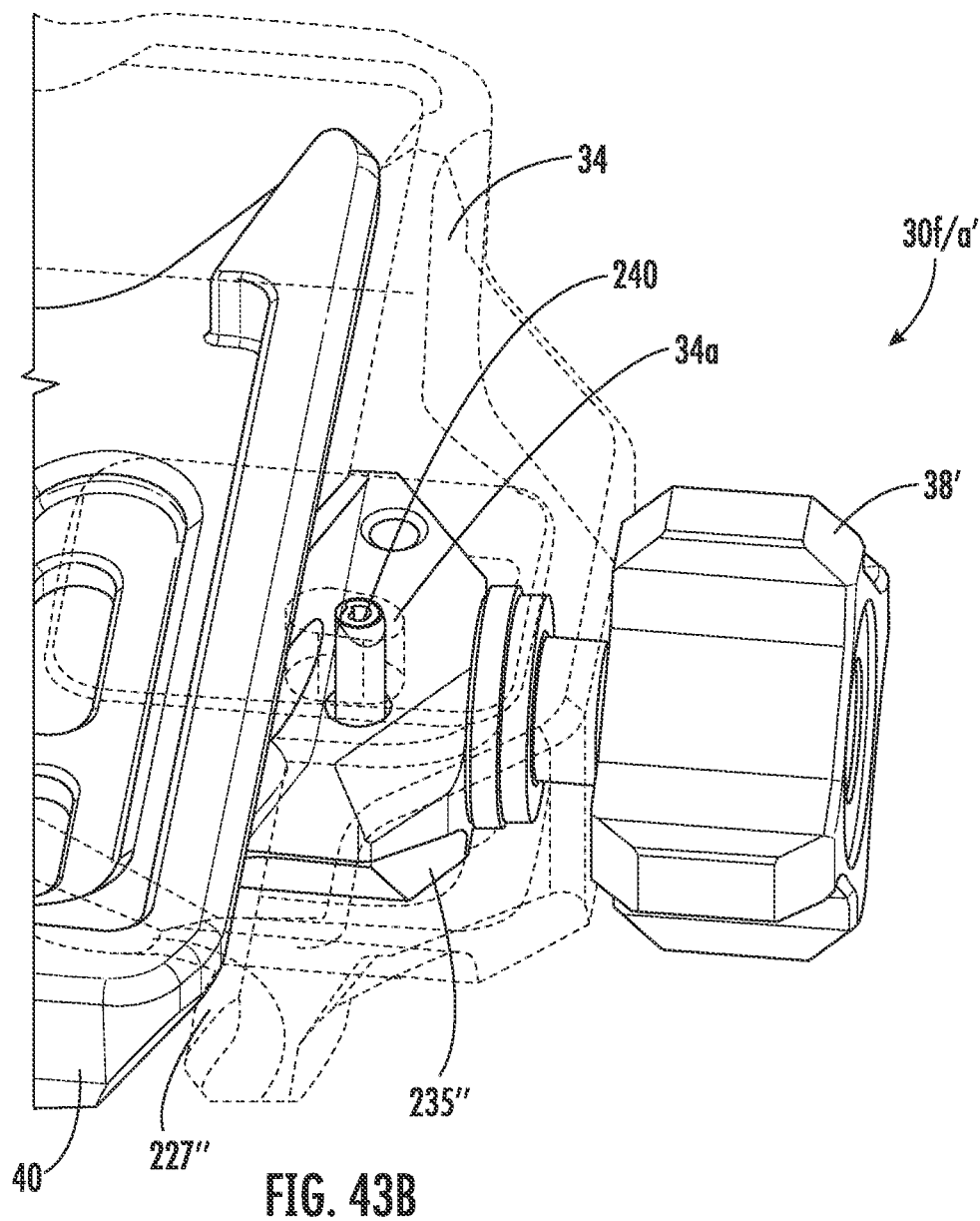
Figure 43C:
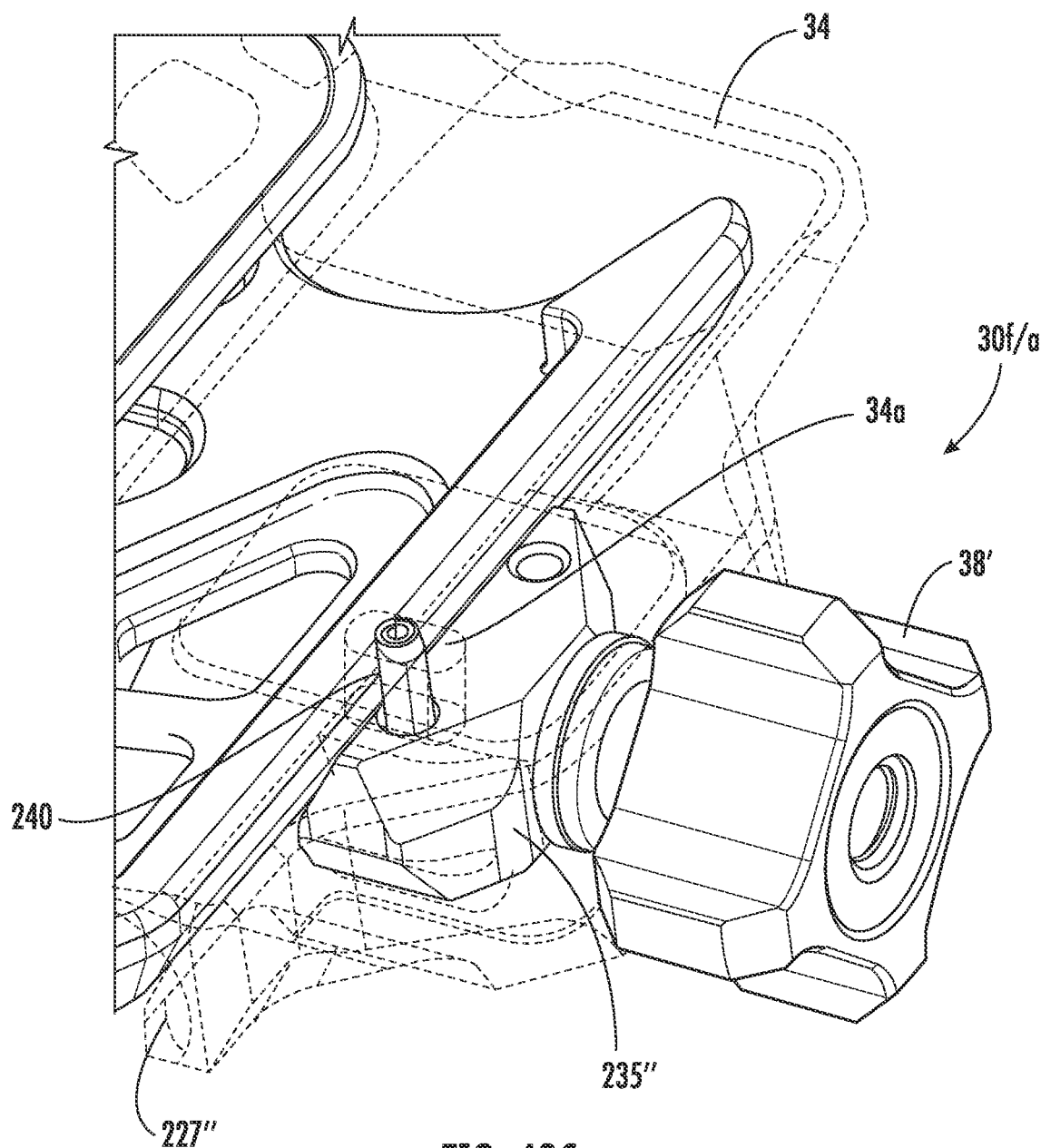
Figure 43D:
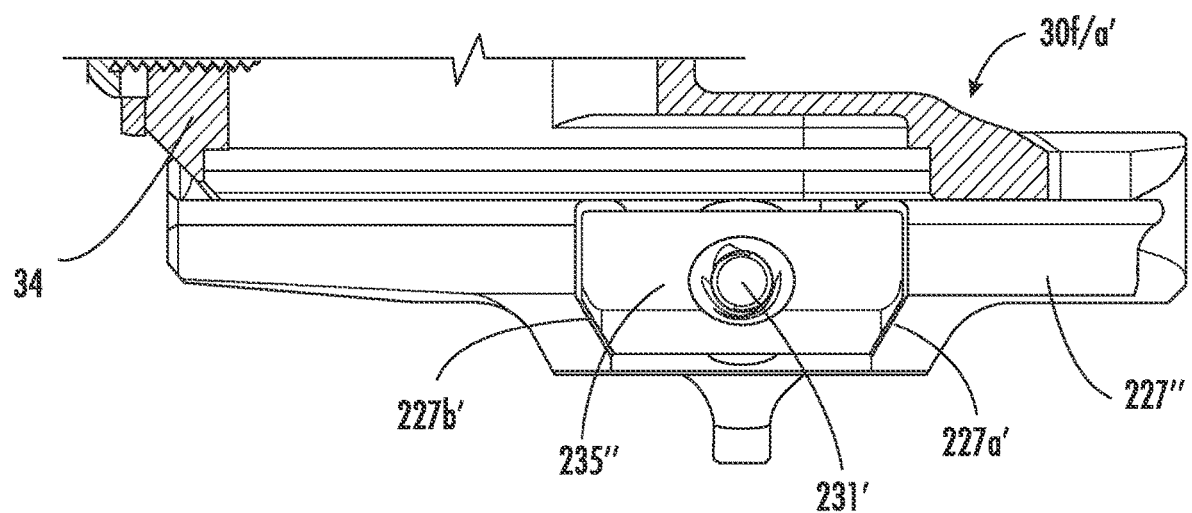
FIG. 43D is a section view section side view of the gantry and carriage assembly illustrating the fore/aft assembly of FIG. 43A.
Figure 43E:
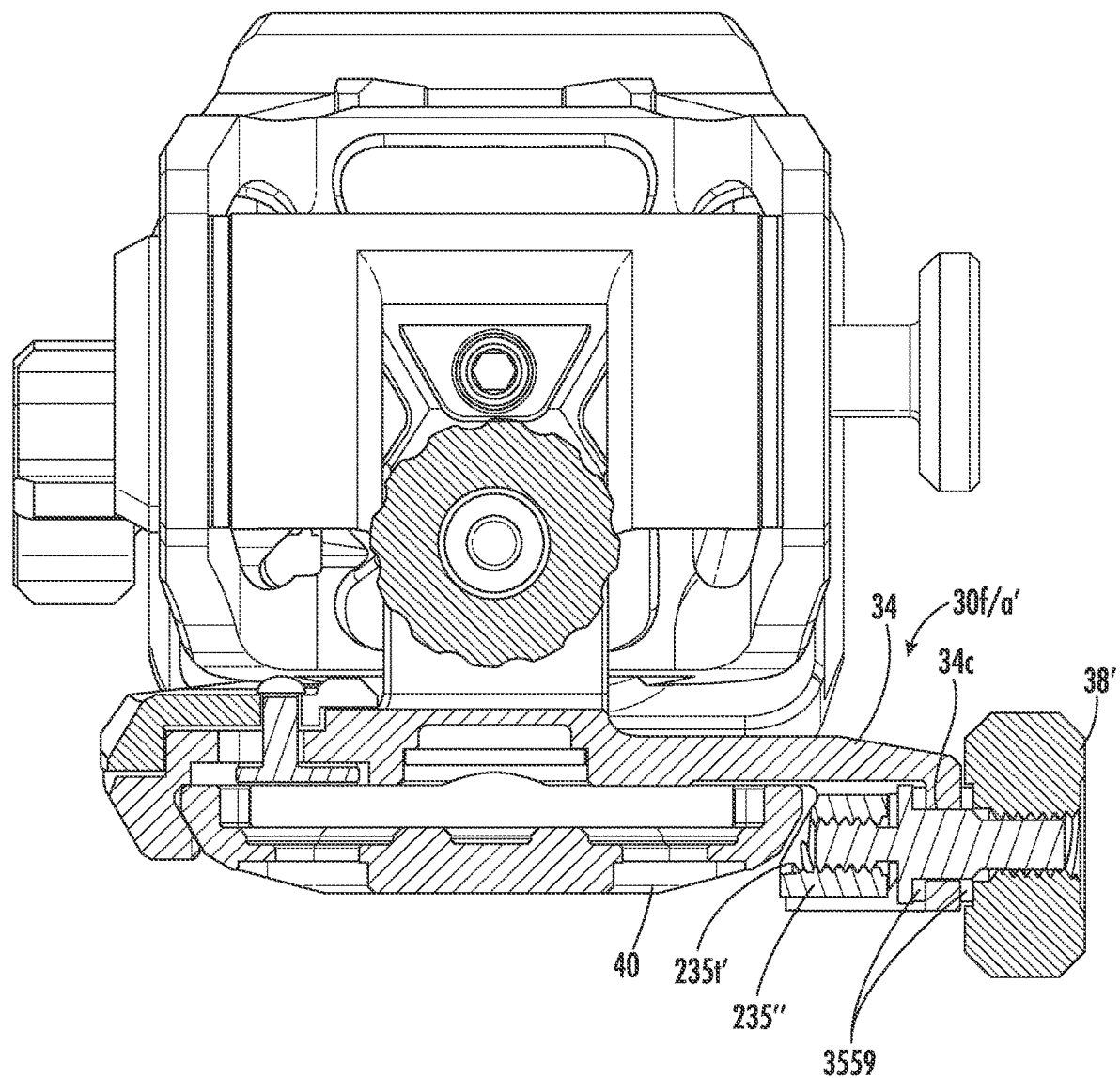
FIG. 43E is a partial section front view of the gantry and carriage assembly of FIG. 43B.

The hinge release button 35 is coupled to a pill pusher 338 and laterally extending biasing member 337, such as a spring. The hinge release button 35 and pill pusher 338 may be integral or separate components. In some embodiments, the pill pusher 338 has an open channel 338*c* with a threaded inner surface that is coupled to a threaded end 35*t* of the hinge release button 35 (FIGS. 33A-33B). In other embodiments, the threaded surfaces of the pill pusher 338 and hinge release button 35 are inverted such that the hinge release button 35' has an open channel 35*c*' with a threaded inner surface 35*a*' that is coupled to a threaded end 338*t* of the pill pusher 338' (FIGS. 42A-42B). As shown in FIGS. 42A-42B, at least a portion of the threaded inner surface 35*a*' the hinge release button 35' may extend within the internal channel 300*c* of the hinge axle 300, thereby providing additional structural support to the hinge release button 35'. The pill 341 can be configured to retain the pill pusher 338, 338' whether the pill 341 is in the locked or unlocked position. The hinge assembly 30*h* also comprises a stow detent 329 and can cooperate with a tilt insert 355 or cavity of a tilt adjustment member 448, both of which are configured to separately cooperate with the floatable interlock 341. A stow detent screw 330 can be coupled to the carriage 34 and to the stow detent 329. As shown in FIG. 42C, in some embodiments, the pill pusher 338" and hinge release button 35" may be combined and formed as a single integral component. As will be discussed further below with respect to FIGS. 28, 29A-29C, a tilt insert screw 358 can be coupled to the tilt insert 355.

Figure 28:
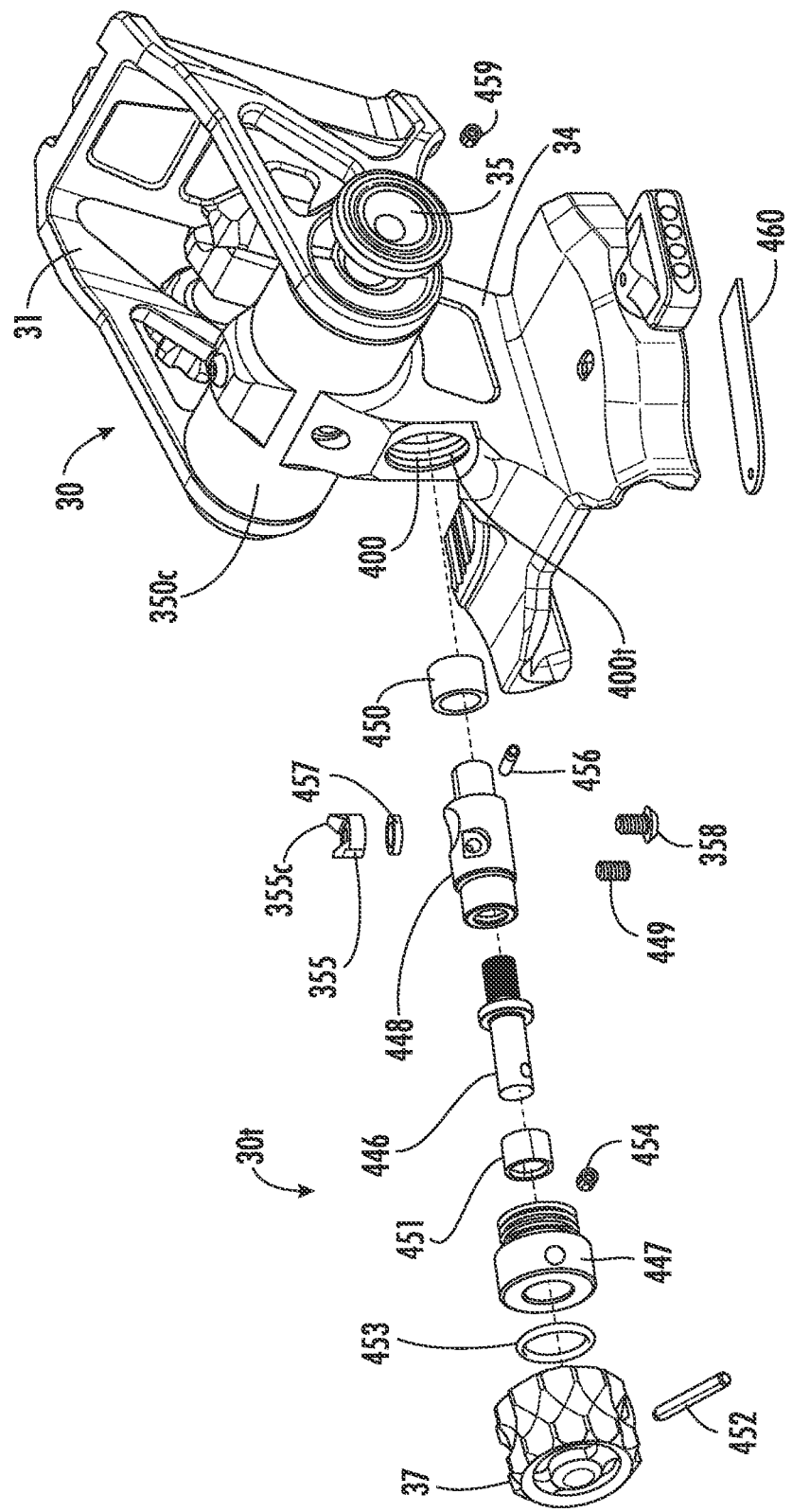
FIG. 28 is an exploded view of a tilt adjustment assembly provided by the gantry and carriage assembly shown in FIG. 1 according to embodiments of the present invention.

Referring to FIG. 28, as will be discussed further below, the tilt insert 355 can be coupled to a tilt adjustment member 448 which can reside in a bore 400 of the carriage 34 that extends in a front-to-back direction under and orthogonal to the laterally extending channel 350 of the carriage 34 holding the hinge axle 300 and pill pusher 338, for example. A tilt insert screw 358 can couple the tilt insert 355 to the tilt adjustment member 448. The tilt adjustment member 448 may comprise a piston (as shown by way of example in some of the drawings), block, slide block, carriage, sled, stage, rod, bracket, rack, ram, driver, cylinder, and/or spindle, or like component.

Figure 62:
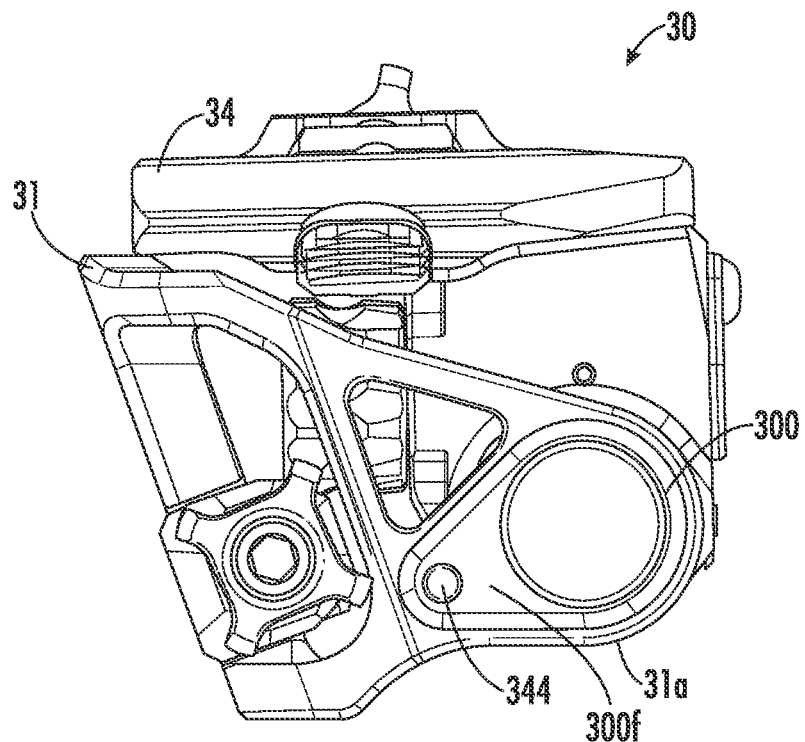
FIG. 62 is a side view of the gantry and carriage assembly with a fixation member inserted through the hinge axle and into the formed hole in the gantry according to embodiments of the present invention.

Referring again to FIG. 26A, the hinge assembly 30*h* can also include an axle screw 332 and axle pin 344 coupled to an end of the axle 300 (see also, FIG. 62). The axle screw 332 attaches the end of the axle 300 to the gantry 31 (e.g., the gantry arm 31*a*) to structurally lock the hinge axle 300 and gantry 31 together and ensure that the hinge axle 300 does not rotate relative to the gantry 31. The other end of the axle 300 is secured with an axle nut 335 which centers and locks the axle 300 within the aperture in the arm 31*a*.

The hinge assembly 30*h* can further comprise an O-ring 339 that can be positioned about the pill pusher 338 and first and second washers 333, 345, arranged between the gantry 31 and the carriage 34. The bushings 310 can be formed from a polymer, metal, or other material. The hinge assembly 30*h* can further include first and second tension screws 328 that can be used to tension against an outer surface of respective bushings 310. The O-ring 339 can provide an environmental seal as well as reduce the need for tight assembly dimensional tolerances as it is compliant.

The hinge assembly 30*h* can include an over-travel set screw 343 and an anti-rotation pin 340 for the pill pusher 338.

The hinge assembly 30*h* is held by laterally spaced apart arms 31*a* of the gantry 31 and extends through the laterally extending (cylindrical) channel 350 provided by a cylindrical segment 350*c* of an upper portion 34*u* of the carriage 34.

Figure 27A:
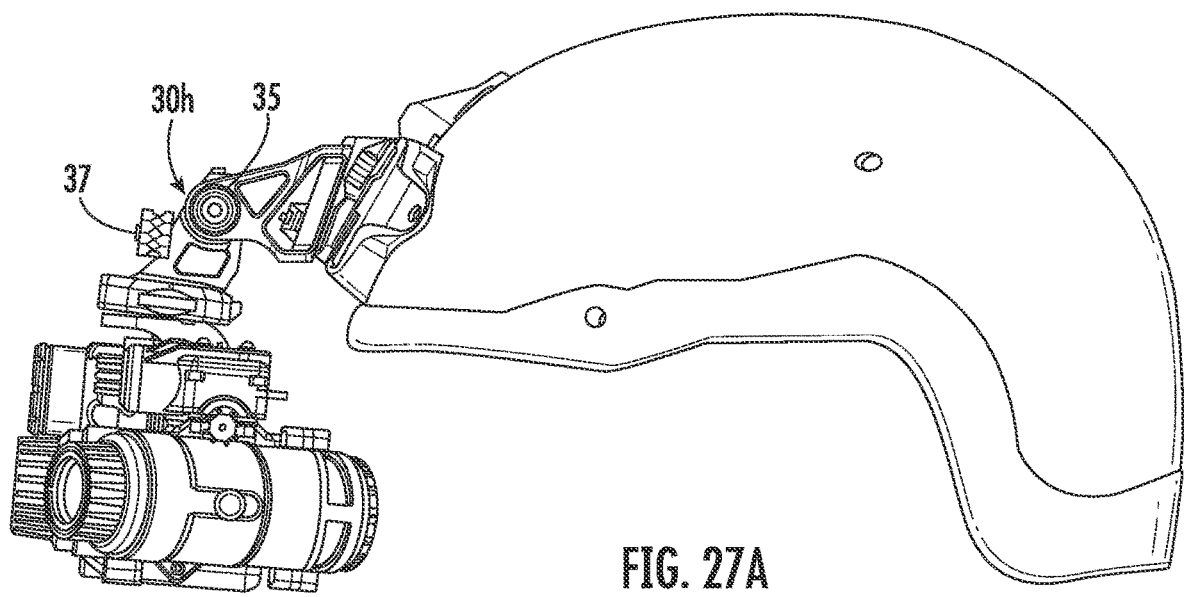
FIG. 27A is a side view of the mounting system shown in FIG. 1 illustrating a first tilt position of tilt adjustment according to embodiments of the present invention.
Figure 27B:
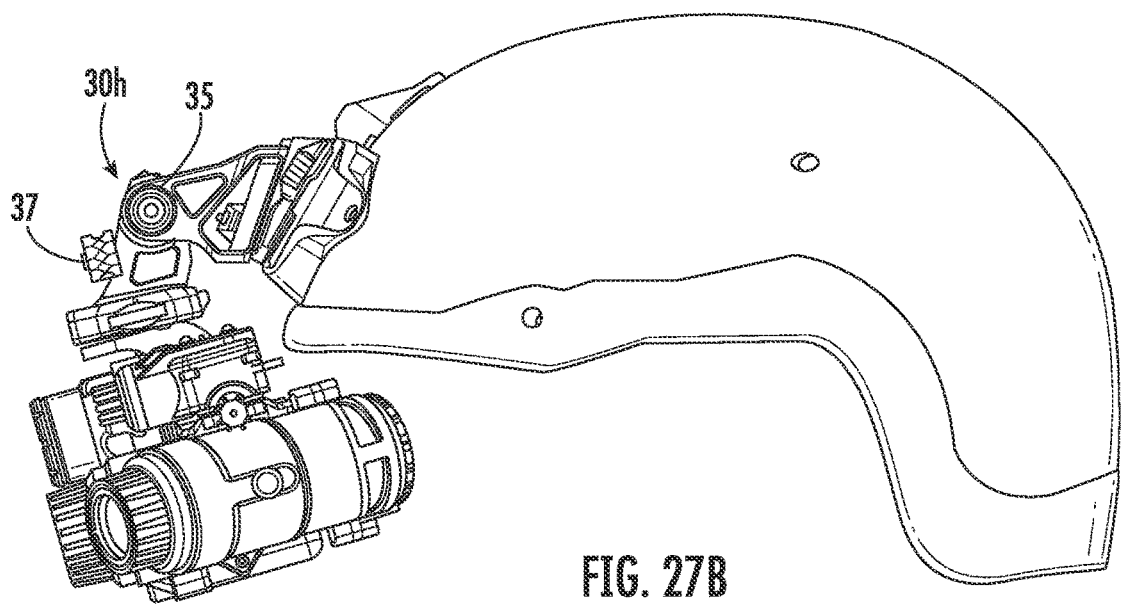
FIG. 27B is a side view of the mounting system shown in FIG. 1 illustrating a second tilt position of tilt adjustment according to embodiments of the present invention.

As shown in FIGS. 27A and 27B, the tilt adjustment allows a user to tilt the goggle 50 to properly align with the optical axis of their eye(s). The tilt adjustment assembly is accessed by a user via the tilt adjustment knob 37 of the tilt adjustment assembly 30*t* (FIG. 28) which can be configured to allow for tilt between forward and rear positions relative to/through the axially extending centerline of the hinge axle 300 of the gantry 31 defining the hinge axis H-H (FIG. 33A) of the mounting system 100.

Referring to FIG. 28 and FIGS. 29A-29C, the bore 400 in the carriage 34 under the laterally extending channel 350, can extend in a front-to-back direction and comprise a threaded inner wall 400*t*. The tilt adjustment assembly 30*t* comprises a tilt adjustment member 448 that can couple to the tilt insert 355 or the tilt adjustment member 448 can couple directly to the pill 341 via cavity 448*c* without requiring a separate insert 355 (FIG. 30B).

A disk spring 457, such as one or more Belleville washers, can be positioned under the tilt insert 355 above a head of the tilt insert retention screw 358 to provide a bias spring force upward in the orientation shown in FIG. 28. A first anti-rotation pin 456 can be coupled to the tilt insert 355 and a second anti-rotation pin 449 can be coupled to the tilt adjustment member 448, in an orientation that is orthogonal to the first anti-rotation pin 456. A retention screw 358 can be coupled to the tilt insert 355. A rear polymer bushing 450 can be coupled to the carriage 34 and extend over a sub-length of the tilt adjustment member 448. A rear tilt bushing tension screw 459 can be coupled to the bushing

450. The bushing tension screw 459 can be used to adjust tension applied to the bushing 450.

The tilt adjustment knob 37 can be coupled to an O-ring 453, a (retainer) nut 447, a bushing 451 and an adjustment screw 446 that extends in a front to back direction. The adjustment screw 446 can threadably couple to the tilt adjustment member 448. The nut 447 can be a retaining nut positioned between the knob 37 and adjustment screw 446. A retaining pin 452 can be attached to the tilt adjustment knob 37 and to the adjustment screw 446. A front tilt bushing tension screw 454 can be coupled to the front bushing 451. The front bushing 451 and/or the rear bushing 450 can be a polymer or copolymer (e.g., plastic), metal, or other material and the tension screw(s) 454, 459 can be used to apply a force (such as tension) to the corresponding bushing to reduce/adjust the inside diameter of the bushing 450, 451 inside the carriage 34. The O-ring 453 can be configured to provide resistance to turning of the knob 37 and/or can reduce the need for tight assembly dimensional tolerances as it is compliant.

In some embodiments, a cover plate 460 can be coupled to the bottom of the carriage 34.

Figure 30A:
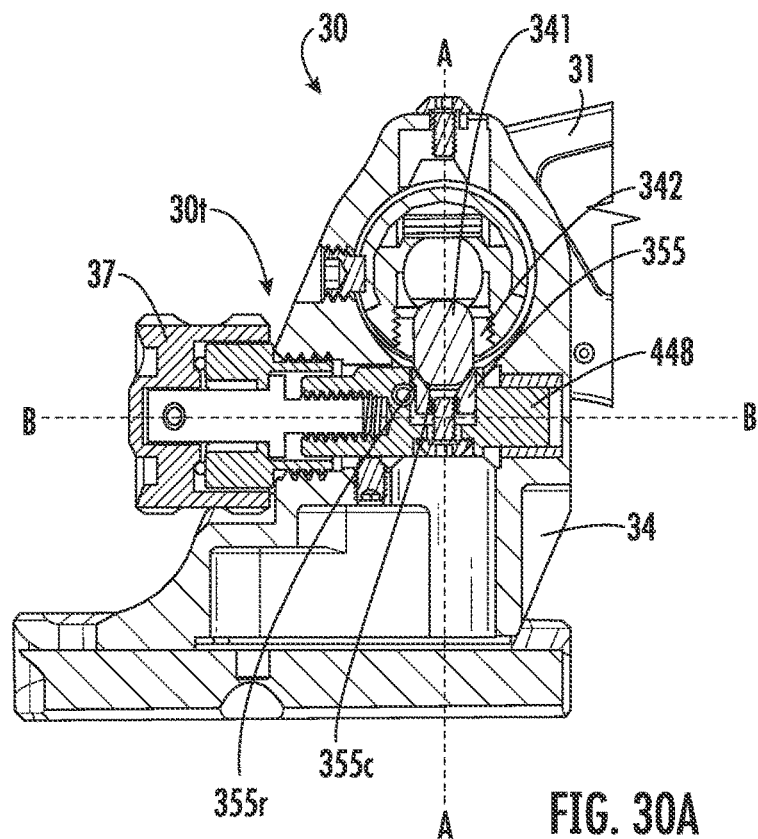
FIG. 30A is a section view of the tilt adjustment assembly and hinge assembly shown in FIG. 26 and FIG. 28 using a tilt insert for compliance according to embodiments of the present invention.

Referring to FIGS. 30A, 30B, the tilt insert 355 is shown with respect to the tilt adjustment member 448 in a neutral tilt position. As shown, the tilt insert 355 has an arcuate cup or cavity 355*c* that is sized and configured to hold part of, e.g., only a radially extending end portion 341*e*, of the pill 341*p*. The radially extending end portion of the pill 341*p* can extend and retract with respect to the hinge.

The tilt adjustment member 448 moves in the front and back directions, relative to a first position where the tilt insert 355 is aligned with a long centerline axis A-A of the pill 341*p*, to provide the tilt adjustment of the carriage 34 and therefore the device mount plate 40. It is noted that the front and back directional movement (e.g., fore/aft movements) may include a slight lateral movement that is offset from the centerline axis B-B of the tilt adjustment member 448. The end portion 341*e* of the pill 341*p* can have a hemispherical shape configured to allow it to maintain locking contact with the ramped geometry 355*r* provided by the cavity 355*c* of the tilt insert 355.

The floatable interlock member 341, 341', 341" can have an elongate shape which may provide rigidity/increased surface contact area with the adjacent components. The floatable interlock member 341, 341', 341" can have a flat length that is a length between two hemispherical ends 341*e* that is in a range of about 0.005 inches to about 1 inch, more typically in a range of about 0.030 inches to about 0.075 inches, in some embodiments. The floatable interlock member 341, 341', 341" can have a diameter that is in a range of 0.03 inches to 0.50 inches, such as 0.1875 in some embodiments.

As discussed above, the floatable interlock member 341, 341', 341" does not need to have a symmetrical shape. For example, the segment residing under the pill pusher 338, 338', 338" can have a different configuration from the end portion that extends into the tilt insert 355. The tilt insert 355 and/or the pill pusher 338, 338', 338" can be configured to define a compliant mechanism(s) to inhibit binding over time and/or usage.

Figure 29A:
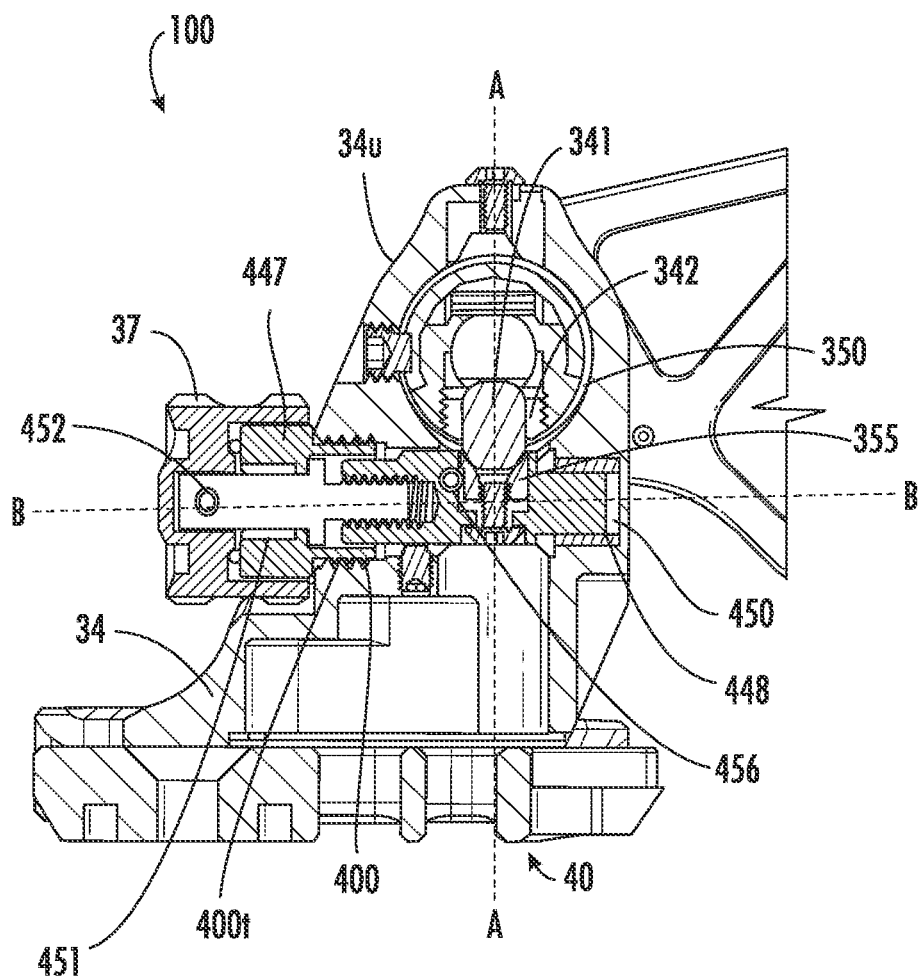
FIGS. 29A-29C are section views of the tilt adjustment assembly shown in FIG. 28 and part of the hinge assembly shown in FIG. 26A according to embodiments of the present invention.
Figure 29B:
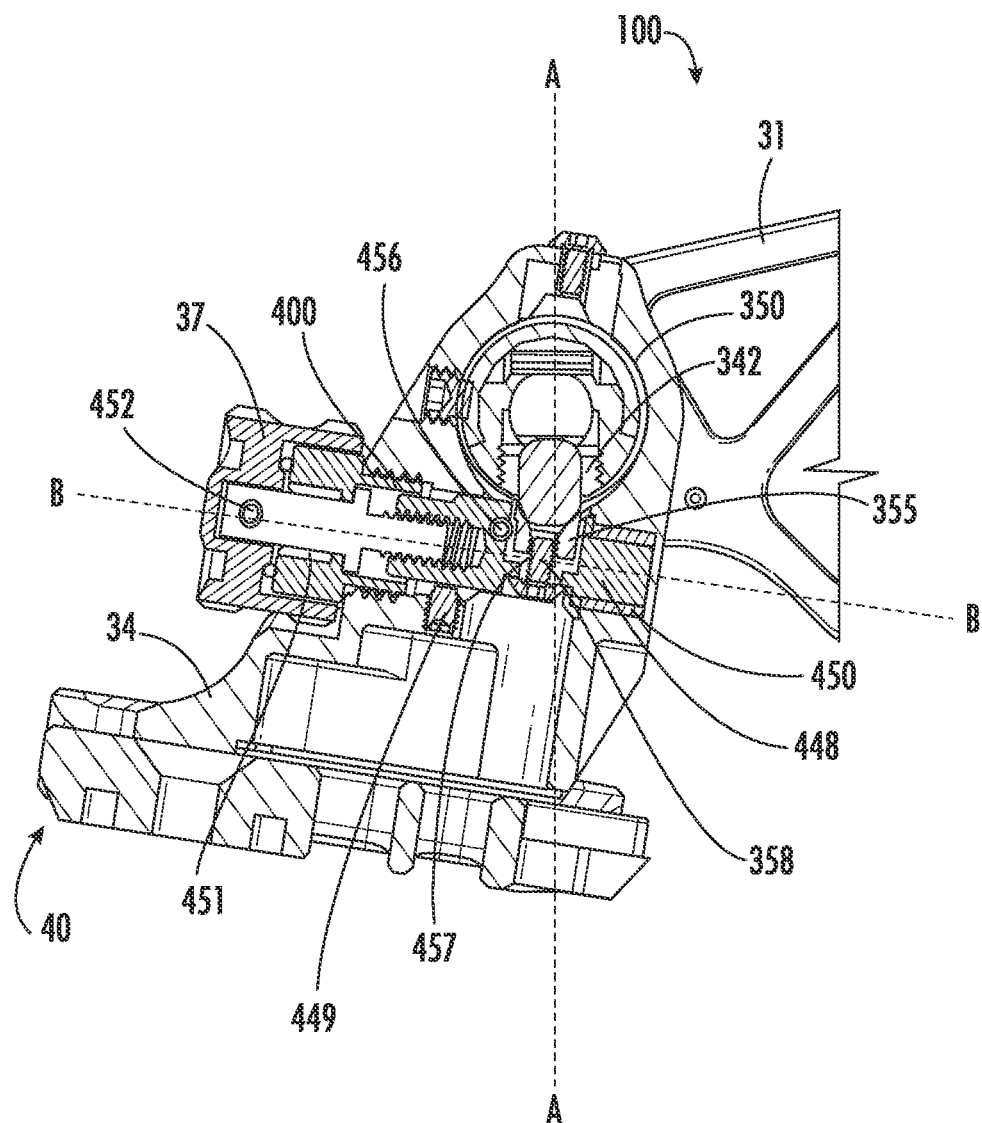
Figure 29C:
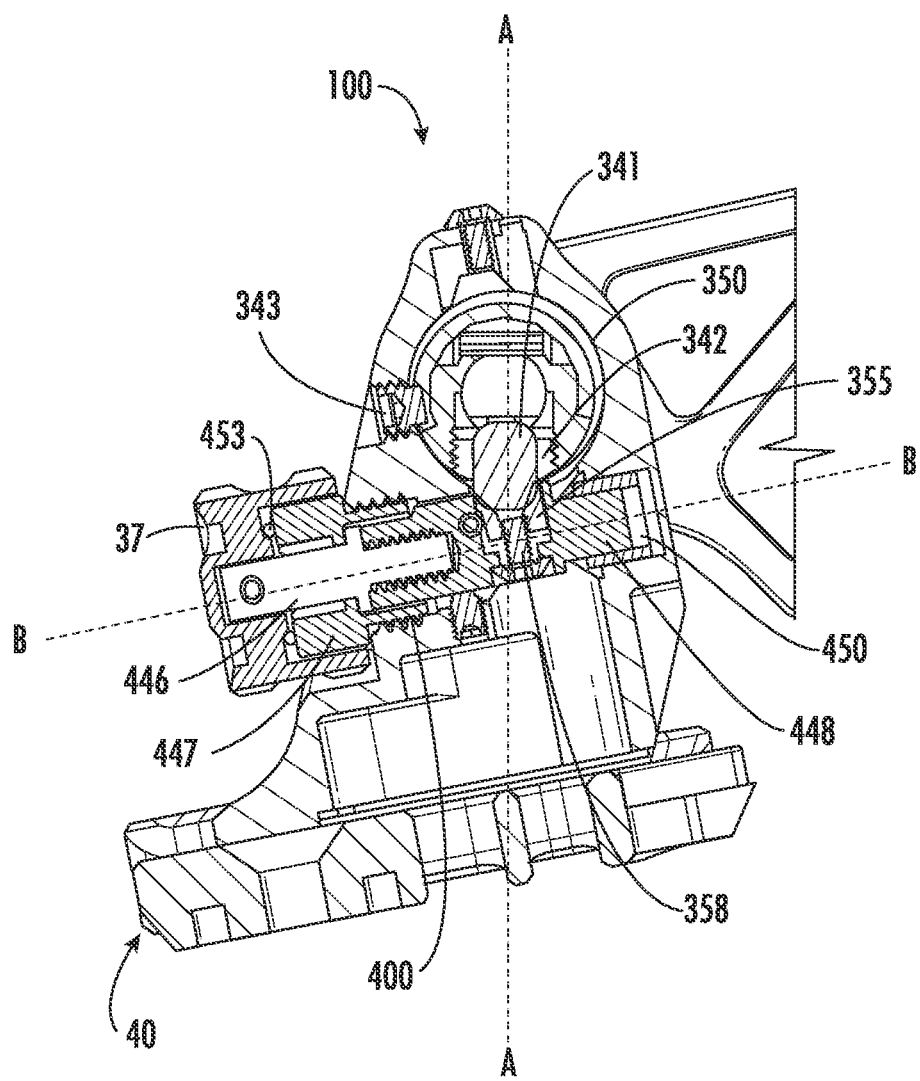
Figure 30B:
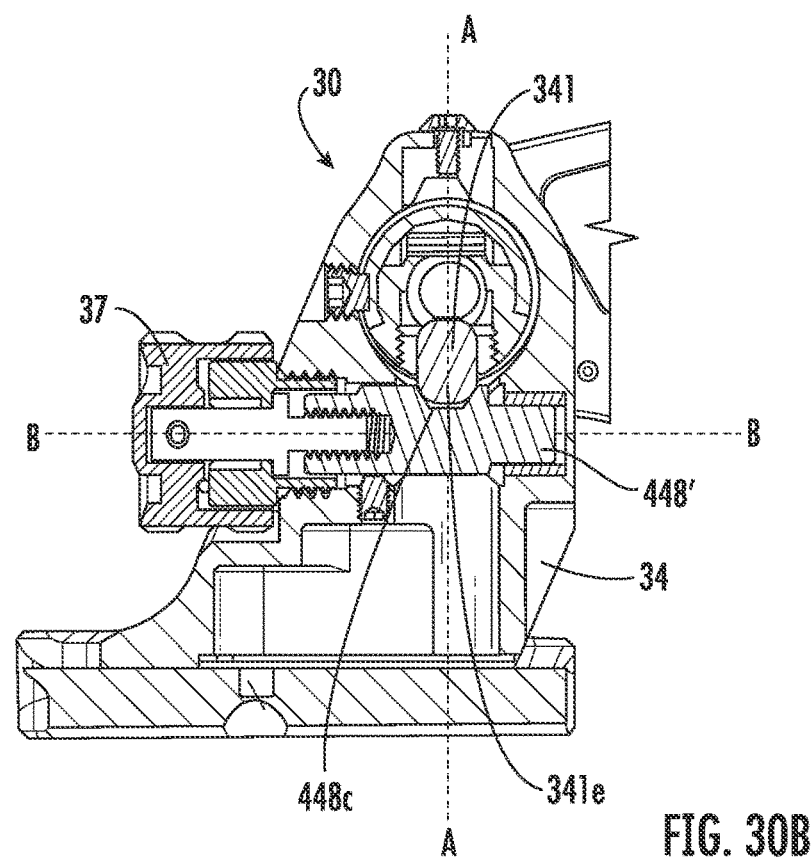
FIG. 30B is a section view of another embodiment of the tilt adjustment assembly and cooperating hinge assembly shown in FIG. 26A with tilt member configured to provide compliance without requiring a tilt insert according to embodiments of the present invention.

FIG. 29A illustrates the pill 341*p* and the tilt insert 355 whereby the centerline A-A of the pill 341*p* is orthogonal to the long centerline axis B-B of the tilt adjustment member 448. FIG. 29B illustrates a second orientation associated with the knob 37 rotated to move the tilt adjustment member 448 in an aft direction thereby tilting the carriage 34 to angle in an upward direction and placing the centerline axis A-A of the pill 341*p* relative to the centerline axis of the tilt adjustment member 448 at an angle that is less than 90 degrees. FIG. 29C illustrates a third orientation associated with the knob 37 rotated to move the tilt member 448 in a forward direction thereby tilting the carriage 34 to angle in a downward direction and placing the centerline axis A-A of the pill relative the centerline axis of the tilt member 448 at an angle that is greater than 90 degrees. In some embodiments, the pill 341 can rotate about its axial centerline, vertical axis.

Thus, the floatable interlock member 341, 341', 341" cooperates with the tilt adjustment assembly 30*t* and is configured to allow the angle between the pill axis A-A and the tilt adjustment member axis B-B to change with the tilt setting. Then, when the hinge release button is depressed, the pill 341 can radially move away from the tilt adjustment member 448 to allow rotation to stow. The floatable interlock member 341, 341', 341" can be configured to allow the tilt adjustment member 448 to move in and out with a point or line of tangency with the floatable interlock member 341, 341', 341" changing as the tilt adjustment member 448 moves in and out. In some embodiments, the floatable interlock member 341, 341', 341" and tilt adjustment member 448 can have cooperating surfaces that allow the floatable interlock member 341, 341', 341" to travel along the surface of the tilt adjustment member 448 as the tilt adjustment member 448 moves laterally without binding. In some embodiments, the flat surface of the tilt adjustment member 448 and the curvilinear profile of the floatable interlock member 341, 341', 341" may be inverted. In other embodiments, the floatable interlock member 341, 341', 341" and tilt adjustment member 448 may both have cooperating surfaces that may abut each other at one or more times during operation and that may have any suitable cooperating shape(s) facilitating the desired movements of the floatable interlock member 341, 341', 341".

FIG. 30B illustrates that the tilt insert 355 is not required. Instead, the tilt adjustment member 448' can be configured with a shaped cavity 448*c* that holds the end portion of the pill 341*p*.

Figure 30C:
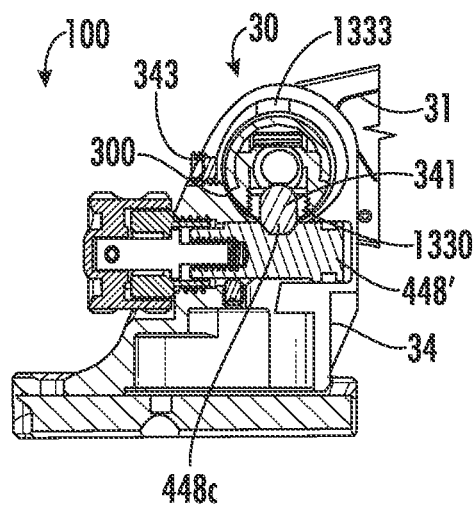
FIG. 30C is a section view of another embodiment of the mounting system with tilt adjustment assembly and cooperating hinge assembly comprising a sleeve retained within the carriage with a cavity to retain the floatable interlock member when in stow according to embodiments of the present invention.
Figure 30D:
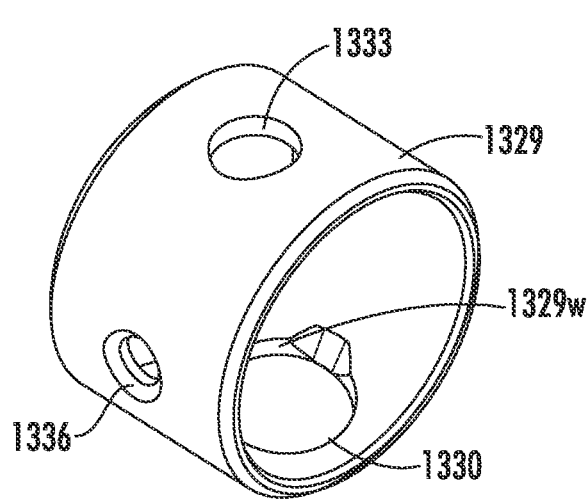
FIG. 30D is an enlarged side perspective view of the sleeve shown in FIG. 30C according to embodiments of the present invention.
Figure 30E:
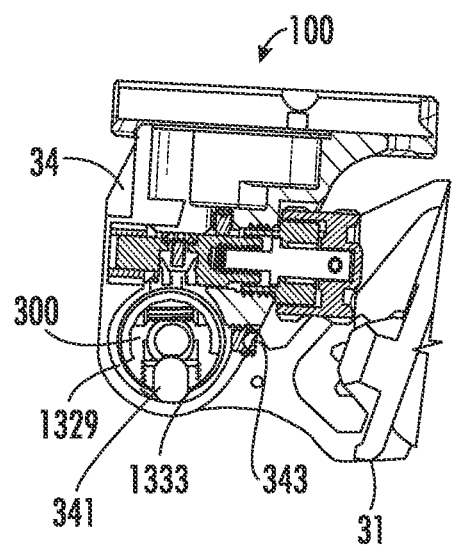
FIG. 30E is a section view of the mounting system shown in FIG. 30C with the mounting system in a stow position.

Turning now to FIGS. 30C-30E, an embodiment of the mounting system 100 is shown that does not require either of the stow or tilt inserts. In this embodiment, the mounting system 100 comprises a sleeve 1329 with a cavity 1333 to secure the floatable interlock member 341, 341', 341" when in stow, and a shaped cavity 448*c* on the tilt adjustment member 448' that holds the end portion 341*e* of the pill 341*p* when in a deployed state. The sleeve 1329 circumferentially extends about an outer wall segment of the hinge axle 300. The sleeve 1329 comprises a wall 1329*w* and a plurality of circumferentially spaced apart open apertures 1330, 1333, 1336. A first aperture 1330 is aligned with the channel 303 (FIG. 26B) of the hinge axle 300 and allows the floatable interlock member 341, 341', 341" to protrude from the sleeve 1329 into the cavity 448*c* in the deployed position. The sleeve 1329 is affixed to the carriage 34 and rotates with it. The floatable interlock member 341, 341', 341" extends out of the hinge axle 300 and into a second aperture defining a stow detent and/or stow cavity 1333 that holds an end portion of the floatable interlock member 341, 341', 341" in the stow position (FIG. 30E). Advantageously, this embodiment provides a hardened surface for the floatable interlock member (e.g., pill) 341*p* to ride on when transitioning between the deploy position (FIG. 30C) and the stow position (FIG. 30E). FIG. 30D shows the stow detent or stow cavity 1333 as being a through channel in the wall 1329*w* of the sleeve 1329, but this cavity can be provided by a closed pocket in some embodiments (not shown). The stow detent or stow cavity 1333 can be diametrically opposed to the first aperture 1330. The first aperture 1330 can have a larger opening/perimeter than the stow cavity 1333. The other aperture 1336 can receive a fastener 343, such as a set screw that can also extend through the axle 300 and couple to the wall of the cylindrical channel 350 of the carriage 34.

Advantageously, the tilt adjustment with the floatable (or displaceable) interlock member 341, 341', 341" provides non-discrete adjustment and rigidity objectives.

The tilt adjustment assembly 30t with the tilt adjustment member 448, 448', 448" and the displaceable or floatable interlock member or pill 341, 341', 341" cooperate to convert the rotation of the knob 37 to translation of the tilt adjustment member 448, 448', 448" and that to rotation of the carriage 34 relative the gantry 31 about the hinge axis H-H. Rotating the knob 37 effectively lengthens the adjustment screw (446)/tilt adjustment member (448) assembly. That linearly increases or decreases the linear distance from the retention nut 447 and the interlock between the pill 341, 341', 341" and the insert 355 or cavity 448c of the tilt adjustment member 448, 448', 448". Since the carriage 34 is otherwise restrained, that lengthening pushes or pulls the carriage 34 around the hinge axle H-H (and thereby tilts it relative to the gantry 31). This screw drive-to-rotary mechanism can allow for an almost infinite, precise adjustment without adding slop. This linear to rotary or screw drive mechanism with compliance can provide a precise and continuous adjustability while minimizing tolerances that may otherwise compromise rigidity of the overall assembly.

The use of a pill 341p with a rounded end portion 341e and optional spring-biased (rounded cup) tilt insert 355 can allow movement between and settle in all positions along the intended tilt range without binding or creating slack thereby providing a "compliant mechanism."

Figure 31A:
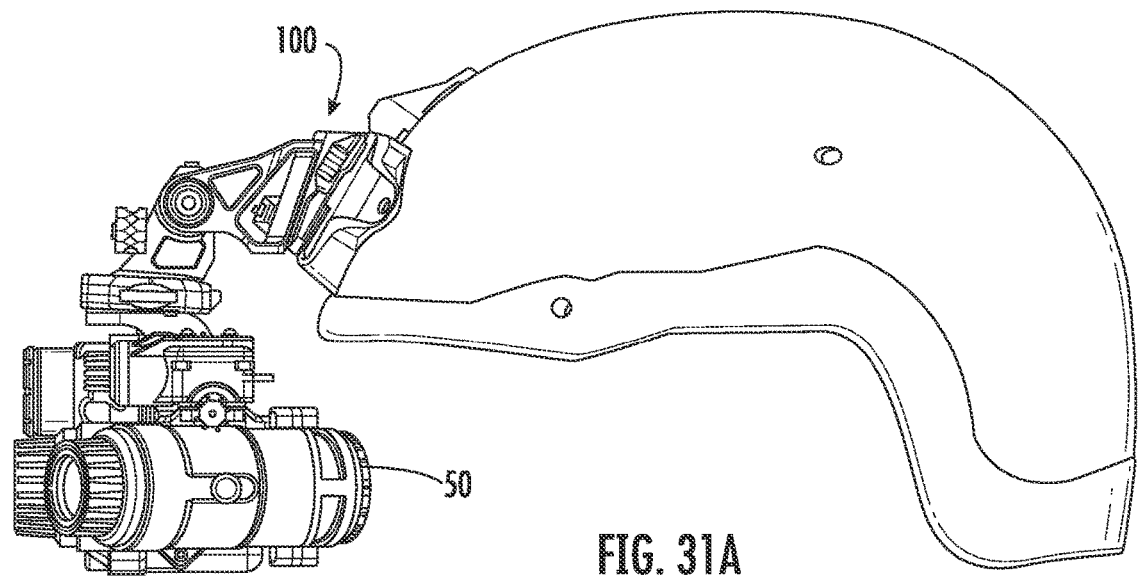
FIG. 31A is a side view of the mounting system shown in FIG. 1 illustrating a deployed position according to embodiments of the present invention.
Figure 31B:
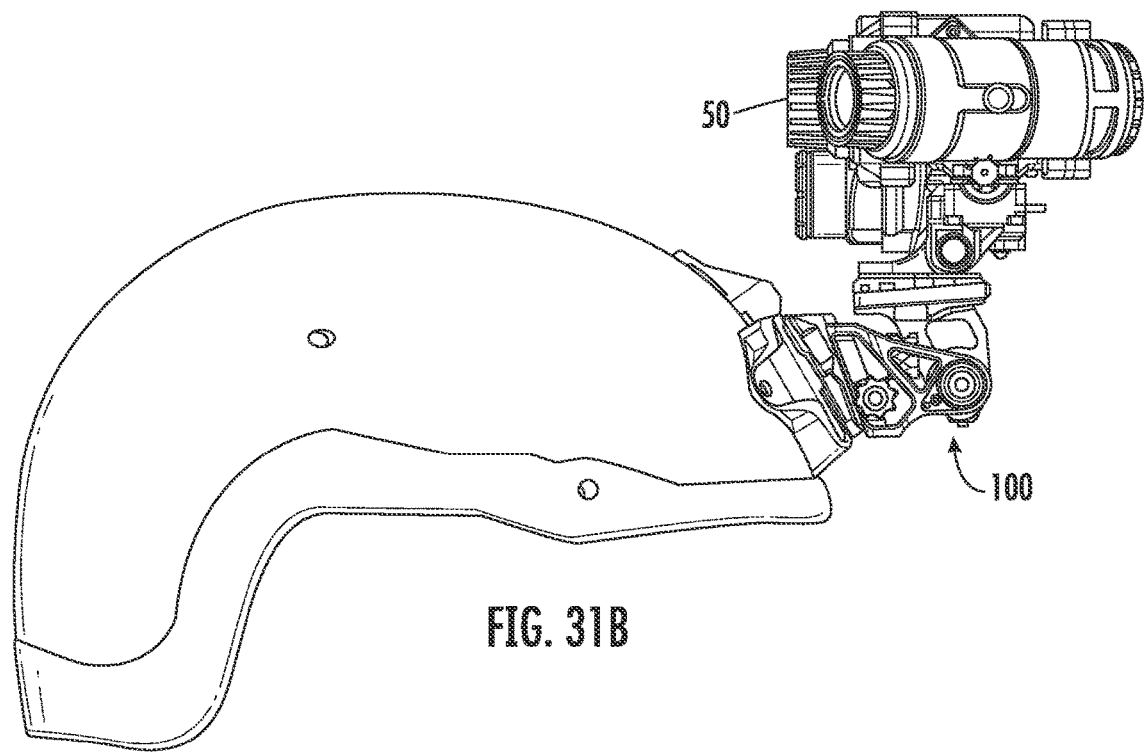
FIG. 31B is a side view of the mounting system shown in FIG. 1 illustrating a stowed position according to embodiments of the present invention.
Figure 44A:
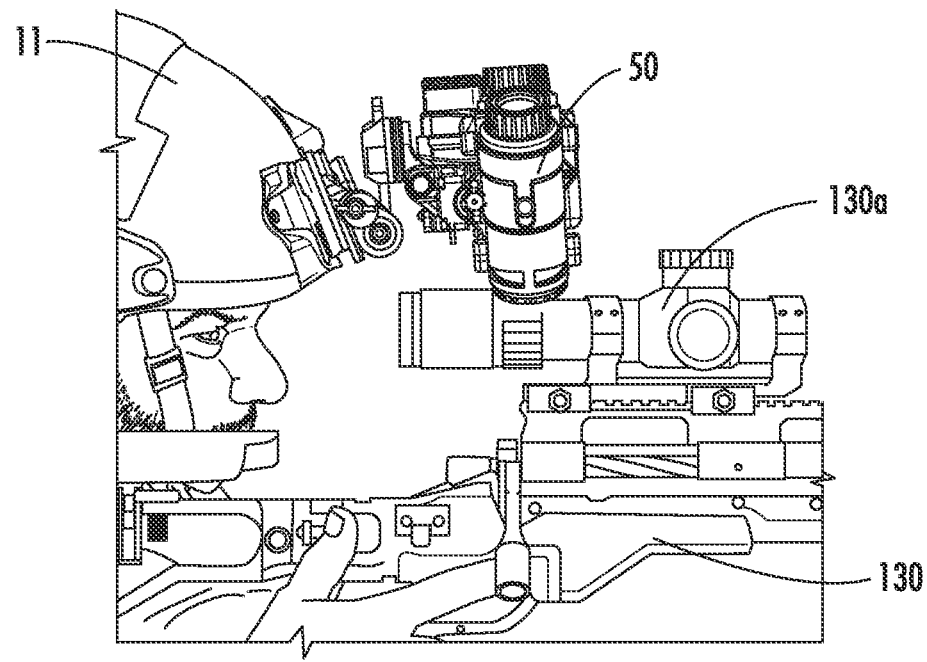
FIG. 44A illustrates an example prior art mounting system which the tilt settings place the goggles in contact with the scope of a weapon.
Figure 44B:
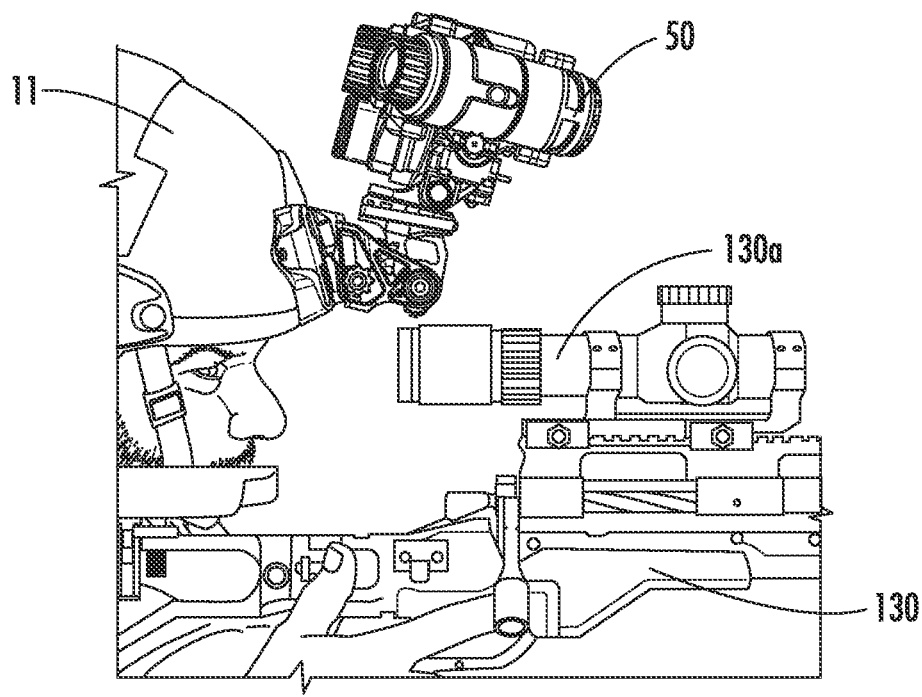
FIG. 44B illustrates a mounting system according to embodiments of the present invention which has a consistent stow position, agnostic to the user tilt setting, which keeps the goggles from contacting the scope of a weapon.

Referring to FIGS. 31A and 31B, an example deployed position (FIG. 31A) and an example stowed position (FIG. 31B) of the mounting system 100 and goggle 50 is shown. The position of the goggle 50 in the stow position impacts nominal static pitch a user experiences about their AO complex, and how much clearance is available in front of the user to prevent interference when performing other tasks such as shooting a firearm with a scope, for example. Embodiments of the present mounting system 100 can be configured to provide a common stow position for every user irrespective of a user-selected tilt in the deploy position whereby the user-selected deploy position can be automatically re-deployed after each stow action. Another example stowed position of the mounting system 100 and goggle 50 is shown in FIG. 44B in which the mounting system 100 stows the goggle 50 away from the scope 130a of a weapon 130. Compare the stow position of the mounting system 100 of the present invention in FIG. 44B with the stow position of an example prior art mounting system in FIG. 44A in which stow position places the goggle 50 in contact with the scope 130a of the weapon 130. Benefits of scope 130a clearance provided by the mounting system 100 are a result of the hinge position relative to the helmet 11 as located by the gantry 31, among other features, as well as the tilt agnostic aspect of the stow position.

Turning now to FIGS. 32A-32C, 33A-33B, and 42A-42C, the hinge assembly 30h is discussed with respect to hinge and stow features according to embodiments of the present invention. The carriage 34 comprises the laterally extending cylindrical channel 350 holding the hinge axle 300 and pill pusher 338, 338', 338". The carriage 34 also comprises the front to back channel 400 holding the tilt adjustment member 448, 448' (FIG. 30B), 448" (FIG. 38). The carriage 34 also comprises a downwardly extending bore 410 residing under the front to back channel 400, aligned with the pill 341p when the carriage 34 is in the orientation shown in FIG. 29A.

Figure 32A:
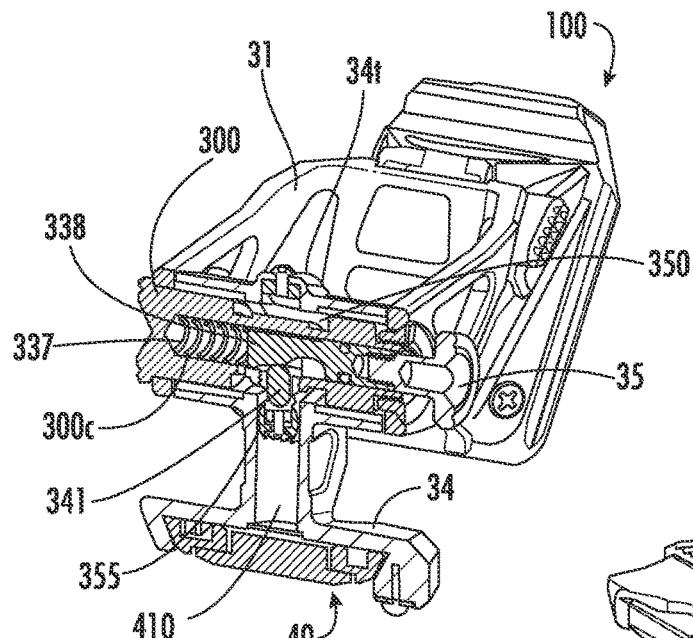
FIG. 32A is a front, side perspective view of the gantry and carriage assembly shown in FIG. 1 illustrating the hinge and tilt adjustment assembly in section view.
Figure 32B:
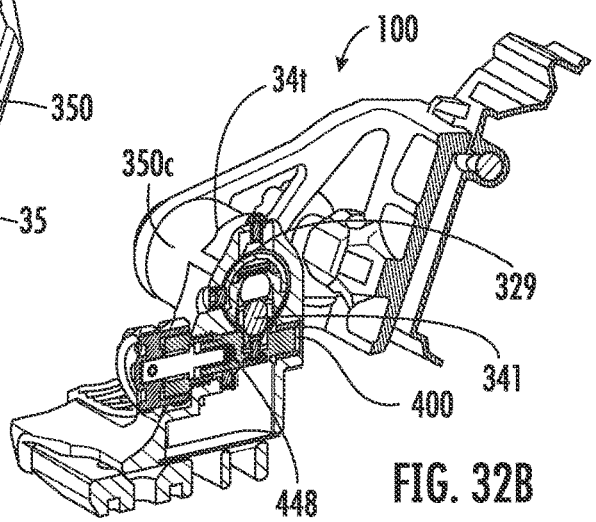
FIG. 32B is a side perspective view of the gantry and carriage assembly shown in FIG. 32A illustrating the tilt adjustment assembly and the hinge assembly in section view.
Figure 32C:
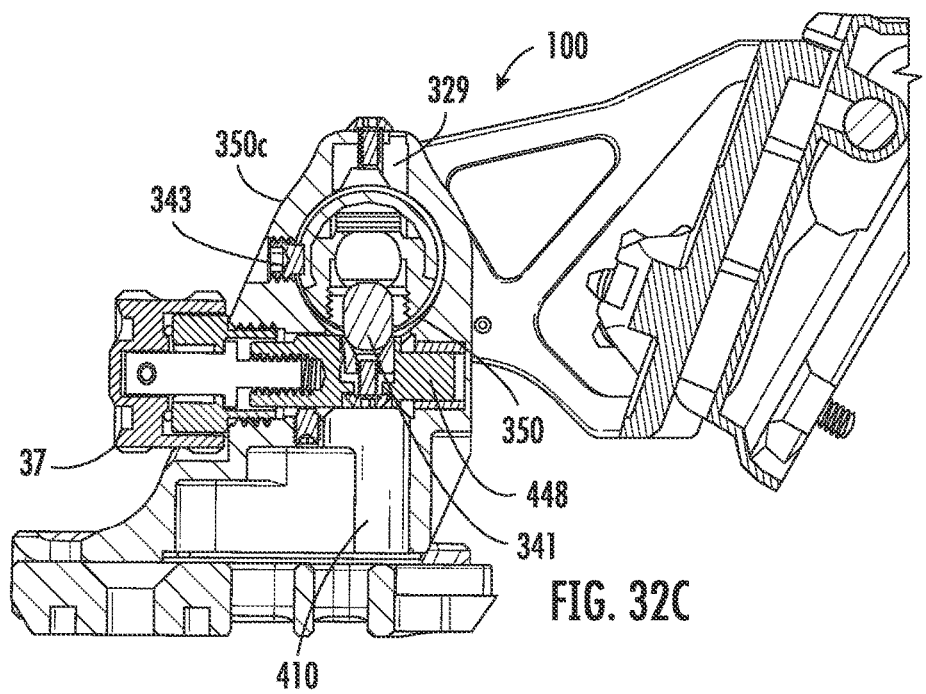
FIG. 32C is a side view of the gantry and carriage assembly shown in FIG. 32A illustrating the tilt adjustment assembly and the hinge assembly shown in section view.

Generally stated, the hinge assembly 30h uses a detent style mechanism to lock the carriage and gantry assembly 30 in each position. The hinge axle 300 comprises the hinge mechanism with positional detents residing outside the hinge axle 300. The stow detent 329 is located at the top 34t of the carriage 34, medially located along the laterally extending cylindrical channel 350 and external to the body of the hinge axle 300. The stow detent 329 has a curved cavity or pocket 329c (FIGS. 26A-26C) that is sized and configured to receive an end portion 341e of the pill 341p once the carriage 34 is rotated to lock the carriage, axle, and gantry assembly 30, and hence the night vision goggle 50, in the stow position. The pill 341, 341', 341" protrudes from the laterally extending internal channel 300c provided by the hinge axle 300, partially inside the laterally extending channel 350 of the carriage 34, when the mounting system 100 is in the locked position, such as the deployed, use position (FIG. 32A).

Figure 34A:
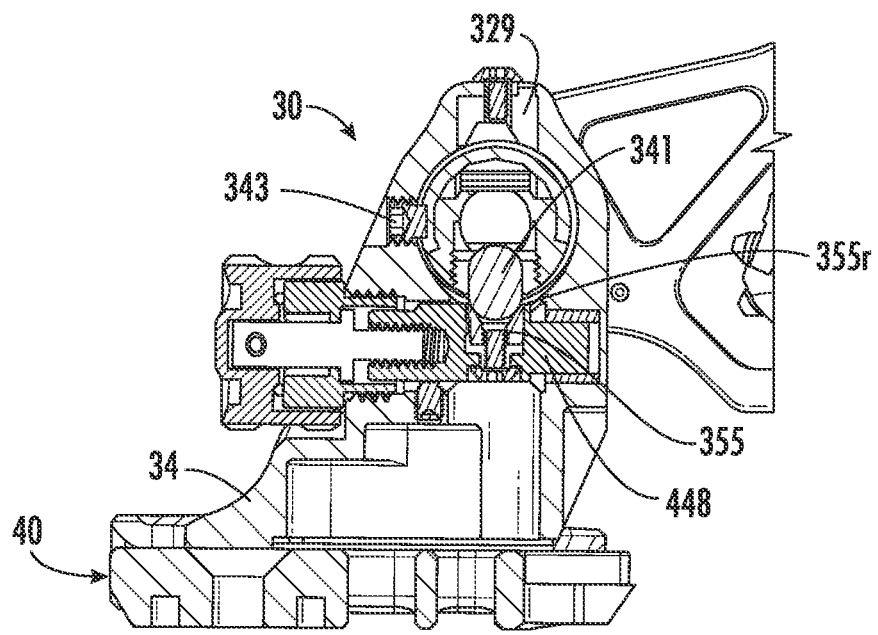
FIGS. 34A-34D are side section views of the gantry and carriage assembly shown in FIG. 1 illustrating a sequence of movements to the stow position and components associated with the movements according to embodiments of the present invention.
Figure 34B:
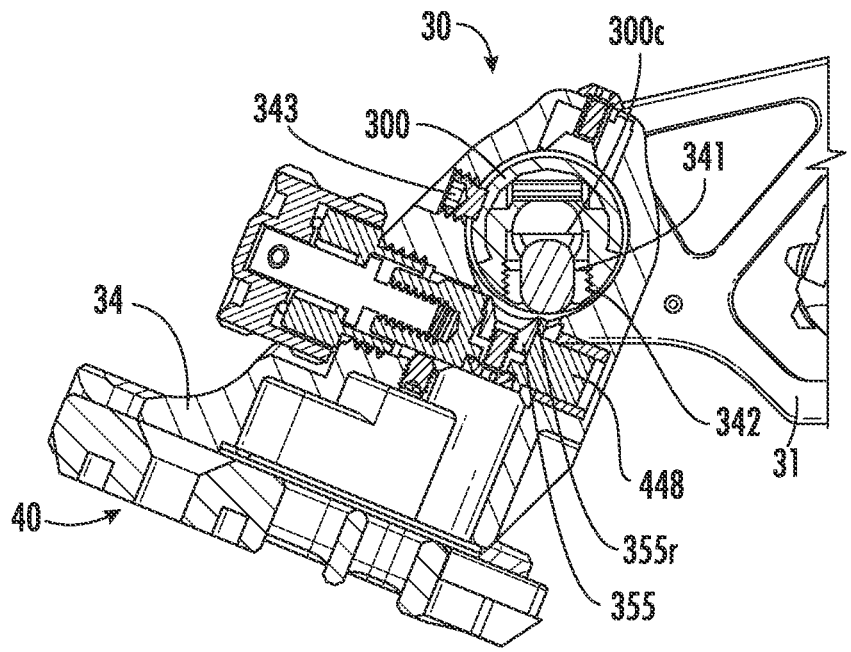

FIGS. 26B and 26C illustrate that the hinge axle 300 can include an open channel 303 extending through an outer wall segment 300w of the hinge axle 300. The open channel 303 can have a threaded inner surface 304 to threadably attach to the pill sleeve 342. The pill sleeve 342 can have external threads 342t and a smooth inner surface that can slidably engage a portion of the pill 341p, allowing the pill 341p to move relative to the pill sleeve 342 and hinge axle 300 between locked (FIG. 34A, for example) and unlocked (FIG. 34B, for example) positions of the goggle mount system 100. The pill sleeve 342 can be formed of the same or similar material as the pill 341p to provide a tight dimensional relationship with the pill 341p over time.

The pill pusher 338, 338', 338" can have an outer surface with a curvilinear profile 338p that pushes down on the pill 341p to keep it extending radially from the laterally extending internal channel 300c of the hinge axle 300. A user depresses the spring-loaded release button 35, which moves the pill pusher 338 laterally inward and positions a segment of the pill pusher 338, 338', 338" having an increased height of the curvilinear profile 338p over the pill 341p to provide clearance for the pill 341p to be pushed up into the internal channel 300c of the hinge axle 300 as shown by the upward arrow in the pill 341 in FIGS. 33A, 33B. The pill 341p can be biased to travel upward, when allowed by the geometry of the pill pusher 338, 338', 338", in response to the user-actuated hinge release 35 being depressed, by internal geometries of the tilt insert 355 (FIGS. 28, 33A, 33B), or by the shaped cavity 448c in the tilt adjustment member 448' (FIG. 30B), 448" (FIG. 38).

The pill pusher 338, 338', 338" is configured to laterally translate but is not required to (and typically does not) rotate. As shown in FIG. 26A, a pill pusher anti-rotation pin 340 coupled to the axle 300 and a flat surface 338f of the pill pusher 338 can be used to ensure the anti-rotation configuration (see also, FIGS. 42A-42C). The flat surface 338f of the pill pusher 338 can diametrically oppose the shaped profile 338p (FIG. 33A). The floatable interlock member 341, 341', 341" and pill pusher 338, 338', 338" have cooperating surfaces that allow the floatable interlock member 341, 341', 341" to travel along the surface of the pill pusher 338, 338', 338" as the pill pusher 338, 338', 338" moves laterally without binding. In some embodiments, the flat surface of the pill pusher 338 and the curvilinear profile of the floatable interlock member 341, 341', 341" may be inverted. In other embodiments, the floatable interlock member 341, 341', 341" and pill pusher 338, 338', 338" may both have cooperating surfaces that may abut each other at one or more times during operation and that may have any suitable cooperating shape(s) facilitating the desired movements of the floatable interlock member 341, 341', 341".

The hinge release button 35 can remain at least partially inwardly positioned relative to the outward (disengaged or extended state or position of the hinge release button) position while a user continues to rotate the carriage 34 to stow, with the spring 337, 337' compressed inward a greater degree than when the hinge release button 35 is disengaged/in the extended state, and then can automatically extend outward when the carriage 34 rotates fully into the stow position.

Figure 34C:
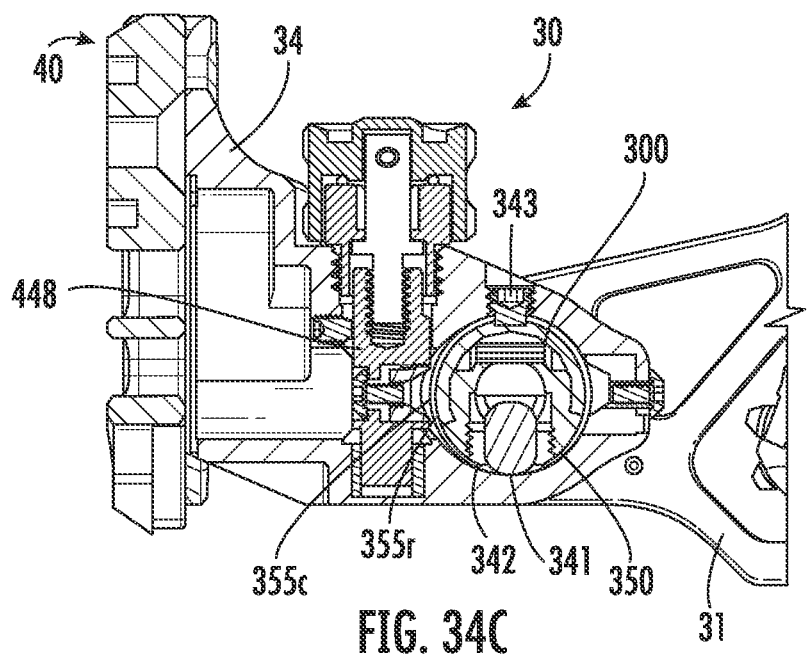
Figure 34D:
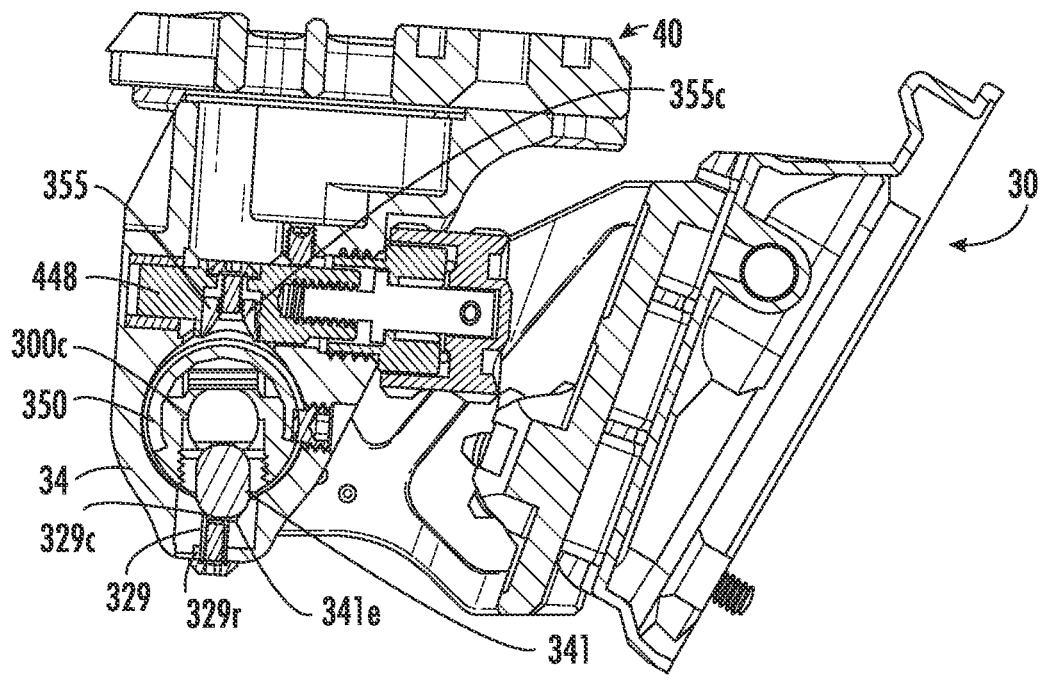

Referring to FIGS. 34A-34D, as the carriage 34, device mounting plate 40, and vision device 50 are rotated toward stow, the ramp 355r, 448e provided by the tilt insert 355 or tilt adjustment member 448" pushes the pill 341p into the internal channel 350 of the carriage 34 (FIG. 34B), unlocking the hinge assembly and carriage from the gantry 31 and allowing the carriage 34 to rotate about the hinge axis provided by the static hinge axle 300 (FIG. 34C). The hinge release button 35 can be released by a user at this point. The pill 341p rides along a track in the channel 350 of the carriage 34 until the carriage 34 has rotated to the stow position whereby the pill 341p can exit the channel 350 and a lower facing end portion 341e of the pill 341p can enter the stow detent 329 to lock the carriage 34 into the stow position (FIG. 34D).

The spring 337 can push the pusher 338 laterally, and the ramped profile 338p in turn pushes the pill 341p radially outward into the stow detent 329. Gravity can help pull the pill 341p into the stow detent 329 and/or sleeve 1329, 1329' once the carriage 34 is rotated fully into the stow position whereby the stow detent 329 and/or aperture 1333 of the sleeve 1329, 1329' is aligned with a travel path of the pill in the bore of the channel 350. It is also contemplated that a magnet can be provided in the stow detent 329 and used to magnetically pull the pill 341p into the stow detent 329 and/or sleeve 1329 or repel the pill 341p outward from the insert and/or sleeve 1329, 1329' (not shown).

Once in the stow position, a user can depress the hinge release button 35 to release the hinge mechanism and allow the carriage 34 to rotate in the reverse direction to the deployed position, reversing the travel of the pill 341p back to tilt adjustment member cavity 448c and/or the tilt insert 355. That is, depression of the hinge release button 35 pushes the pill pusher 338 laterally inward, aligning the increased height segment of the curvilinear profile 338p to reside over the pill 341p (the same orientation of the pill 341p and pill pusher 338 orientation shown in FIGS. 33A, 33B) to unlock the stow position. The curvature or ramping geometry 329r (FIG. 34D) of the stow detent 329 can push the loose pill 341p up into the cylindrical, laterally extending bore 350 of the carriage 34 as the carriage 34 is rotated with the pusher at least partially depressed inward. A user can then continue to rotate the carriage 34 to the deploy position. In the deploy position, the pill 341p is once again outside the bore of the laterally extending channel 350 holding the hinge axle 300, the pill pusher 338 retracts and pushes the pill 341p down into the tilt insert 355 and/or shaped cavity 448c of the tilt member 448, 448', 448".

The pocket or cavity 329c of the stow detent 329 can face the pocket or cavity 355c of the tilt insert 355 and/or pocket or cavity 448c of the tilt adjustment member 448, across the channel 350 of the carriage 34 in the stow position but may exist in other orientations in other embodiments.

When in the "dropped" position (FIG. 34A), the tilt insert 355, can provide compliant adjustment, e.g., can translate up/down and a biasing member can be used to create more room thereat when needed.

Figure 35A:
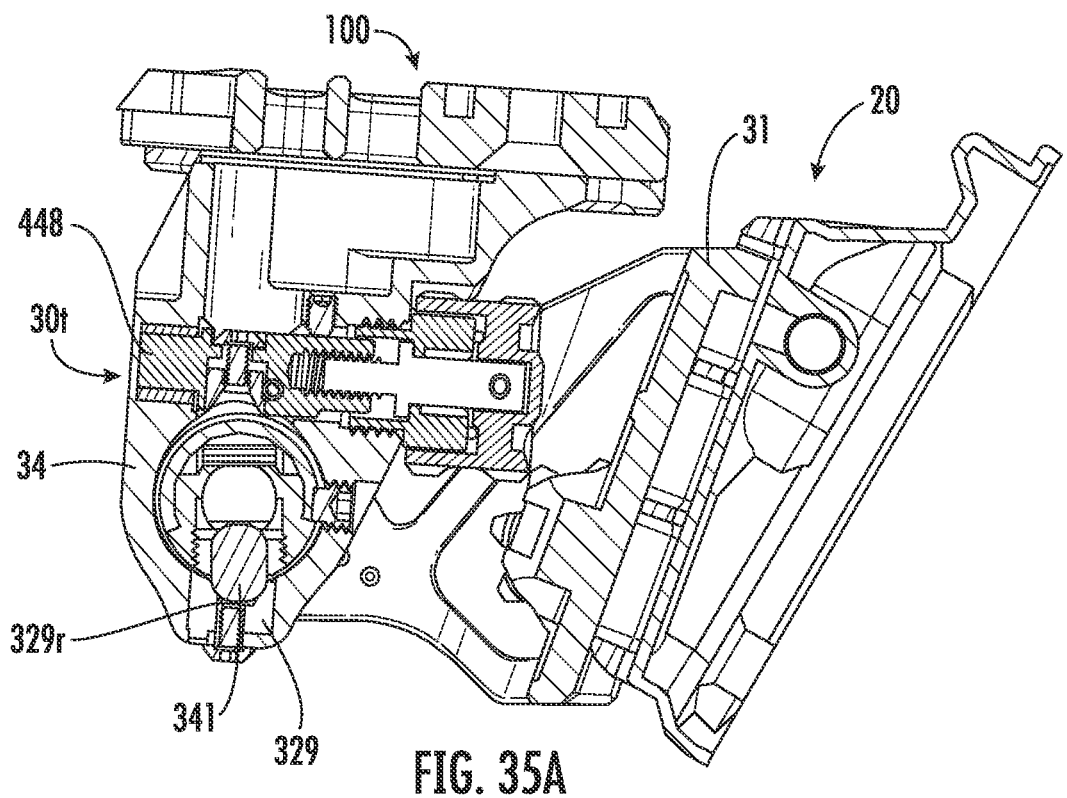
FIG. 35A and FIG. 35B are side sectional views of the gantry and carriage assembly (attached to the shroud adapter assembly and shroud) in a stow position, with FIG. 35A showing a tilt setting fully down and FIG. 35B showing a tilt setting fully up, to illustrate that the tilt setting has no impact on the stow position of the device mount plate according to embodiments of the present invention.
Figure 35B:
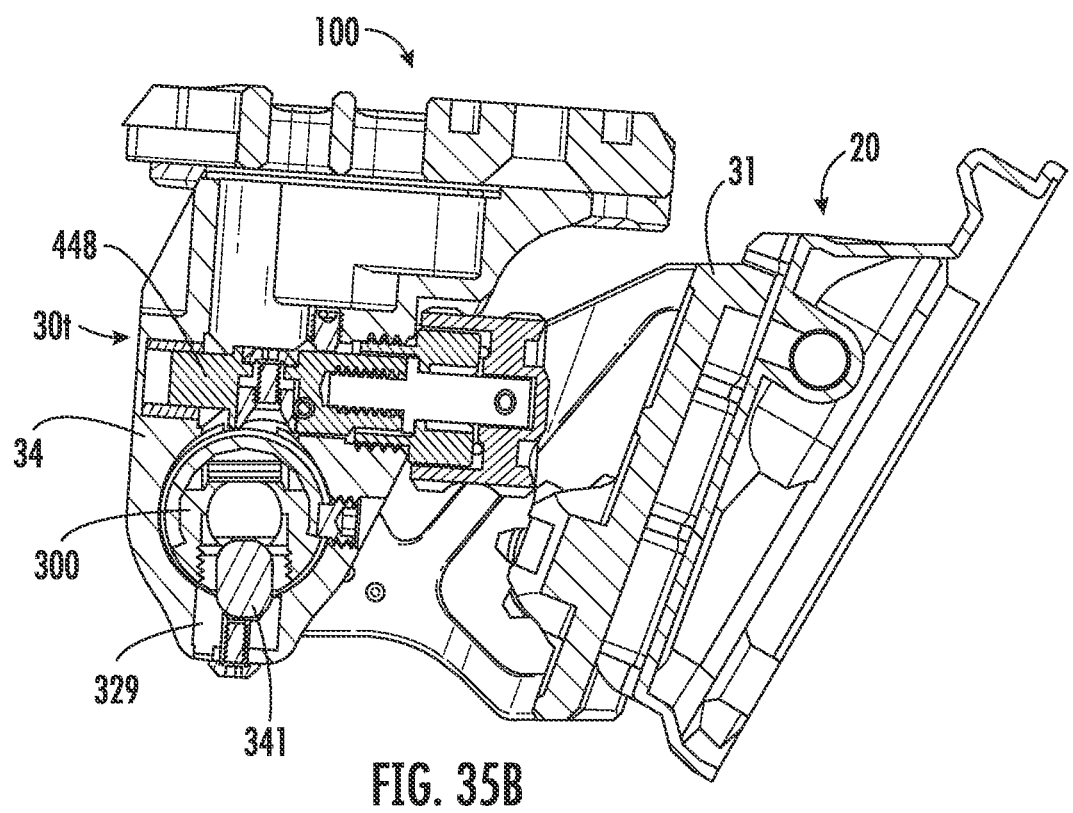
Figure 36:
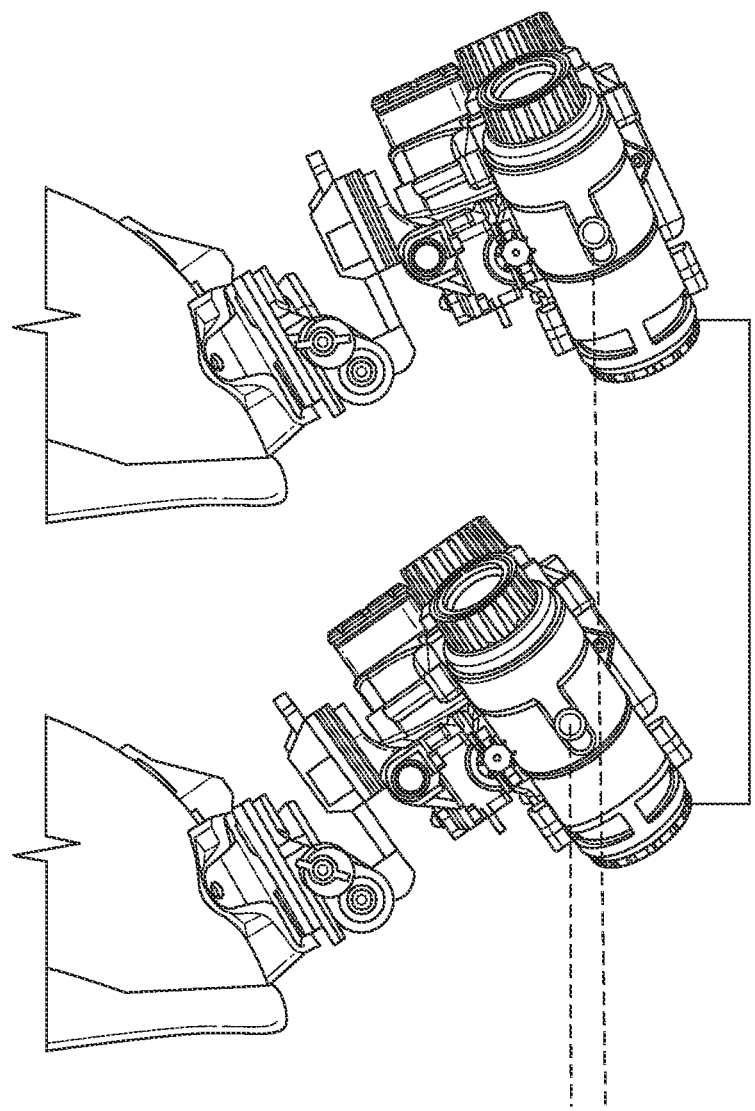
FIG. 36 illustrates an example prior art mounting system with tilt settings fully down and up (bottom image) which places the night vision goggle at different stow positions which change the pitch torque exerted on a user.

FIGS. 35A and 35B illustrate that the mounting system 100 can provide a common stow position irrespective of a user-selected tilt position for the deployed position. FIG. 35A illustrates the tilt assembly 30t with the tilt adjustment member 448 fully extended in an aft direction for a tilt setting fully up. FIG. 35B illustrates the tilt assembly 30t with the tilt adjustment member 448 fully retracted in a fore direction for a tilt setting fully down. FIGS. 35A and 35B have the same stow position relative to the shroud adapter assembly 20 and the shroud 10 and each positions the pill 341p in the stow detent 329 to lock into the stow position. FIG. 36 illustrates tilt mechanisms of another mounting system where user tilt settings affect the goggles position in both the stowed and deployed states. As a result, the stow position can vary between users and, hence, is not optimized with respect to torque and clearance for many users.

Each kind of night vision goggle or vision or optical devices has a different optimal stow position. As noted above, the mounting system 100 of the present invention may be used with multiple types of night vision goggles and other vision or optical devices. In some embodiments, the mounting system 100 may be manufactured with a preconfigured stow position optimized for a specific vision system. In other embodiments, the mounting system 100 may be manufactured such that the end user may adjust the stow position (i.e., the rotational position and/or angle of stow) for use with multiple night vision goggle systems or vision systems. For example, in some embodiments, the stow detent 329 is provided as first and second stow detents that are circumferentially spaced apart in a range of between about 2 degrees and about 90 degrees thereby providing different stow positions to accommodate components of different vision systems and allow a stow position of the different vision systems to be optimized. For example, when compared to other vision systems, Heads-Up Displays can be lighter and require less movement to adjust to a stow position that provides a clear line of sight for a user. The stow detent(s) can optionally be provided, at least in part, by a corresponding aperture in the sleeve 1329, 1329' held inside the hinge axle 300. The stow position can be tilt agnostic across a full range of motion tilt provided by the vision mounting system 100.

The ramping geometries of the tilt adjustment member 448, the tilt insert 355 and/or the stow detent 329 or sleeve 1329, 1329' can be configured to drive the pill 341p up and into the laterally extending channel 350 of the carriage to allow the carriage 34 to rotate about the hinge axle/axis. The sleeve 1329, 1329' can be bonded to the internal channel of the cylindrical segment of the carriage 34 and the hinge does not rotate.

The pill 341p can be formed of a hardened steel material. As noted above, the pill 341p can be also formed of other non-metal materials (e.g., ceramic, high-strength polymers (with or without fiber reinforcement), and fiber-reinforced composite material). The sleeve or bushing 342 and/or 1329, 1329' partially surrounding the pill 341p can be formed of steel but may be formed of other materials in other embodiments. The sleeve or bushing 342 and/or 1329, 1329' can be configured to provide a snug fit with mating components allowing the pill 341p to slide into and out of the bore 350 to retain the orientation of the pill in an elongate orientation to be able to move radially into position. Other features can be formed of aluminum or polymers to minimize weight of the mounting system 100 while being able to accommodate NVG devices 50 and have structural rigidity to be able to withstand forces applied during use.

A set screw 343 (FIGS. 32C, 34A, for example) which is coupled to the outer surface of the carriage 34 and the hinge axle 300 can prevent over-hinging and/or prevent the mounting system 100 from hitting a nose of a user upon redeployment. FIG. 29C shows the set screw 343 abutting a stop feature on the hinge axle 300 in the lowest tilt adjustment. FIG. 34D shows how the set screw 343 abuts an opposing stop feature to prevent over rotation past the stowed position.

The mounting system 100 can be configured to accommodate different goggle mounting plates for mounting different types of goggles. FIGS. 37A, 37B illustrate a BNVIS mount interface 50m which can be mounted to the corresponding goggle 50 and the mounting plate 40" without requiring modification to the carriage 34 thereby providing an agnostic mounting system 100 which can be used for at least two different types of goggles 50.

Figure 39A:
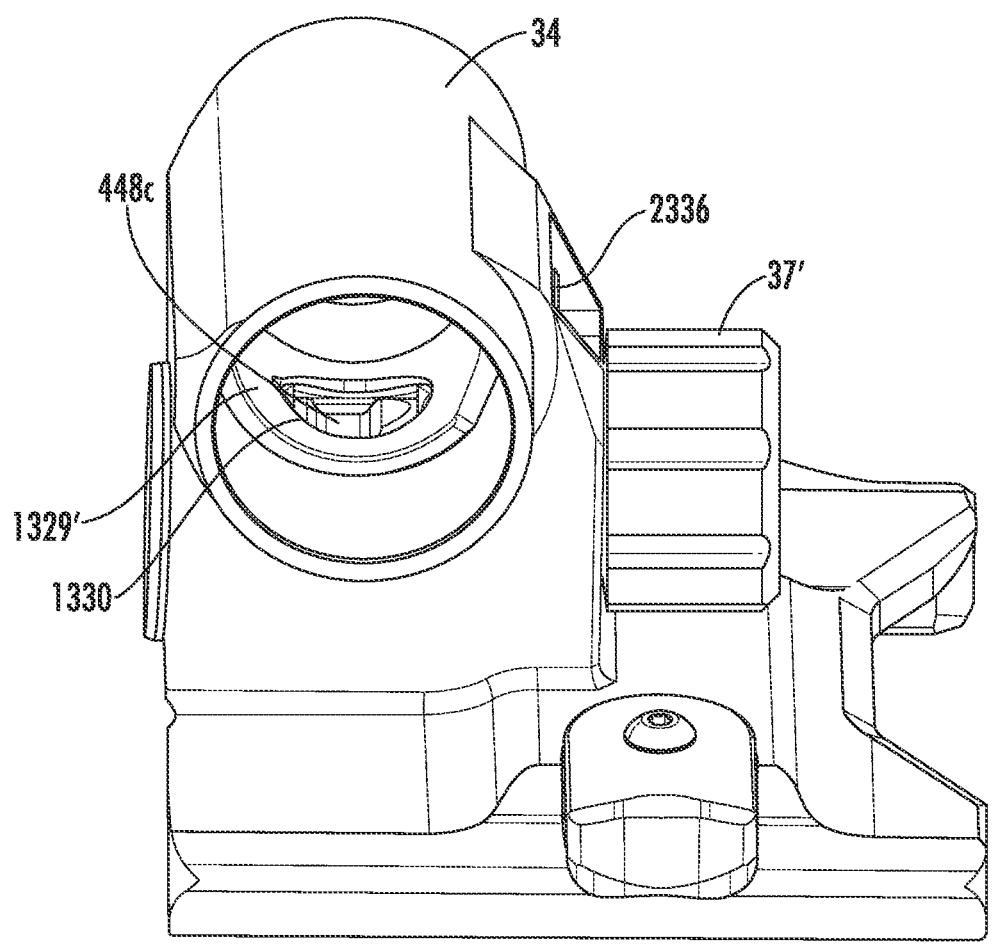
FIGS. 39A-39C are partial assembly views of some of the components of the mounting system shown in FIG. 38.
Figure 39B:
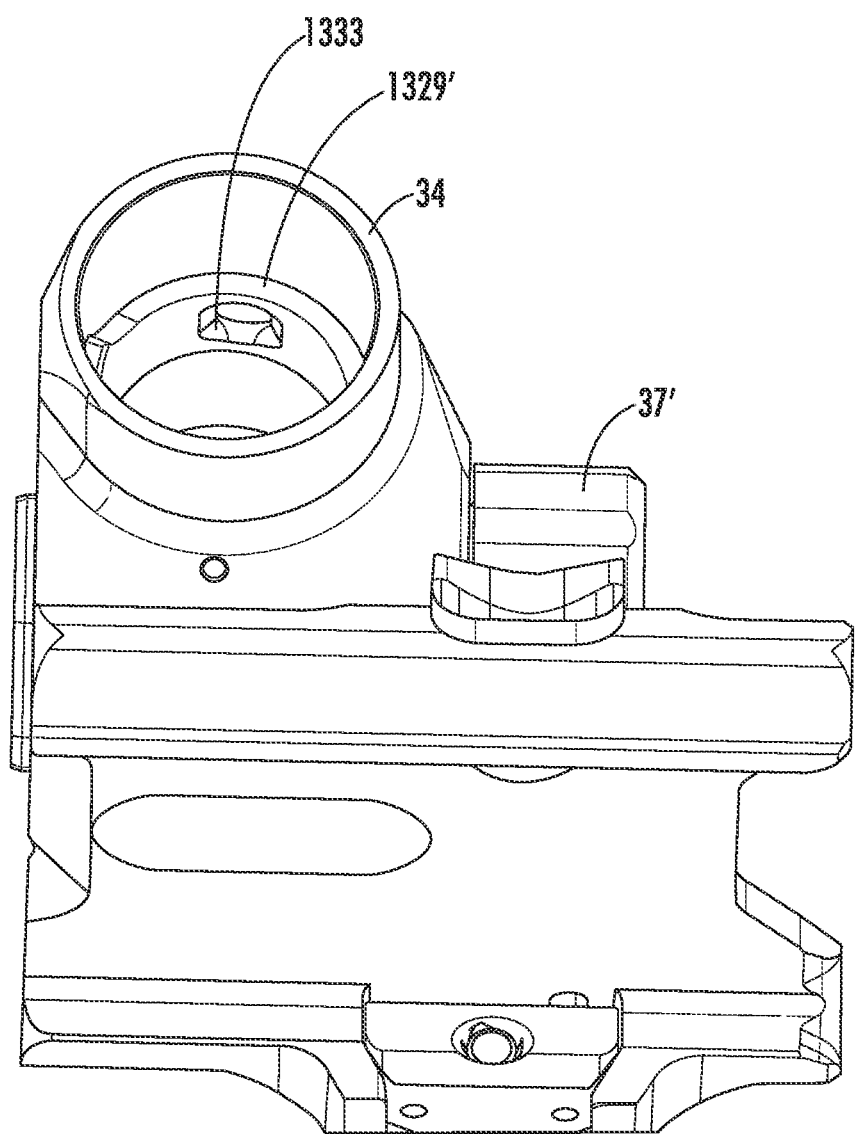
Figure 39C:
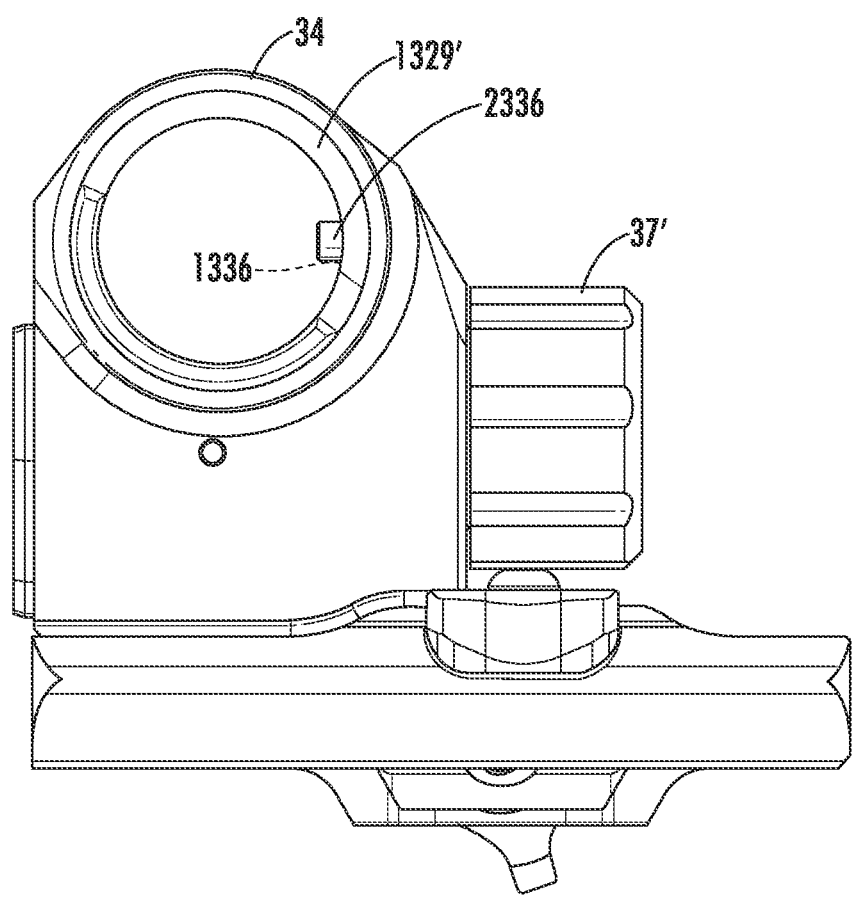

Turning now to FIGS. 38, 39A-39C, 40A-40C and 41, another embodiment of the mounting system 100 is shown. As shown in FIG. 38, the pill 341p discussed above with respect to FIGS. 26D-26E is used. Also, in this embodiment, the stow sleeve 1329' comprises the first aperture 1330 and the stow detent 1333 and also includes a plurality of secondary apertures 1336 that receive fixation members. A fixation member(s) 2337 can extend through a respective apertures 1336 in the stow sleeve 1329' to affix the stow sleeve 1329' to the carriage 34 so that it does not rotate relative to the carriage 34 as the carriage 34 moves/rotates between stow and deployed positions. A hinge limit member 2336 can extend through one of the apertures 1336 in the stow sleeve 1329', as shown in FIGS. 38, 39A, the aperture 1336 that is adjacent and facing the knob 37', can define a hinge limit detent/stop.

The pill 341p can be configured to not rotate with the carriage 34, forming part of the axle for rigidity. Based on the mechanics of the design of the mounting system 100 and manufacturing tolerances, small movements of components in the hinge assembly 30h or tilt assembly 30t can result in disproportionately large movements in the mounted vision system. Thus, to meet design parameter objectives and/or as a result of cooperating component configurations, the components of the hinge assembly 30h and the tilt assembly 30t may provide a movement ratio in a range of about 2:1 to about 30:1, for example, a 20:1 movement ratio. Advantageously, this allows for the relatively small, controlled movement of some components, such as the tilt adjustment member 448, to provide a large range of motion in tilt in a small and lightweight configuration resulting in a performance advantage over known existing mounting systems.

The mounting system 100 can include a plurality of O-rings that cooperate with various components such as the pill pusher 338' and the tilt adjustment member 448".

Figure 41:
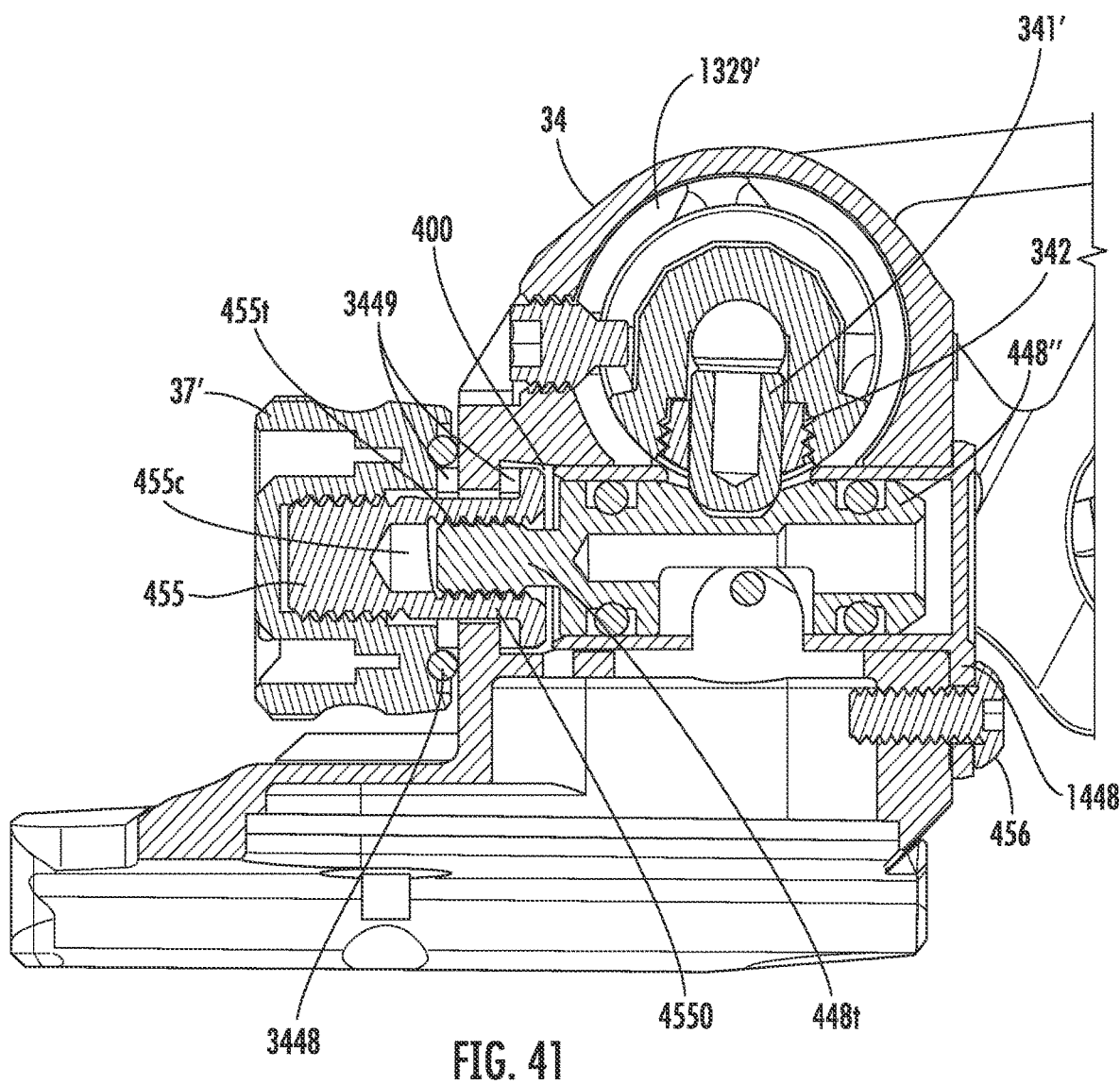
FIG. 41 is a partial section view of another embodiment of the tilt adjustment assembly according to embodiments of the present invention.

As shown, the mounting system 100 also comprises a tilt (adjustment) member 448" that cooperates with and extends inside a tilt member sleeve 448s. FIG. 39A illustrates the tilt member 448" with the pill cavity 448c inside the sleeve 448s, aligned with the aperture 448a of the sleeve 448s and with the first aperture 1330 of the stow sleeve 1329'. The knob 37' can be epoxied or otherwise affixed to the tilt nut 455 to define a unitary assembly. The tilt nut 455 and knob 37' can comprise a screw clamp 4550 that cooperates with thrust bearings or washers 3449. The tilt nut 455 may have an open channel 455c with a threaded inner surface 455t that is coupled to a threaded end 448t of the tilt adjustment member 448". As shown in FIG. 41, a first thrust washer 3449 resides inside a wall of the carriage 34 and a second thrust washer 3449 resides outside the wall of the carriage 34, closer to the knob 37' than the first thrust washer 3449. The first and second thrust washers 3449 may reside about the tilt nut 455 with the threaded end 448t of the tilt adjustment member 448" inside the tilt nut 455.

The tilt adjustment member sleeve 448s can be coupled to the carriage 34 with fastener 456. A flange or fixation bracket 1448 is integral with an inner end of the tilt member sleeve 448s. The flange or fixation bracket 1448 has an aperture through which the fastener 456 passes and fixes the tilt adjustment member sleeve 448s to the carriage 34. The flange or fixation bracket 1448 defines a load path for transmission of an external blunt force applied against the goggle 50 due to inadvertent contact with an object, thereby preventing damage to components of the mounting system. The tilt adjustment member 448" can comprise O-rings 2448 and another, larger O-ring 3448 can be coupled to the tilt knob 37'. The larger O-ring 3448 may be arranged about the second thrust washer 3449 and reside between the knob 37' and the carriage 34 to define a seal interface between the knob 37' and the carriage 34.

The pill pusher 338, 338', 338" can comprise at least one O-ring 339, 1339 and threads 338t on an outer end portion that cooperates with the button 35'. The pill pusher 338, 338', 338" can be spring loaded via a spring 337' in the hinge axle 300.

The pill pusher 338, 338', 338" can be configured to continuously push against the pill 341p.

Figure 40A:
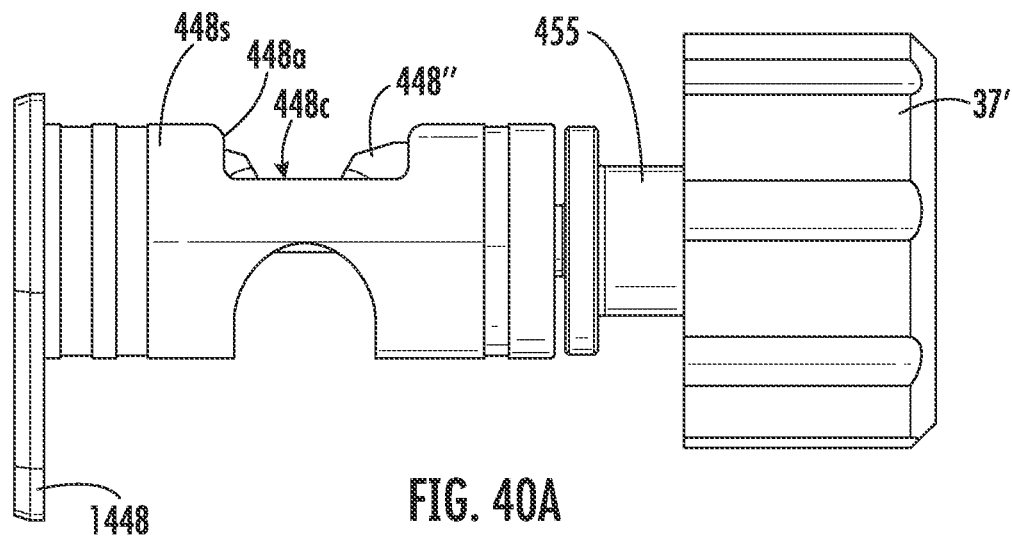
FIG. 40A is a side assembly view of the tilt member sleeve and tilt (adjustment) member shown in FIG. 38 according to embodiments of the present invention.
Figure 40B:
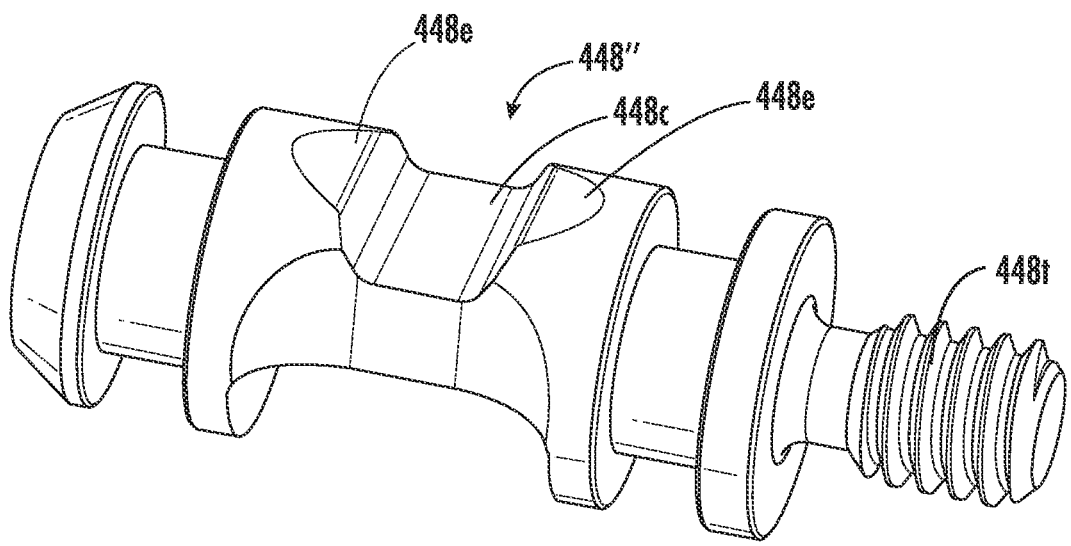
FIG. 40B is an enlarged side perspective view of the tilt member shown in FIG. 38 and FIG. 40A.
Figure 40C:
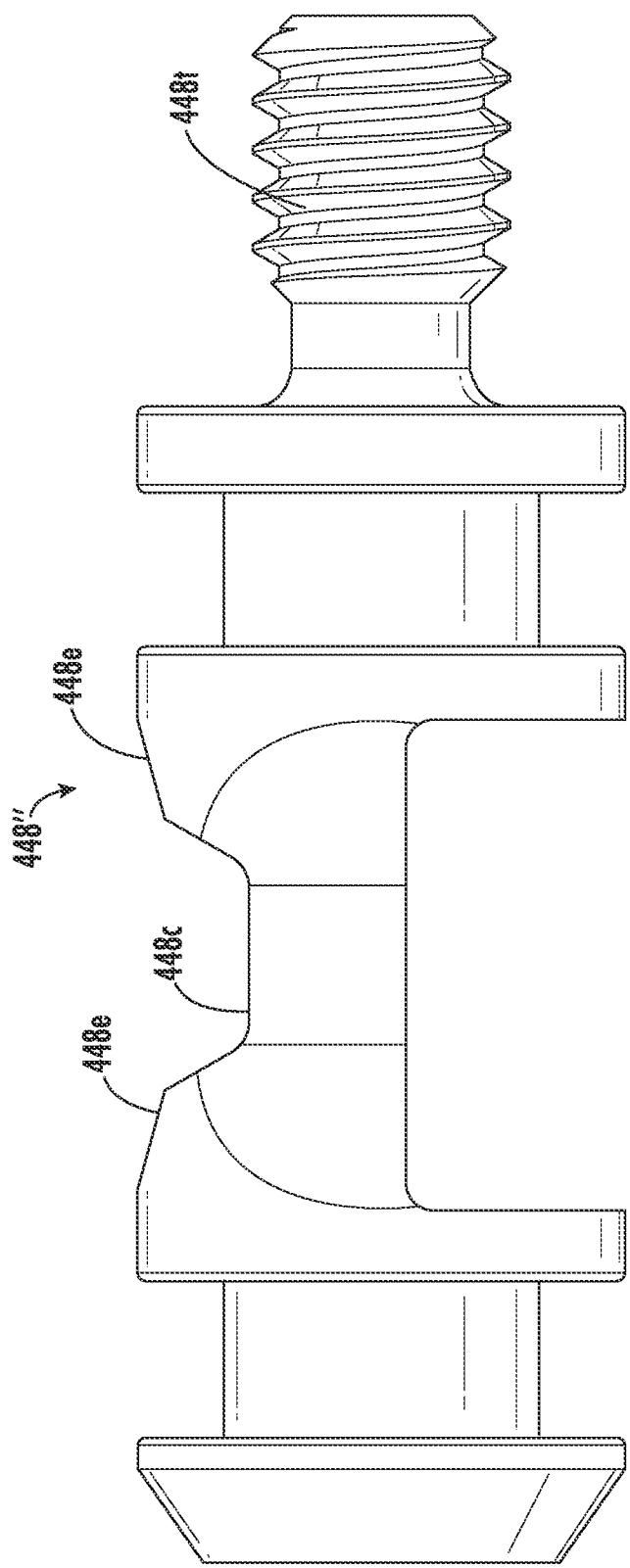
FIG. 40C is an enlarged side view of the tilt member shown in FIG. 40B.

Turning now to FIGS. 40A-40C, the tilt adjustment member 448" inside the sleeve 448s with the aperture 448a aligned with the pill cavity 448c that faces the pill 341p. The pill 341p travels up and down over stroke ends 448e of the tilt ramp provided by tilt adjustment member 448", which function as transition geometry to facilitate the movement of the pill 341p into and out of the stow sleeve 1329, 1329' as the carriage 34 rotates between the deployed state and the stowed state.

Figure 45:
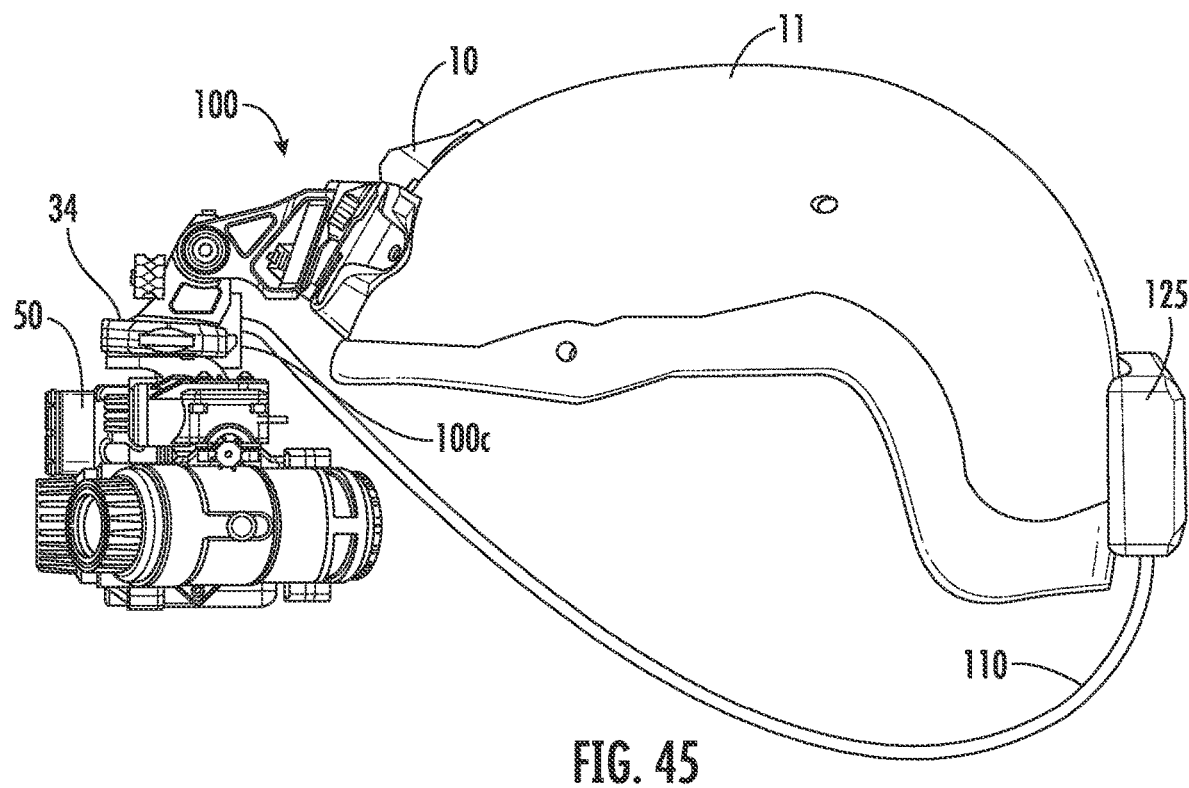
FIG. 45 illustrates a mounting system with a fused panoramic night vision goggle and also with a battery pack mounted to a helmet according to embodiments of the present invention.

FIG. 45 illustrates the mounting system 100 can be configured to provide a cable attachment 100c for routing a cable 110 between a battery pack 125, which may be provided on the helmet 11, and the goggle 50.

The mounting system 100 can be configured to provide different defined stow positions that can be the same for a full range of motion of a tilt setting provided by the vision mounting system 100. The selectable stow positions of the mounting system 100 may be accomplished in several different ways. For example, in some embodiments, the mounting system 100 can be configured to interchangeably use one of two or more different configurations of respective stow sleeves 1329, 1329', each of which can provide the stow detent 329 in a different location circumferentially within the stow sleeve 1329, 1329'. In other embodiments, the stow sleeve 1329, 1329' may be rotationally moved about the hinge axle 300 between two or more positions, thereby changing the location of the stow detent 329 relative to the carriage 34. In further embodiments, the hinge axle 300 may be rotated relative to the gantry 31 between two or more positions to change the stow position of the carriage 34 relative to the gantry 31.

FIGS. 46A-54 illustrate that the vision mounting system 100 can comprise a selectable (adjustable) stow position sub-assembly. These figures show alternative selectable stow position sub-assemblies 1200, 1220, 1240, 1260, 1280, 1300, 1320 according to embodiments of the present invention that can be implemented into the mounting system 100 to provide selectable stow positions for a respective vision mounting system whereby the vision mounting system is configured to accommodate different configurations and/or types of vision systems. In some embodiments, a flange 300*f* of the hinge axle 300 cooperates with the arm 31*a* of the gantry 31 to provide and/or accommodate different selectable stow position sub-assembly components.

Figure 46A:
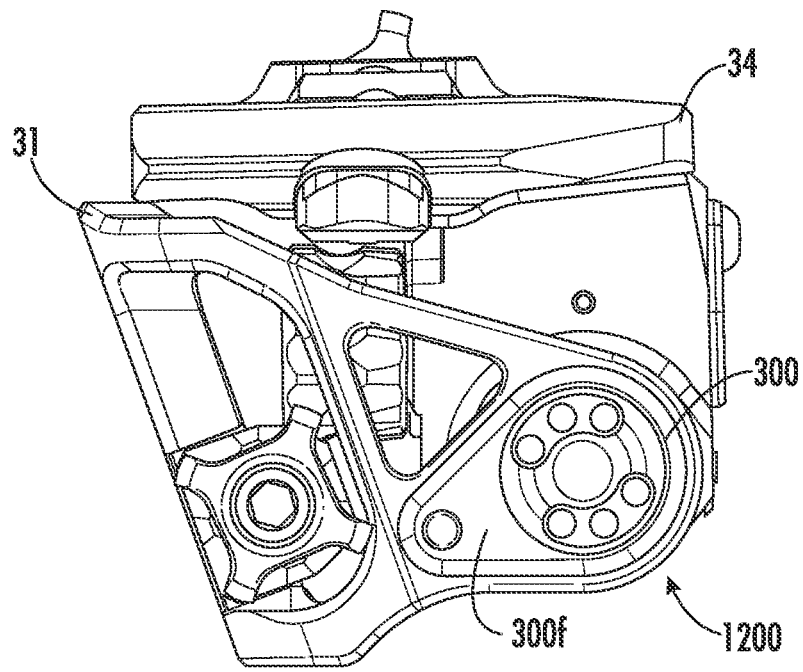
FIG. 46A and FIG. 46B are partial side views of a stow position sub-assembly that rotationally changes the position of the hinge axle relative to the gantry according to embodiments of the present invention.
Figure 46B:
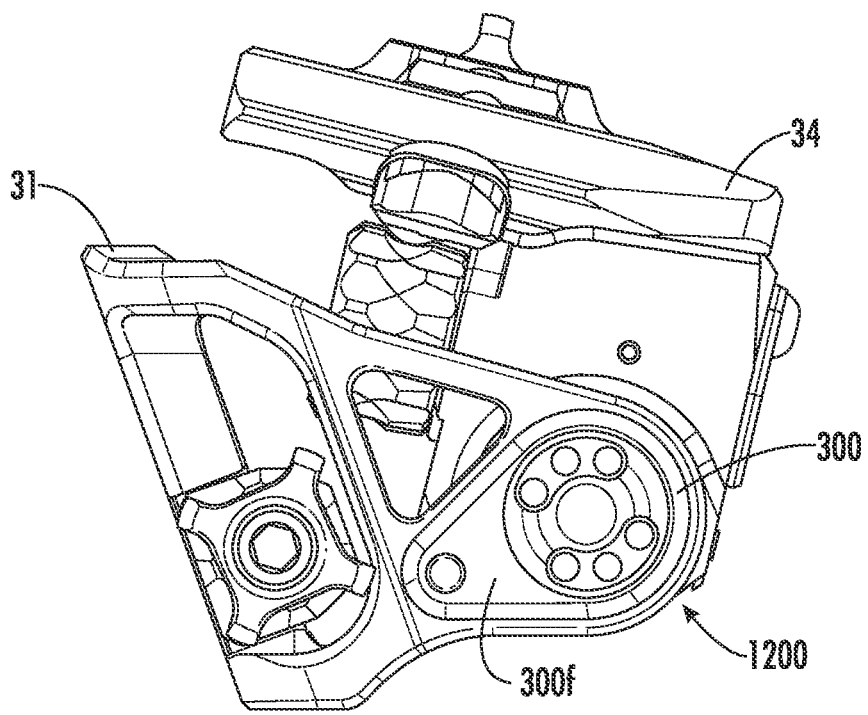
Figure 46C:
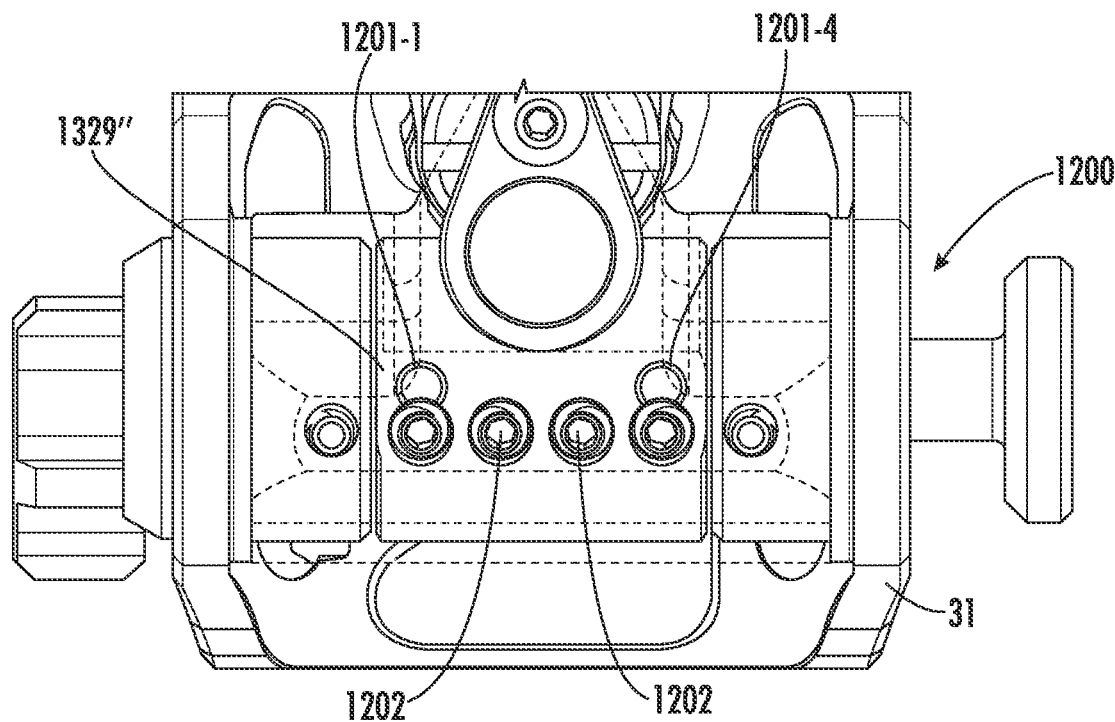
FIG. 46C and FIG. 46D are partially transparent front views of the stow position sub-assembly assembly of FIG. 46A and FIG. 46B illustrating setscrews used to selectively position the stow sleeve rotationally in the carriage.
Figure 46D:
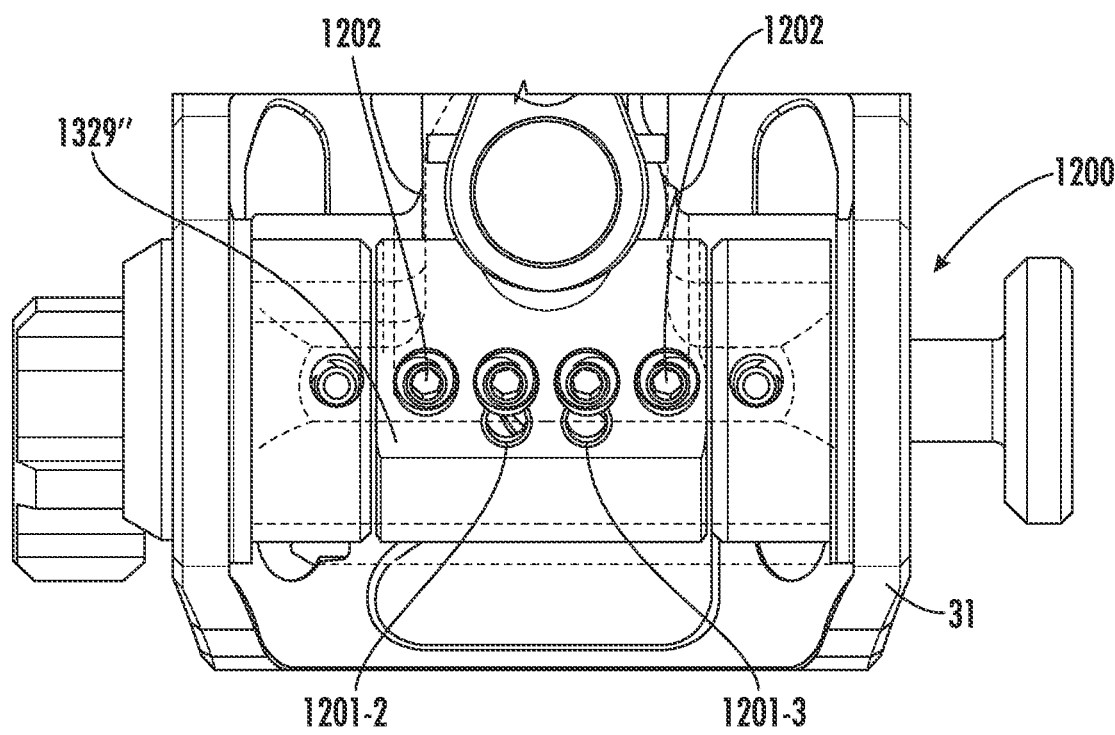

Referring to FIGS. 46A-46D, a selectable stow position sub-assembly 1200 according to embodiments of the present invention is illustrated. As shown in FIGS. 46A-46D, the stow sleeve 1329" can be rotationally positioned in the carriage 34 in multiple discrete orientations. For example, FIG. 46A illustrates a first stow position and FIG. 46B illustrates a second stow position. The stow sleeve 1329" is secured to the carriage 34 with fasteners 1202 which may be threaded fasteners 1202 (e.g., setscrews). Other means for securing the stow sleeve 1329" to the carriage 34 may be used. As shown in FIGS. 46C-46D, in some embodiments, the stow sleeve 1329" has a series of holes 1201. While four holes 1201 are shown in FIGS. 46C-46D (i.e., 1201-1, 1201-2, 1201-3, 1201-4), the stow sleeve 1329" may comprise more or less than four holes. To change the stow position, the fasteners 1202 are removed from one set of holes 1201 in the stow sleeve 1329" (e.g., holes 1201-2 and 1201-3 in FIG. 46C), and the sleeve 1329" is rotated until a second set of holes 1201 is aligned. The fasteners 1202 are installed in a second set of holes 1201 in the stow sleeve 1329" (e.g., holes 1201-1 and 1201-4 in FIG. 46D), thereby changing the stow position. In some embodiments, a second pair of fasteners 1202 may be used to seal the holes needed for other orientation(s) (i.e., not currently being used) to prevent any dirt ingress. FIG. 46C illustrates the fasteners 1202 positioning the stow sleeve 1329" relative to the carriage 34 in a first orientation and FIG. 46D illustrate the threaded fasteners 1202 positioning the stow sleeve 1329" relative to the carriage 34 in a second orientation.

Figure 47A:
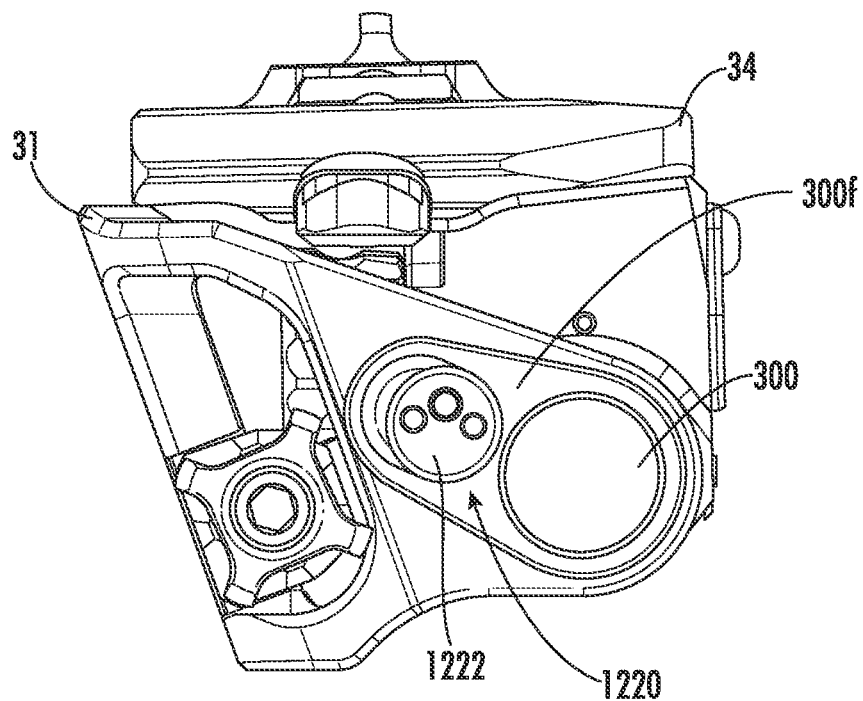
FIG. 47A and FIG. 47B are partial side views of another embodiment of a stow position sub-assembly which includes a single cam to rotationally change the position of the hinge axle relative to the gantry according to embodiments of the present invention.
Figure 47B:
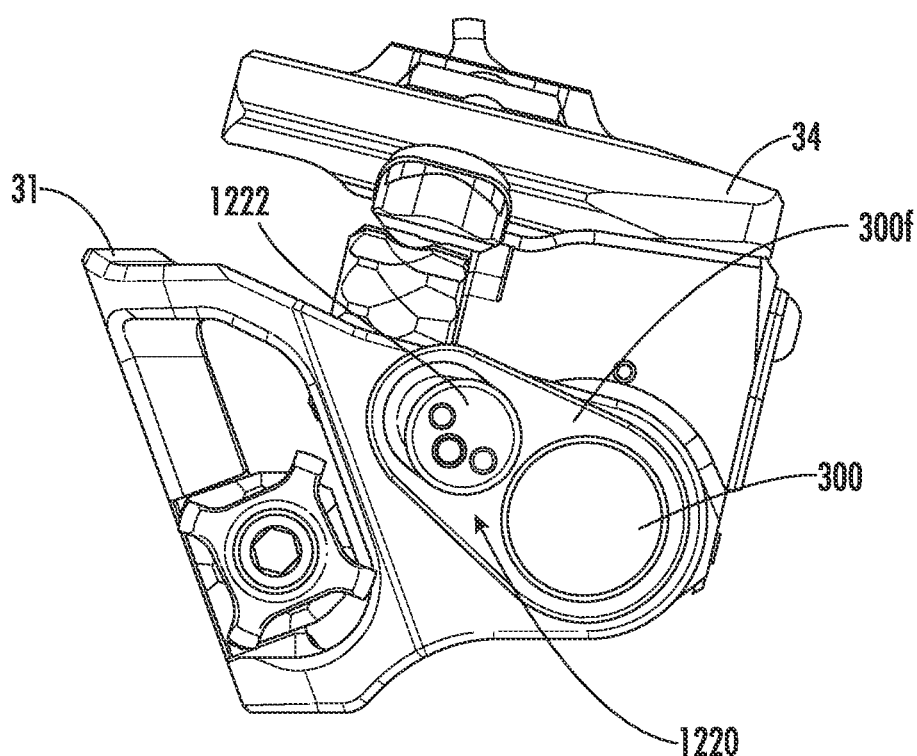
Figure 47C:
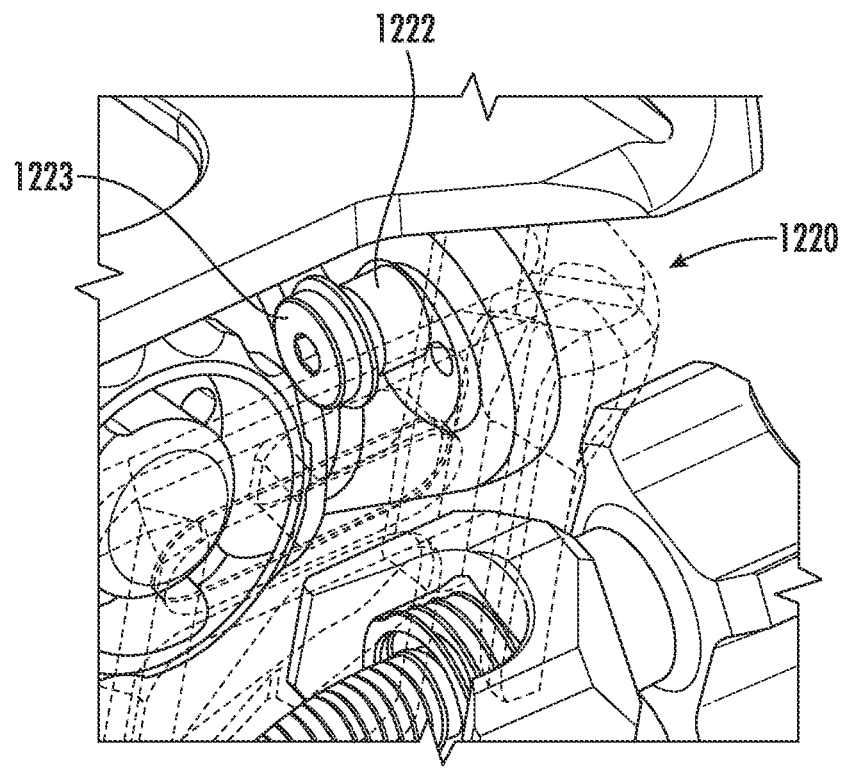
FIG. 47C and FIG. 47D are partially transparent perspective views of the stow position sub-assembly of FIG. 47A and FIG. 47B illustrating the function of the single cam according to embodiments of the present invention.
Figure 47D:
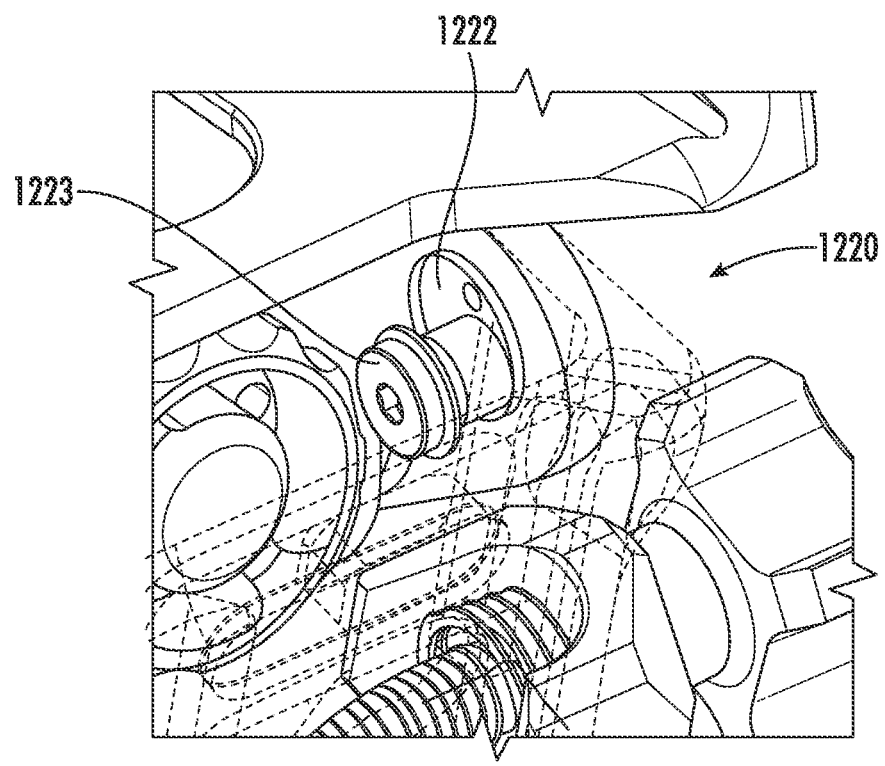
Figure 48A:
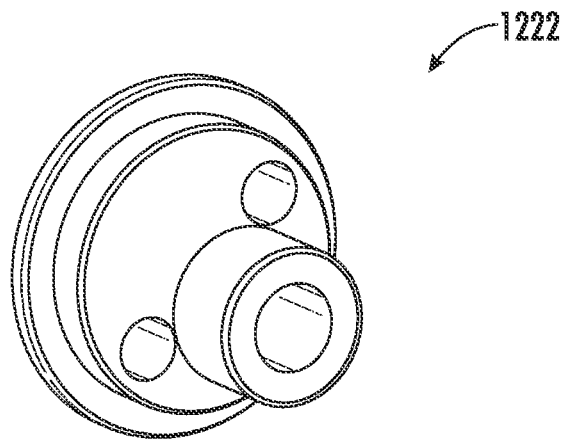
FIGS. 48A-48C are perspective views of an exemplary eccentric single cam according to embodiments of the present invention that may be used in the stow position sub-assembly of FIGS. 47A-47D.
Figure 48B:
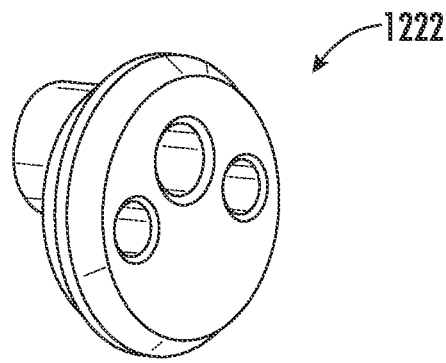
Figure 48C:
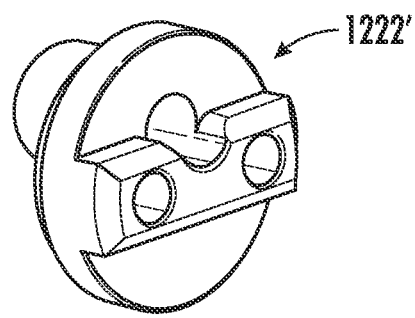

Referring to FIGS. 47A-47D, another embodiment of a selectable stow position sub-assembly 1220 according to embodiments of the present invention is illustrated. FIG. 47A illustrates a first stow position and FIG. 47B illustrates a second stow position. As shown in FIGS. 47A-47D, the sub-assembly 1220 includes a single eccentric cam 1222 that is used to rotationally change the position of the hinge axle 300 relative to the gantry 31. Exemplary cams 1222, 1222' that may be used in sub-assembly 1220 are shown in FIGS. 48A-48C. As shown in FIGS. 47C-47D, to change the position of the hinge axle 300 relative to the gantry 31, a user first loosens a cam clamp screw 1223 on the inside of the gantry 31 which allows the cam 1222 to be rotated relative to hinge axle 300 using a wrench or other tool. In other embodiments, the cam 1222' may not require a tool to rotate, but instead includes other feature(s) that allow the cam 1222' to be manipulated (i.e., rotated) by hand (see FIG. 48C). After the cam 1222, 1222' is rotated and the position of the hinge axle 300 is adjusted relative to gantry 31 to the desired stow position, the cam clamp screw 1223 is retightened to secure the cam 1222, 1222', and hinge axle 300, in place.

Figure 49A:
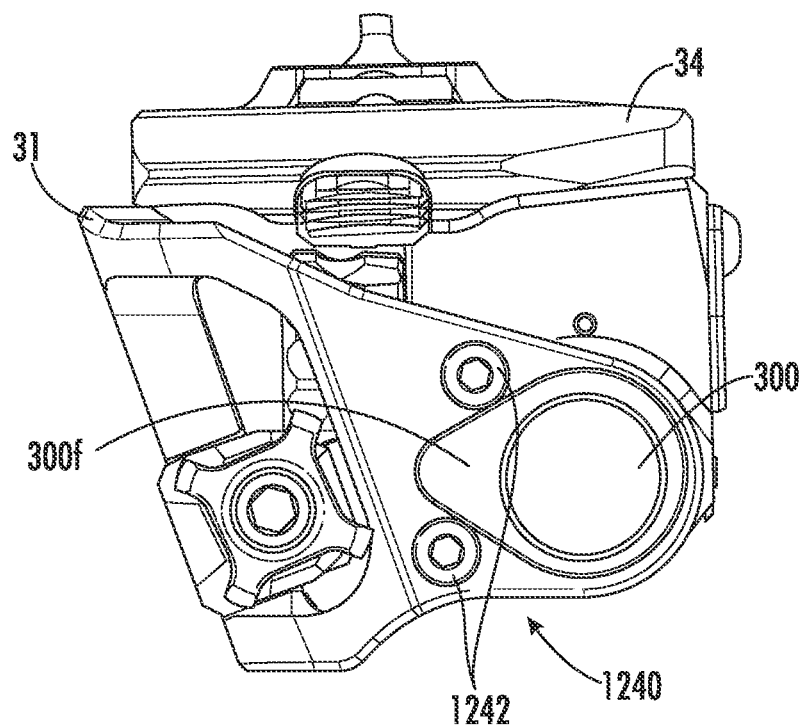
FIG. 49A and FIG. 49B are partial side views of another embodiment of a stow position sub-assembly which includes a dual cam to rotationally change the position of the hinge axle relative to the gantry according to embodiments of the present invention.
Figure 49B:
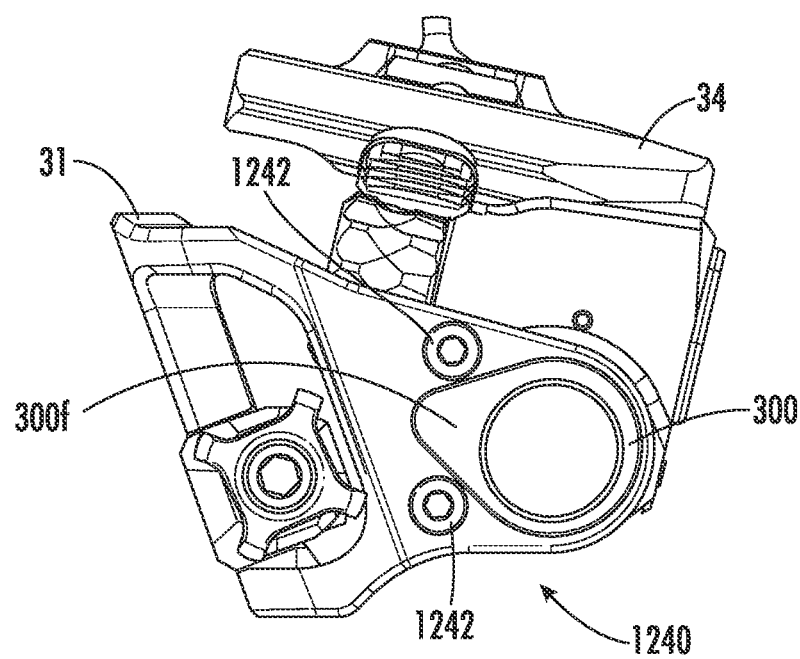
Figure 49C:
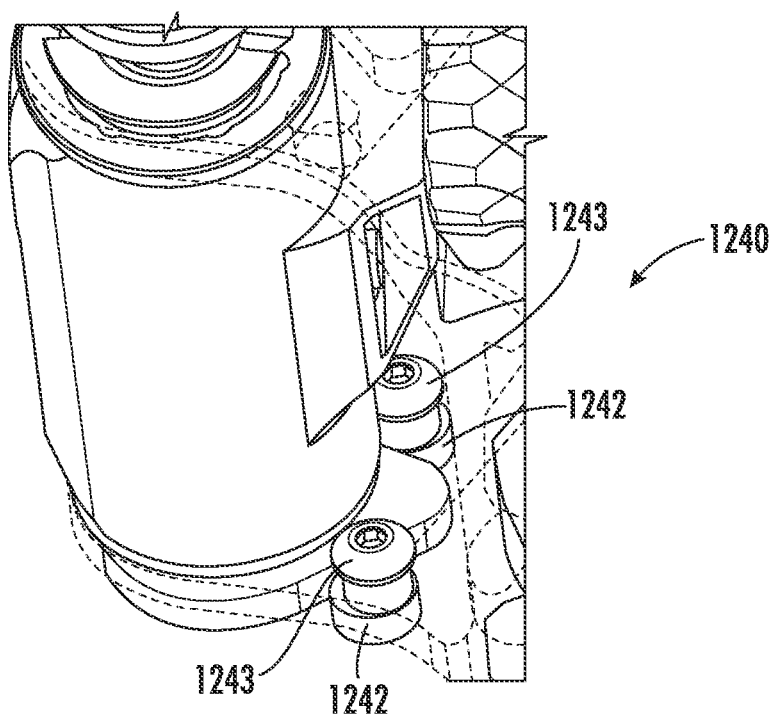
FIG. 49C and FIG. 49D are partially transparent perspective views of the stow position sub-assembly of FIG. 49A and FIG. 49B illustrating the function of the dual cam according to embodiments of the present invention.
Figure 49D:
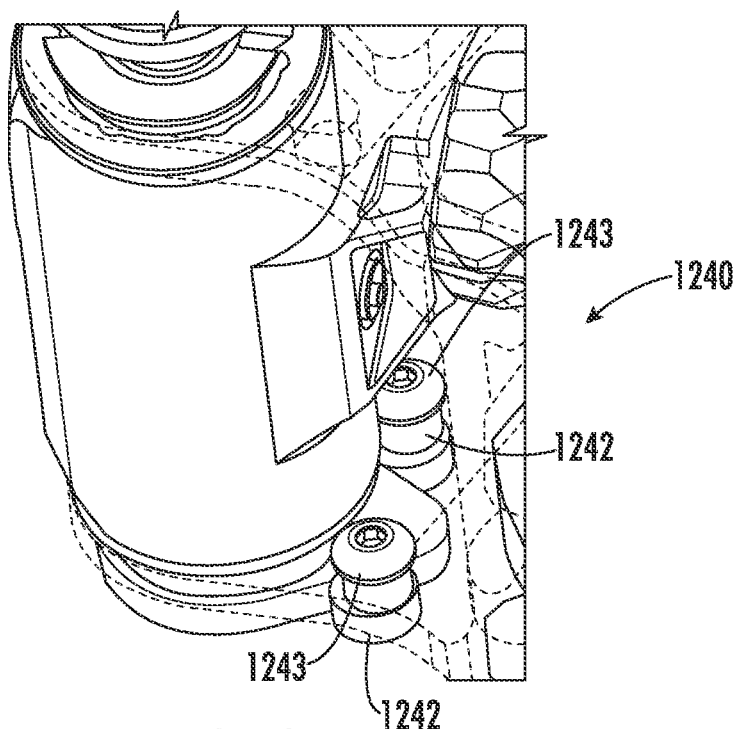
Figure 50:
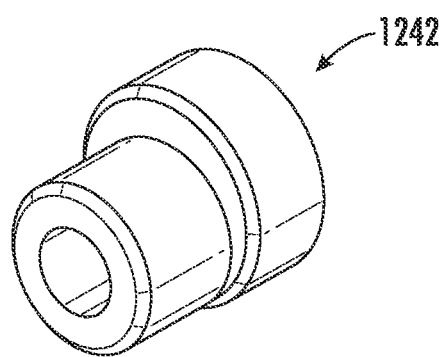
FIG. 50 is a rear perspective view of an exemplary eccentric cam according to embodiments of the present invention that may be used in the stow position sub-assembly of FIGS. 49A-49D.

Referring to FIGS. 49A-49D, another embodiment of a selectable stow position sub-assembly 1240 according to embodiments of the present invention is illustrated. FIG. 49A illustrates a first stow position and FIG. 49B illustrates a second stow position. As shown in FIGS. 49A-49D, the sub-assembly 1240 includes dual eccentric cams 1242 that are used to rotationally change the position of the hinge axle 300 relative to the gantry 31. An exemplary cam 1242 that may be used in sub-assembly 1240 is shown in FIG. 50. Similar to the single cam sub-assembly 1220 described above, to change the position of the hinge axle 300 relative to the gantry 31, a user first loosens the cam clamp screws 1243 on the inside of the gantry 31 which allows the respective cams 1242 to be rotated relative to hinge axle 300 using a wrench or other tool. Both cams 1242 are rotated to achieve the desired stow position and the cam clamp screws 1243 are retightened to secure the cams 1242, and hinge axle 300, in place.

Figure 51A:
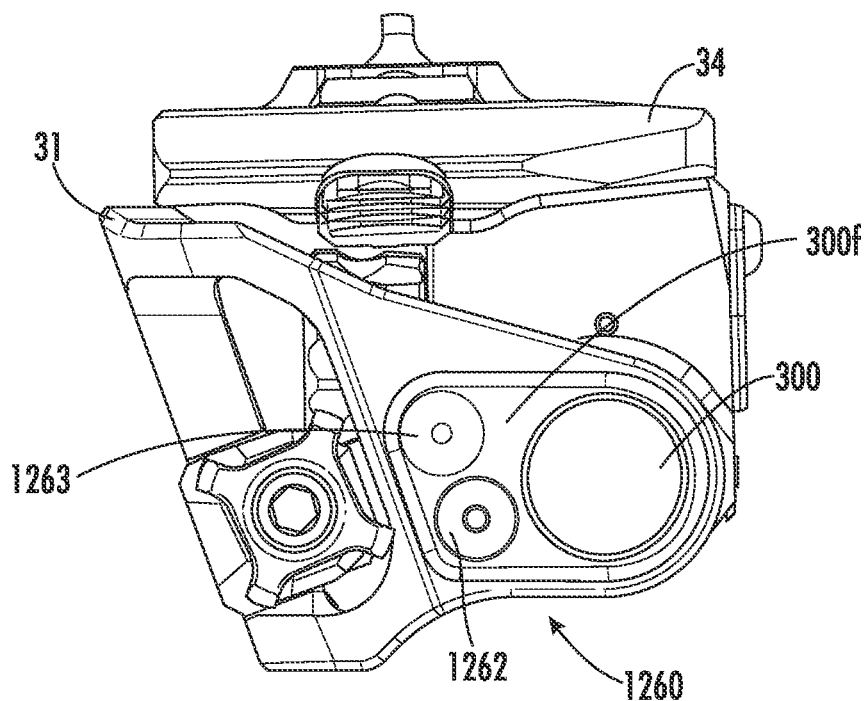
FIG. 51A and FIG. 51B are partial side views of another embodiment of a stow position sub-assembly which includes multiple screw holes that can be selectively used to rotationally change the position of the hinge axle relative to the gantry according to embodiments of the present invention.
Figure 51B:
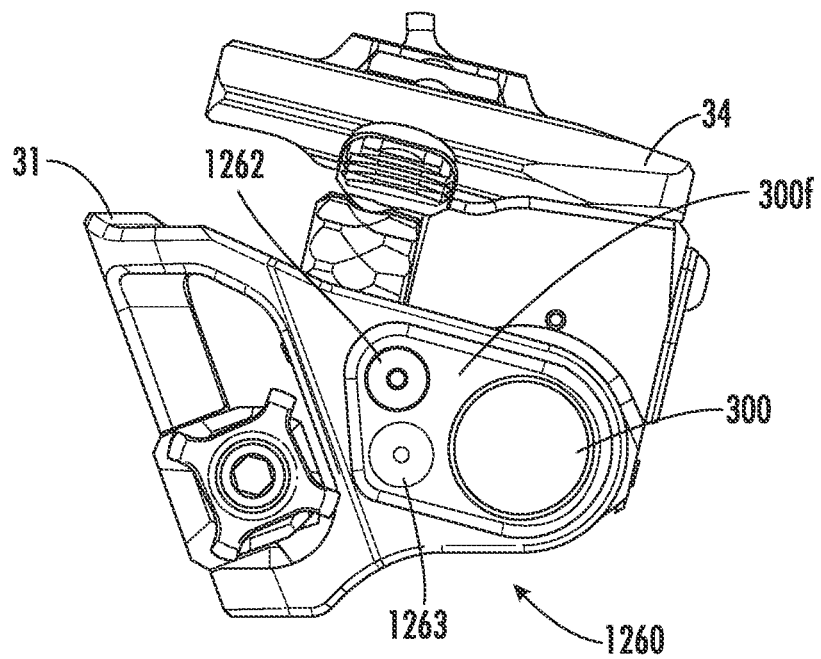
Figure 51C:
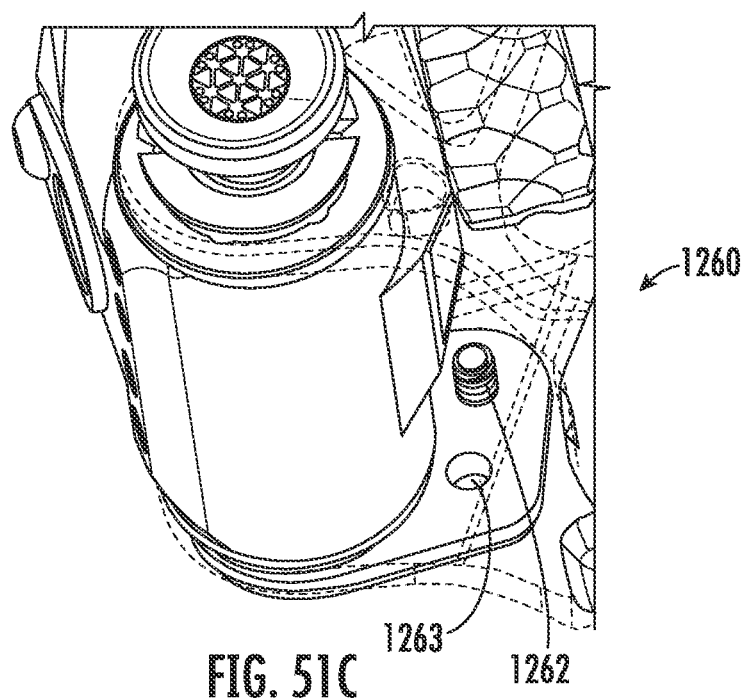
FIG. 51C and FIG. 51D are partially transparent perspective views of the stow position sub-assembly of FIG. 51A and FIG. 51B illustrating the screw hole locations.
Figure 51D:
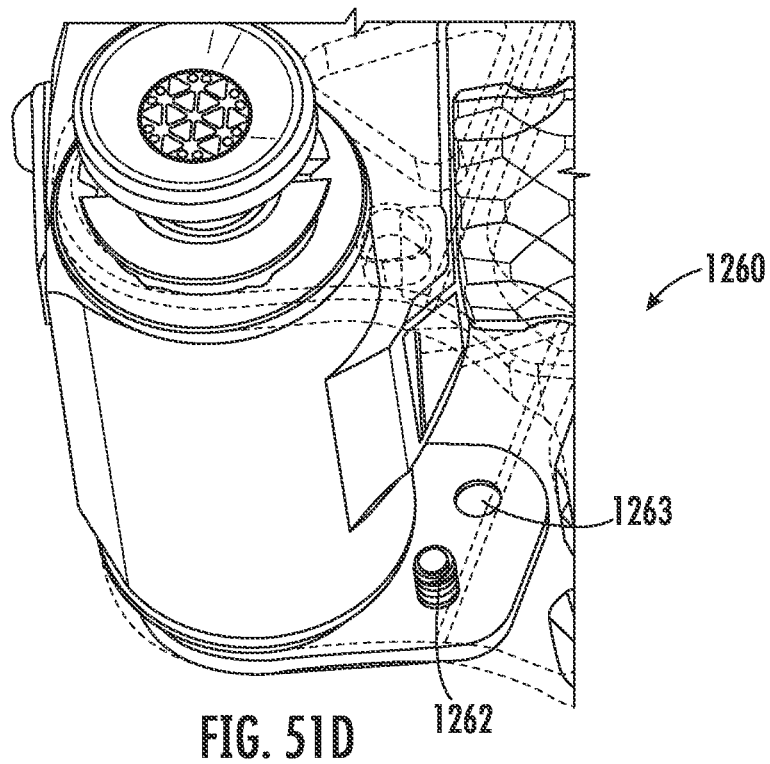

Referring to FIGS. 51A-51D, another embodiment of a selectable stow position sub-assembly 1260 according to embodiments of the present invention is illustrated. FIG. 51A illustrates a first stow position and FIG. 51B illustrates a second stow position. As shown in FIGS. 51A-51D, the sub-assembly 1260 includes a screw 1262 and screw holes 1263 that are used to rotationally change the position of the hinge axle 300 relative to the gantry 31. As shown in FIGS. 51A-51B, to change the position of the hinge axle 300 relative to the gantry 31, a user removes the hinge axle screw 1262 and rotates the hinge axle 300 to align a second set of holes 1263 in the gantry 31 and hinge axle 300. Once aligned, the hinge axle screw 1262 is reinstalled to secure the hinge axle 300 in place. FIGS. 51C-51D illustrate the exemplary locations of the screw holes 1263. It is noted that, in other embodiments, the sub-assembly 1260 may allow for more than two possible stow positions, and thus may further comprise one or more additional sets of screw holes 1263 in the gantry 31 corresponding to the additional stow positions.

Figure 52A:
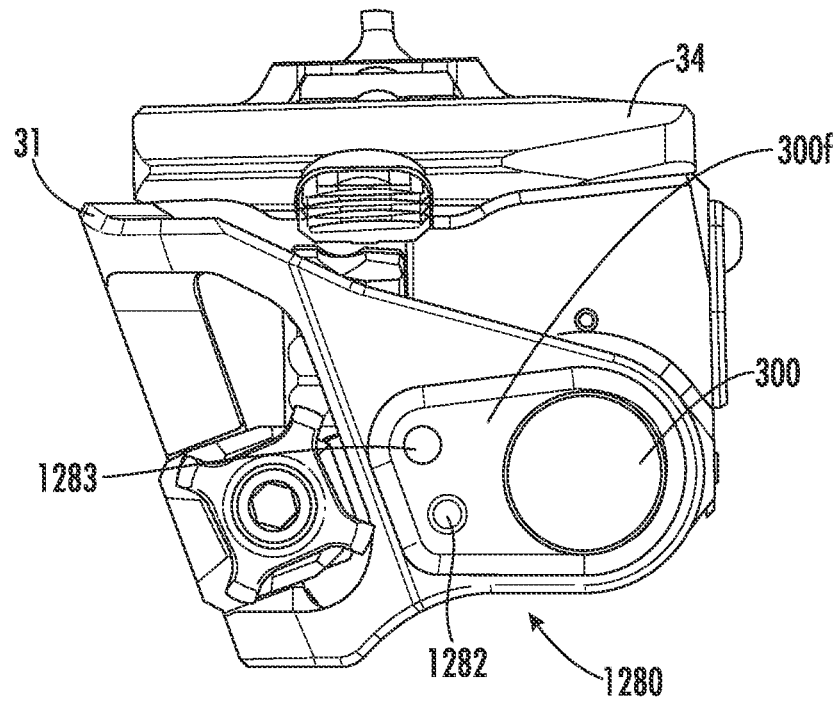
FIG. 52A and FIG. 52B are partial side views of another embodiment of a stow position sub-assembly which includes multiple pin holes to rotationally change the position of the hinge axle relative to the gantry according to embodiments of the present invention.
Figure 52B:
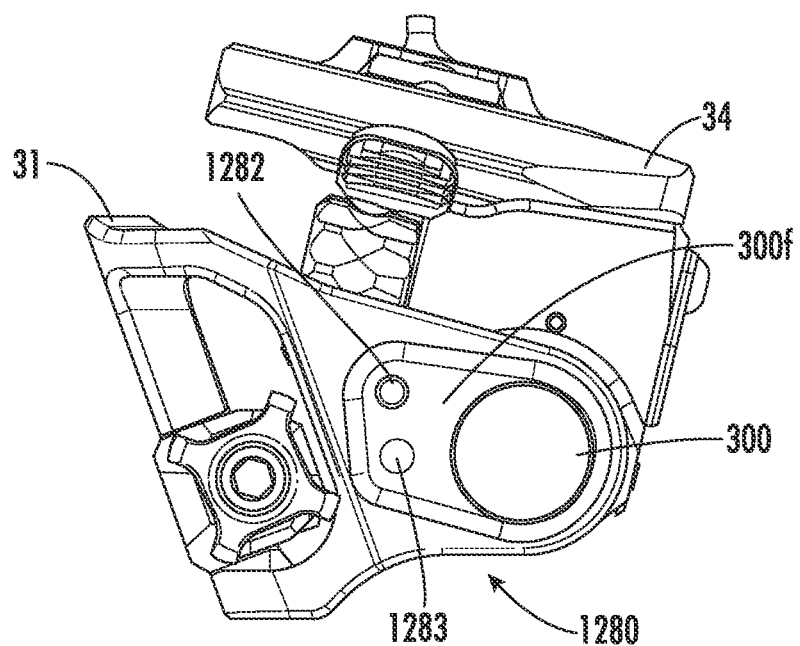
Figure 52C:
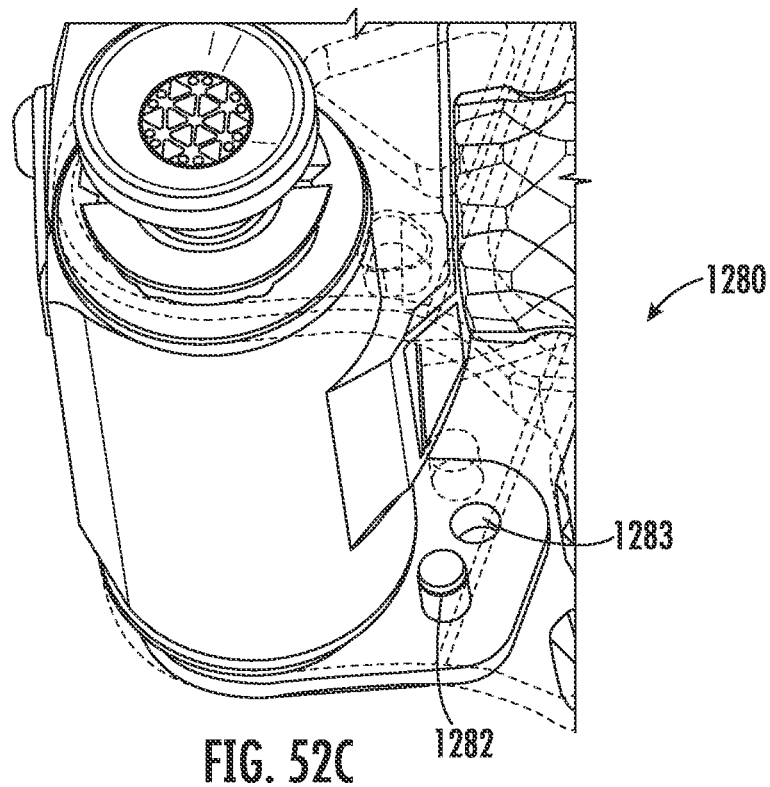
FIG. 52C and FIG. 52D are partially transparent perspective views of the stow position sub-assembly of FIG. 52A and FIG. 52B illustrating the pin hole locations.
Figure 52D:
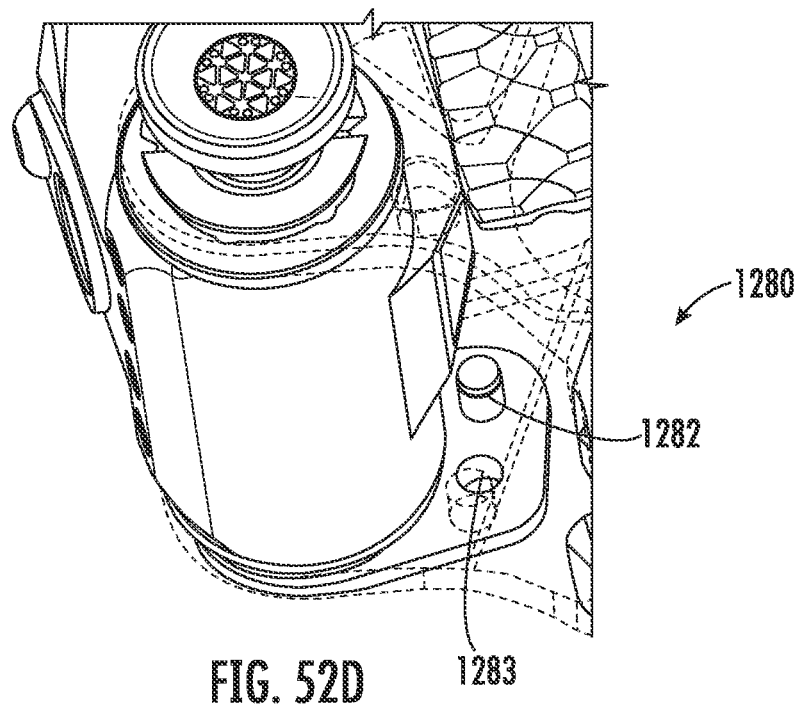

Referring to FIGS. 52A-52D, another embodiment of a selectable stow position sub-assembly 1280 according to embodiments of the present invention is illustrated. FIG. 52A illustrates a first stow position and FIG. 52B illustrates a second stow position. The sub-assembly 1280 is similar to the sub-assembly 1260 described herein except for the screws 1262 and screw holes 1263 of sub-assembly 1260 are replaced with a pin 1282 and pin holes 1283 that are used to rotationally change the position of the hinge axle 300 relative to the gantry 31. As shown in FIGS. 52A-52B, to select or change the position of the hinge axle 300 relative to the gantry 31, a user removes the hinge axle pin 1282 and rotates the hinge axle 300 to align a second set of holes 1283 in the gantry 31 and hinge axle 300. Once aligned, a hinge axle pin 1282 is installed to secure the hinge axle 300 in place. FIGS. 52C-52D illustrate exemplary locations of the pin holes 1283. It is noted that, in other embodiments, the sub-assembly 1280 may allow for more than two possible stow positions, and thus may further comprise one or more additional set of pin holes 1283 in the gantry 31 corresponding to the additional stow positions.

Figure 53A:
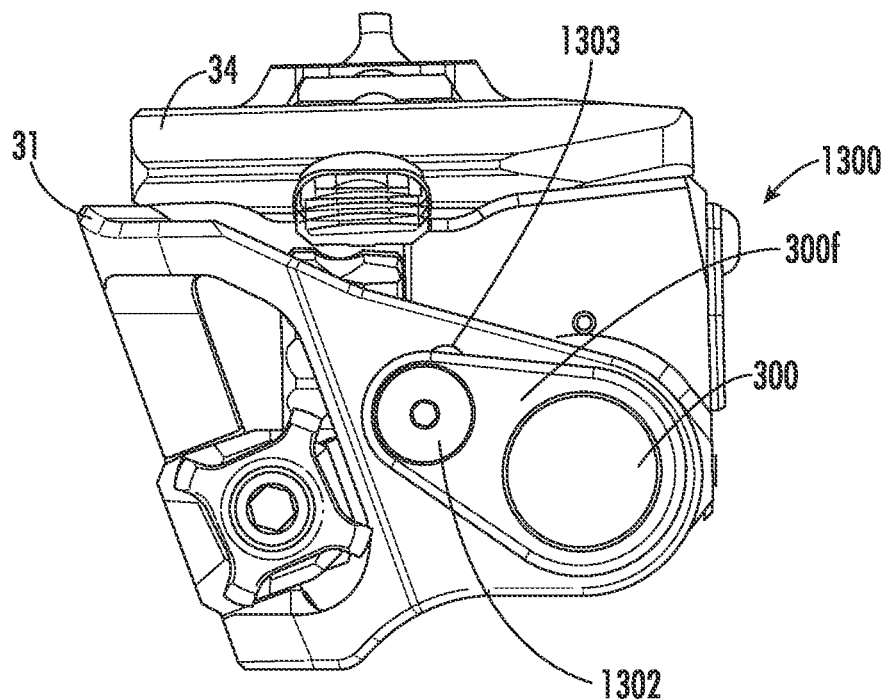
FIG. 53A and FIG. 53B are partial side views of another embodiment of a stow position sub-assembly which includes a member to rotationally change the position of the hinge axle relative to the gantry according to embodiments of the present invention.
Figure 53B:
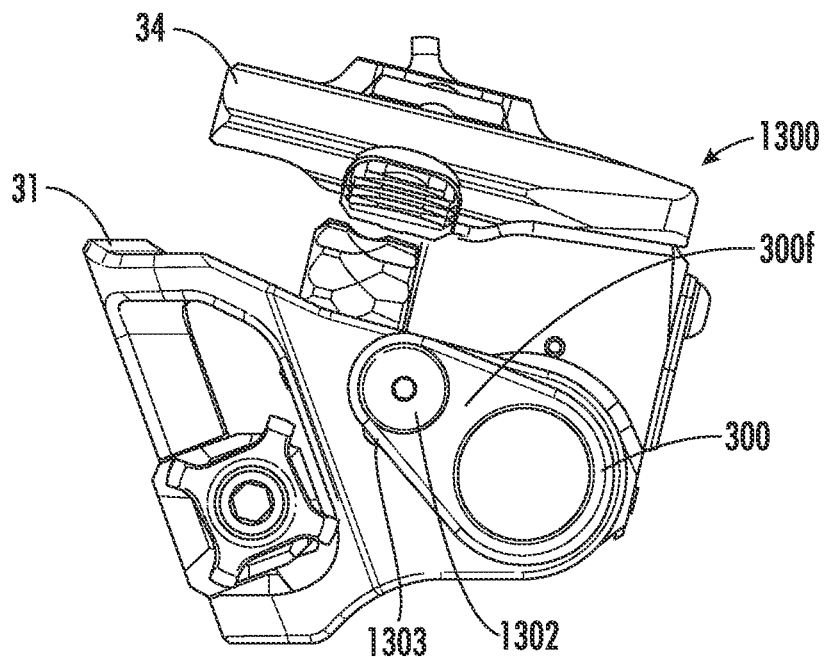
Figure 53C:
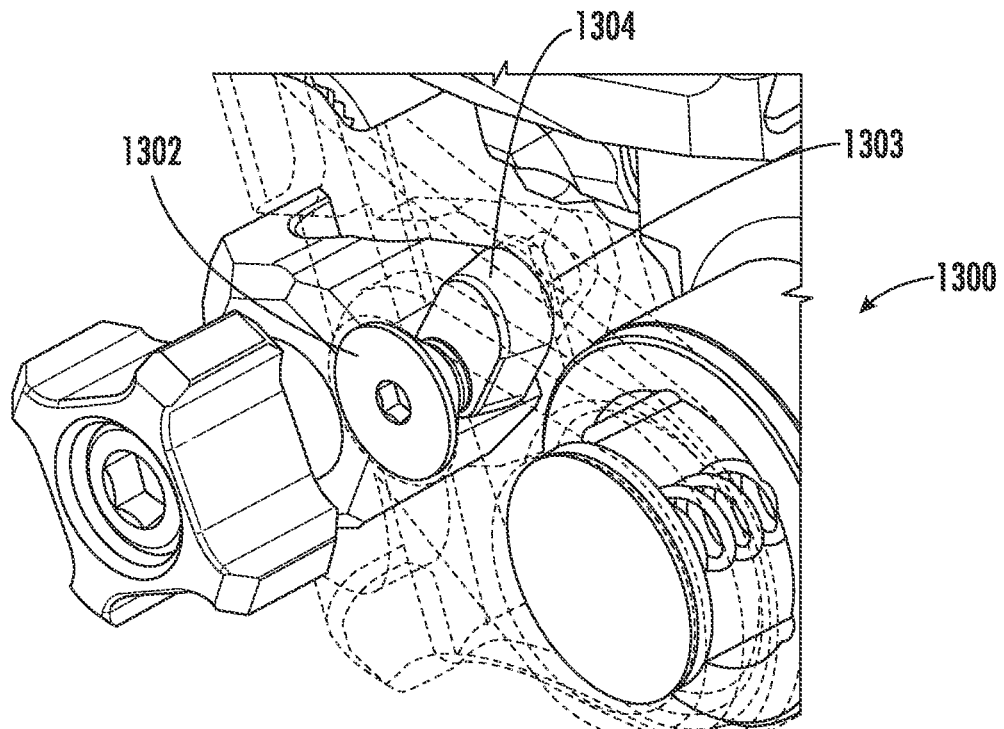
FIG. 53C and FIG. 53D are partially transparent perspective views of the stow position sub-assembly of FIG. 53A and FIG. 53B illustrating the function of the member according to embodiments of the present invention.
Figure 53D:
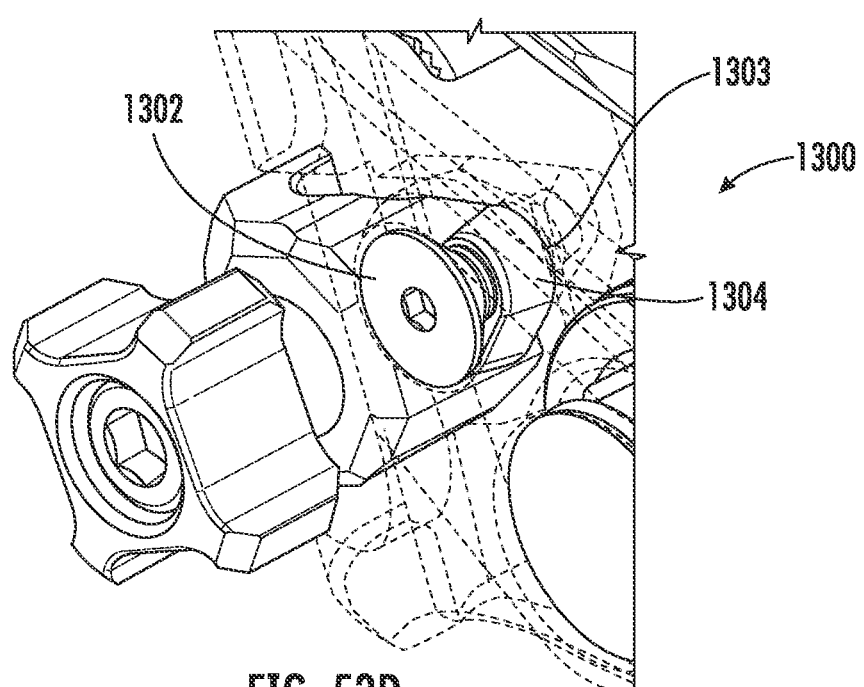
Figure 54:
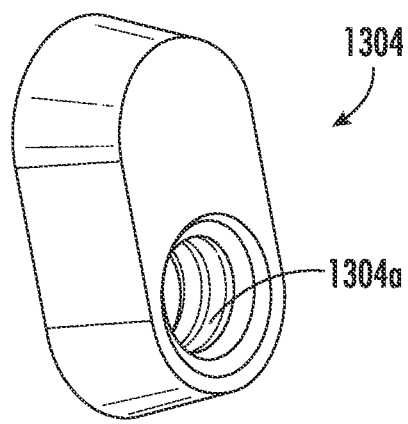
FIG. 54 is a perspective view of an exemplary tapered member according to embodiments of the present invention that may be used in the stow position sub-assembly of FIGS. 53A-53D.

Referring to FIGS. 53A-53D, another embodiment of a selectable stow position sub-assembly 1300 according to embodiments of the present invention is illustrated. FIG. 53A illustrates a first stow position and FIG. 53B illustrates a second stow position. As shown in FIGS. 53A-53D, the sub-assembly 1300 includes a shaped member 1304 which may be provided as a keyed member 1304 that is used to rotationally change the position of the hinge axle 300 relative to the gantry 31. An exemplary keyed member 1304 according to embodiments of the present invention is illustrated in FIG. 54. The keyed member 1304 has an outer perimeter shape that is configured to be secured in a first orientation within a corresponding aperture 1303 in the (arm 31*a* of) gantry 31. In some embodiments, the keyed member 1304 may be secured via a hinge axle screw 1302 received through a threaded aperture 1304*a* in the keyed member 1304 (see also FIG. 54). In some embodiments, the keyed member 1304 is tapered. The taper may help to absorb manufacturing tolerances and wear over time. In some embodiments, the keyed member 1304 may have a different shape than what is illustrated in FIG. 54. For example, the keyed member 1304 can be circular with an off-center aperture, or have another shape. As shown in FIGS. 53A-53D, to change the position of the hinge axle 300 relative to the gantry 31, a user first removes the hinge axle screw 1302 which allows the keyed member 1304 to be removed from its first orientation within the aperture 1303 in the gantry 31. The keyed member 1304 is then rotated to a second orientation (e.g., 180 degrees) and placed back into the aperture 1303. The hinge axle screw 1302 is then reinserted into the threaded aperture 1304a to secure the hinge axle 300 in place. In some embodiments, the first orientation of the keyed member 1304 within the aperture 1303 in the gantry 31 is the desired orientation, and therefore, no adjustment (i.e., rotation) of the keyed member is necessary.

Figure 63A:
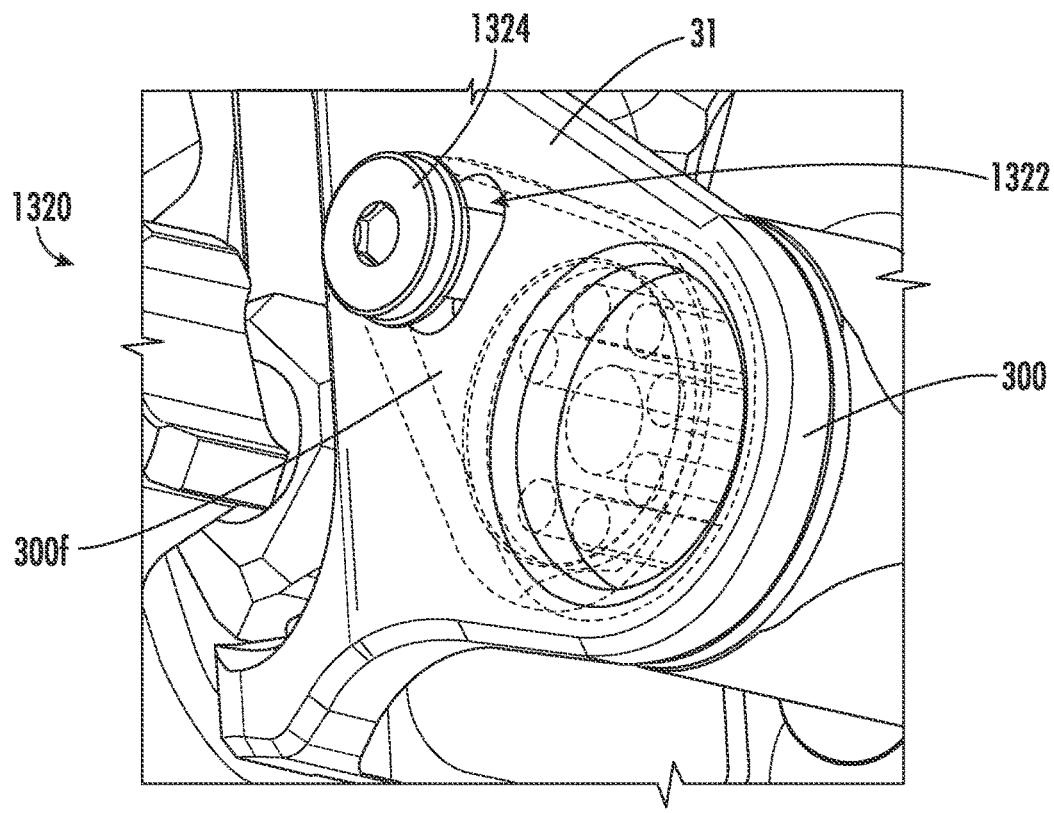
FIG. 63A is a partially transparent perspective views of another embodiment of a stow position sub-assembly which includes a slot and a shoulder bolt used to selectively change the position of the hinge axle relative to the gantry according to embodiments of the present invention.
Figure 63B:
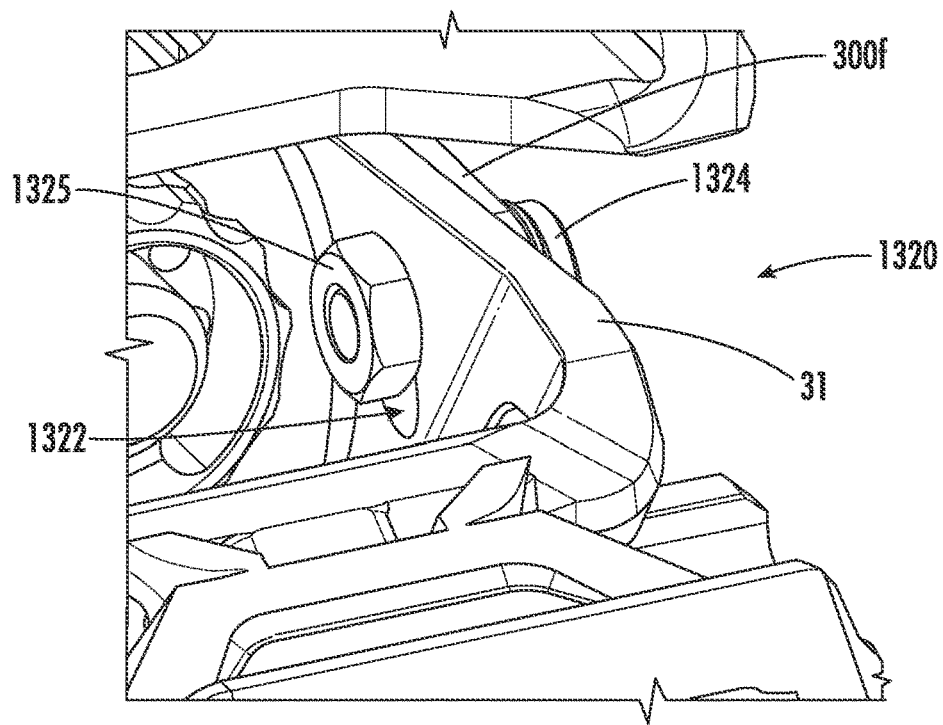
FIG. 63B is an opposing perspective view of the stow position sub-assembly of FIG. 63A illustrating the nut secured to the shoulder bolt on the inside of the gantry.
Figure 63C:
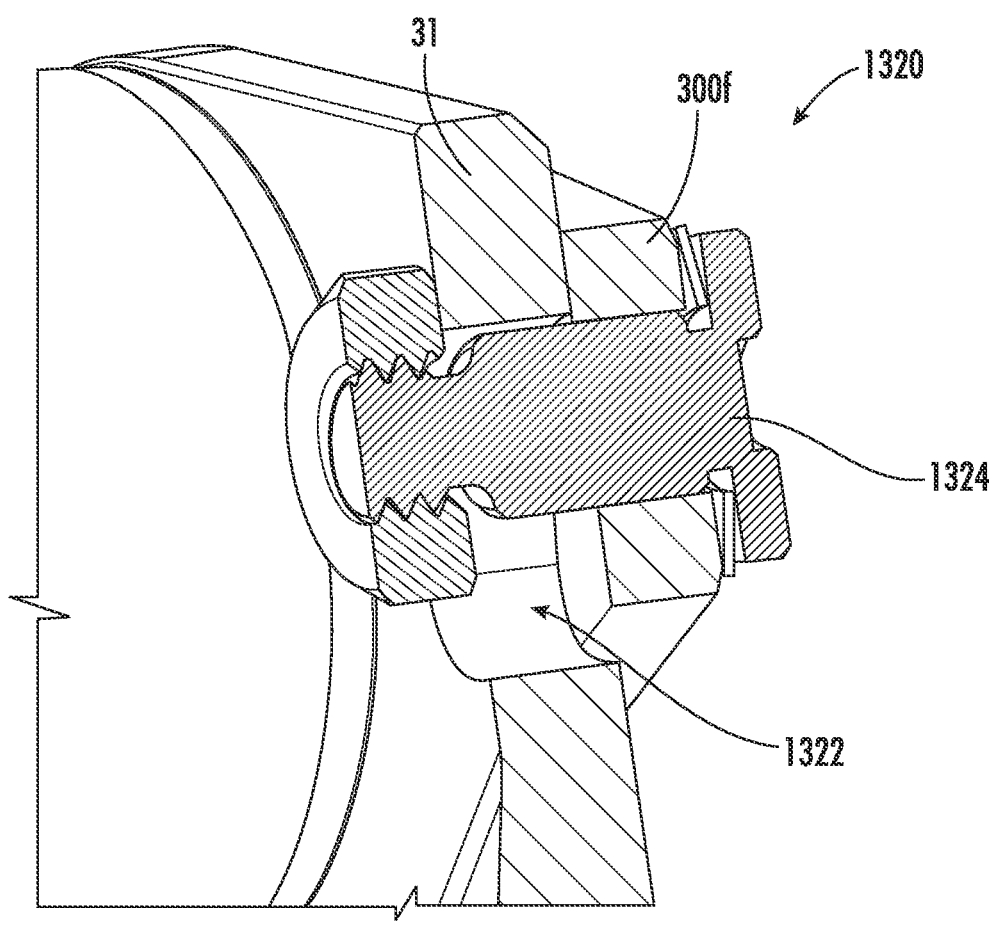
FIG. 63C is a partial section view of the stow position sub-assembly of FIG. 63A and FIG. 63B.

Referring to FIGS. 63A-63C, another embodiment of a selectable stow position sub-assembly 1320 according to embodiments of the present invention is illustrated. As shown in FIG. 63A, the sub-assembly 1320 includes a slot 1322 in the gantry 31 configured to receive a fastener 1324, e.g., a shoulder bolt as shown in FIGS. 63A-63C. The fastener 1324 is configured to slide within the slot 1322 as the hinge axle 300 rotates relative to the gantry 31. As shown in FIG. 63B, the fastener 1324 is tightened in a nut 1325 to clamp the hinge axle 300 and gantry 31 together. Alternatively, the slot 1322 may reside in the hinge axle 300. In some embodiments, the nut 1325 may be replaced by a threaded hole in the gantry 31 (e.g., if the slot is in the hinge axle 300) or the hinge axle 300 (e.g., if the slot is in the gantry 31).

Figure 55A:
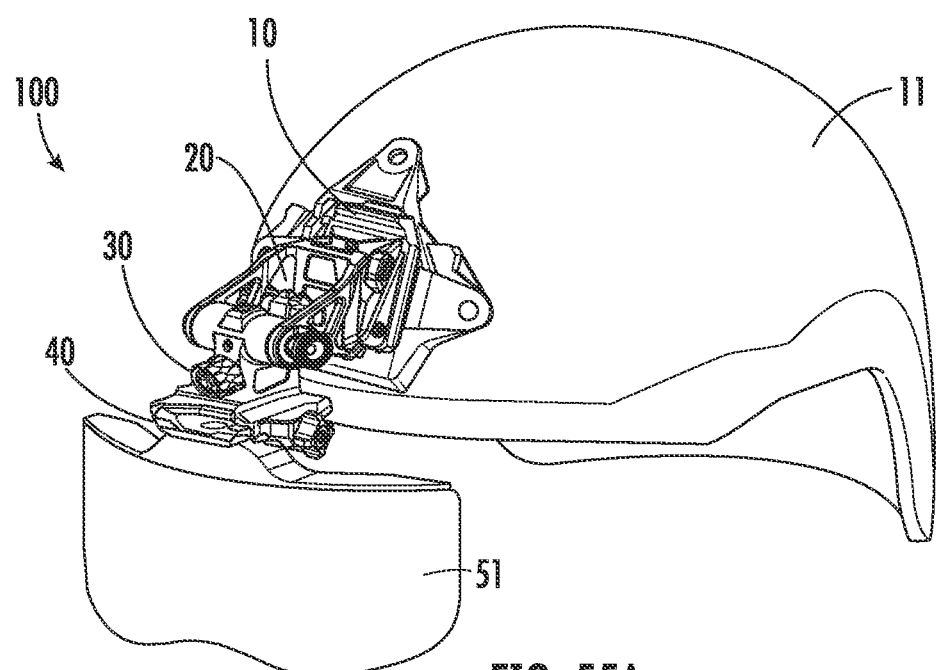
FIGS. 55A-55C illustrate examples of other vision systems that may be used with the mounting system according to embodiments of the present invention.
Figure 55B:
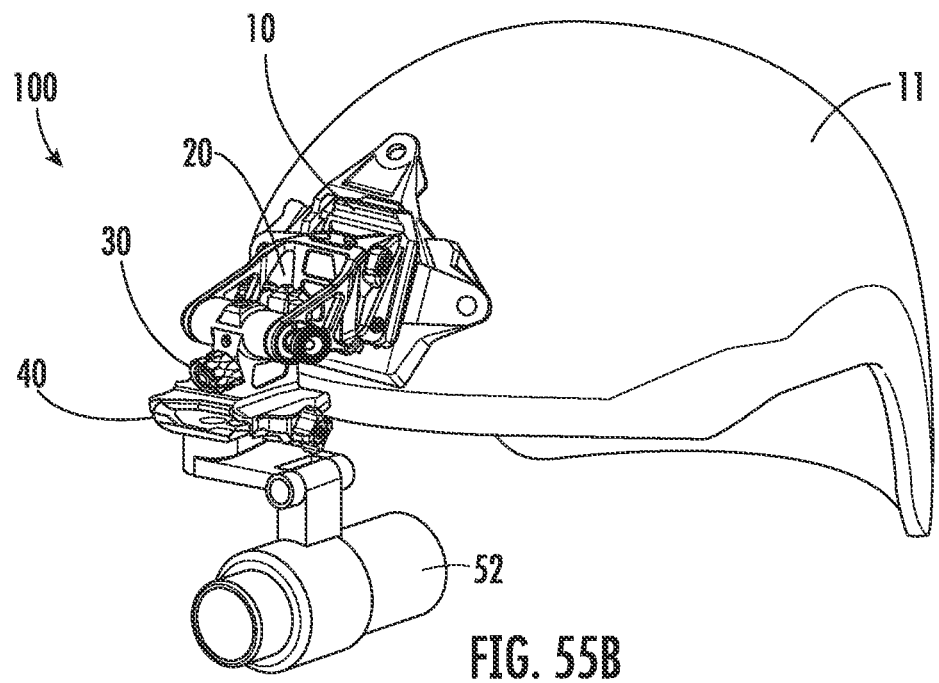
Figure 55C:
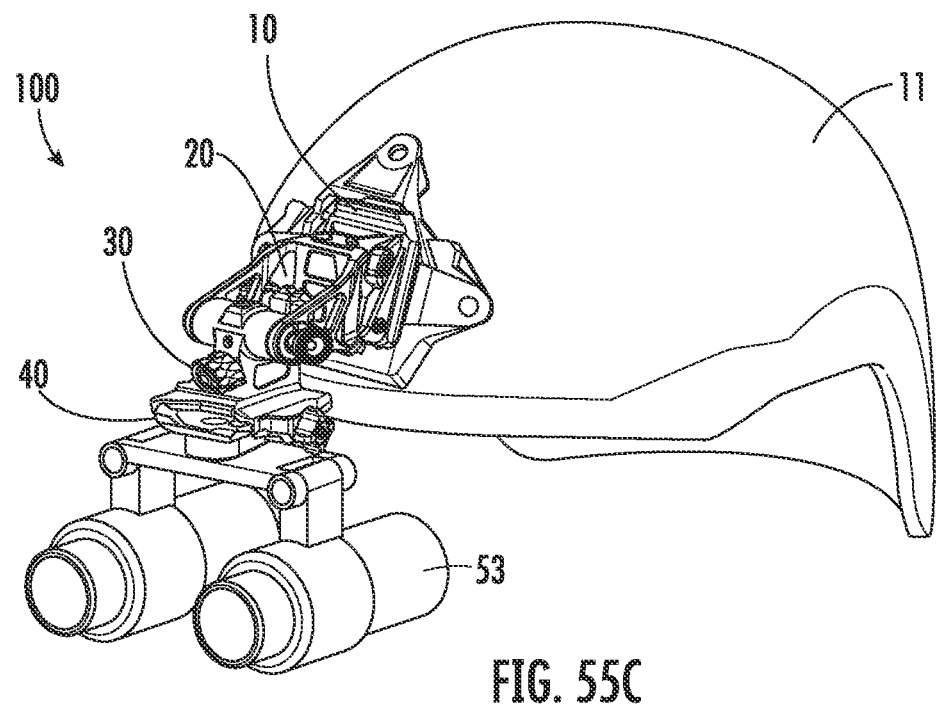

As described herein, the mounting system 100 of the present invention may configured to be used with a variety of different vision systems. FIGS. 55A-55C illustrate examples of other vision systems that may be used with the mounting system according to embodiments of the present invention. FIG. 55A illustrates the mounting system configured to function with a Heads-Up Display 51. FIG. 55B illustrates the mounting system configured to function with a monocular 52 that can be positioned in front of either eye. FIG. 55C illustrates the mounting system configured to function with a binocular 53.

Figure 56:
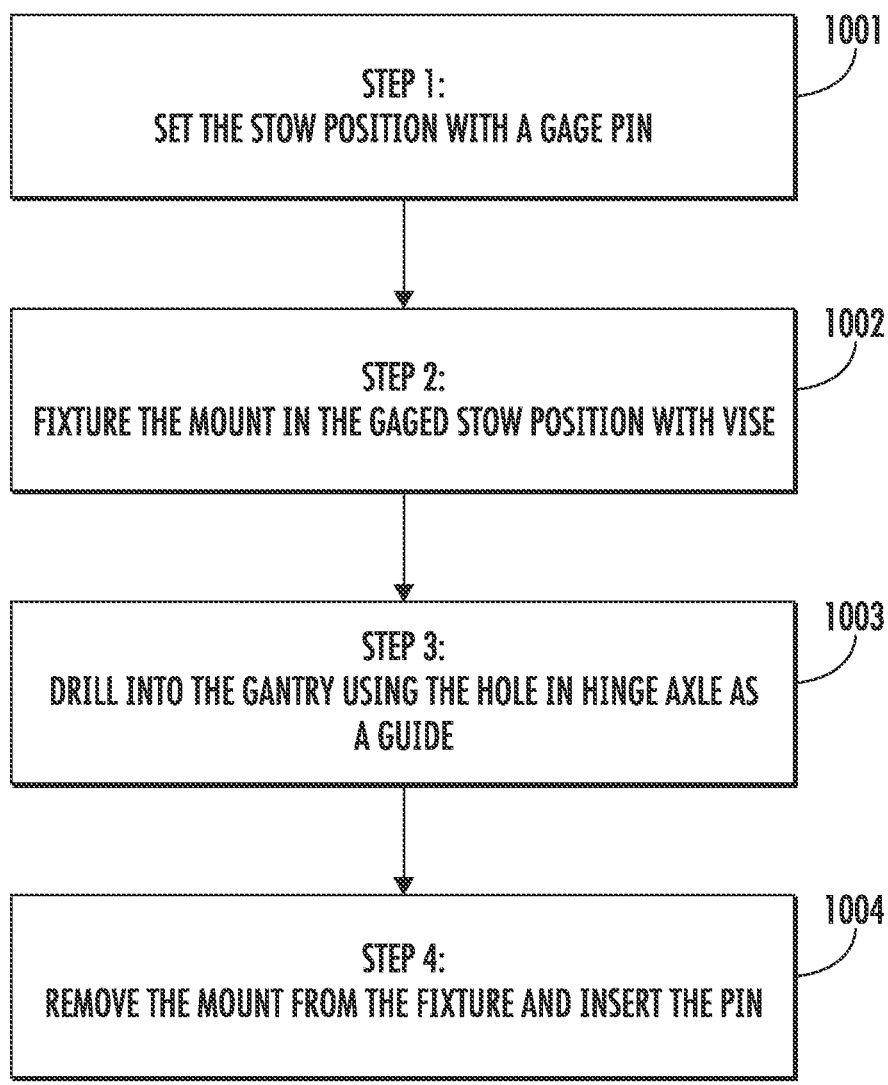
FIG. 56 is a flowchart of an exemplary method for setting the final optimized stow position after at least part of the mounting system has been assembled according to embodiments of the present invention.

Methods of assembling a vision mounting system to accommodate manufacturing tolerances of components thereof and provide a precise stow position are also provided herein. A flowchart for an exemplary method of assembly according to embodiments of the present invention is shown FIG. 56. FIGS. 57-62 illustrate exemplary actions/steps that can be used to carry out the method according to embodiments of the present invention. In some embodiments, the method of assembly includes providing a vision mounting system 100 as described herein comprising a gantry 31 and a carriage 34 with a hinge axle 300. The hinge axle 300 include a flange 300f. The carriage 34 is rotated relative to the gantry 31 into a preliminary stow position and a shim 1110 is placed between the carriage 34 and the gantry 31 to establish a precise/defined "final" stow position [Block 1001] (see also, FIGS. 58A-58B). This stow position may optionally, in some embodiments, be constant across a full range of motion of any tilt setting provided by the vision mounting system 100. The shim 1110 can be a gage pin, manufacturing jig, gage block, or the like. The gantry and carriage assembly 30 can be placed into an assembly vise 1115 with the carriage 34 rotated relative to the gantry 31 and the shim 1110 placed therebetween [Block 1002] (see also, FIG. 59). Placing the assembly 30 into a vise 1115 helps to prevent any movement during the next step of drilling into the assembly 30.

Optionally, a pilot hole 344a may be provided in the flange 300f of the hinge axle 300. The method may include using the pilot hole 344a in the flange 300f of the hinge axle 300 as a guide path, a fastener/fixation member hole 1005 is formed (e.g., drilled) into an arm 31a of the gantry 31 (e.g., using drill bit 1116) [Block 1003] (see also, FIG. 60). In other embodiments, the method may include forming a fastener/fixation member hole 1005 into both the arm 31a of the gantry 31 and the flange 300f of the hinge axle 300 (i.e., without using a pilot hole 344a in the flange 300f as a guide path).

Figure 57:
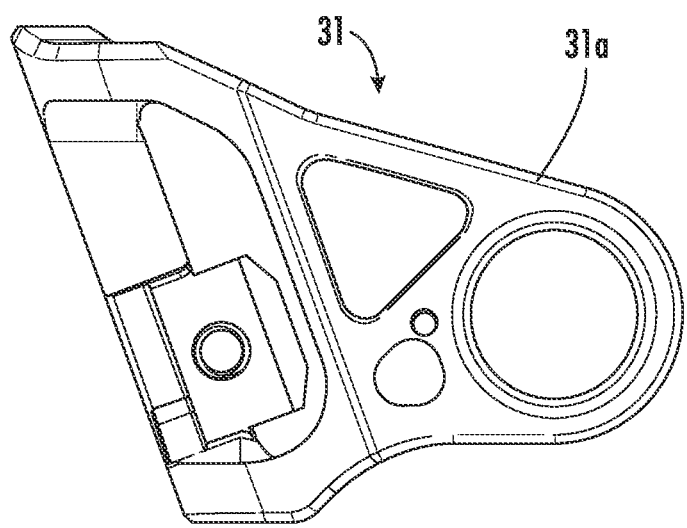
FIG. 57 is a side view of the gantry without a drilled fixation member hole according to embodiments of the present invention.
Figure 58A:
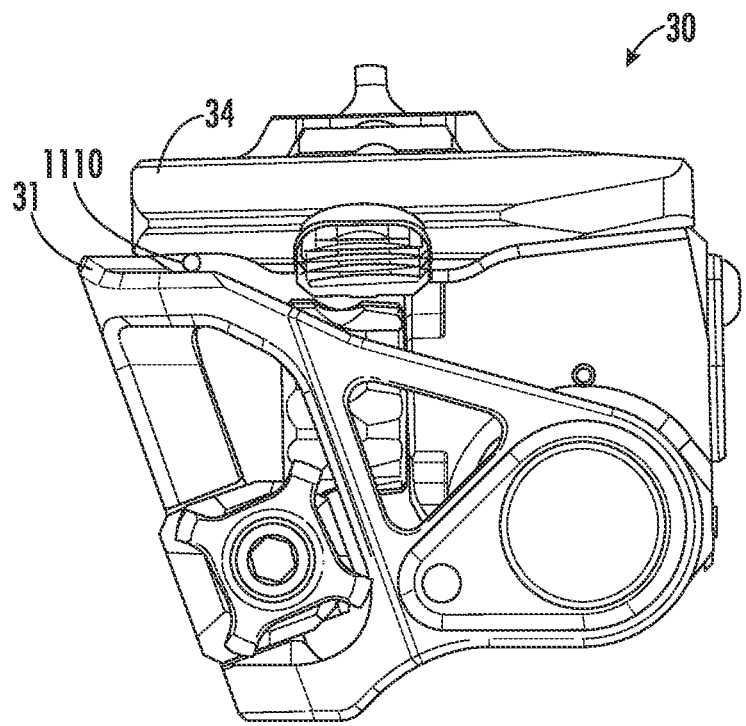
FIG. 58A and FIG. 58B are side and perspective views of the gantry and carriage assembly illustrating setting the stow position with a shim according to embodiments of the present invention.
Figure 58B:
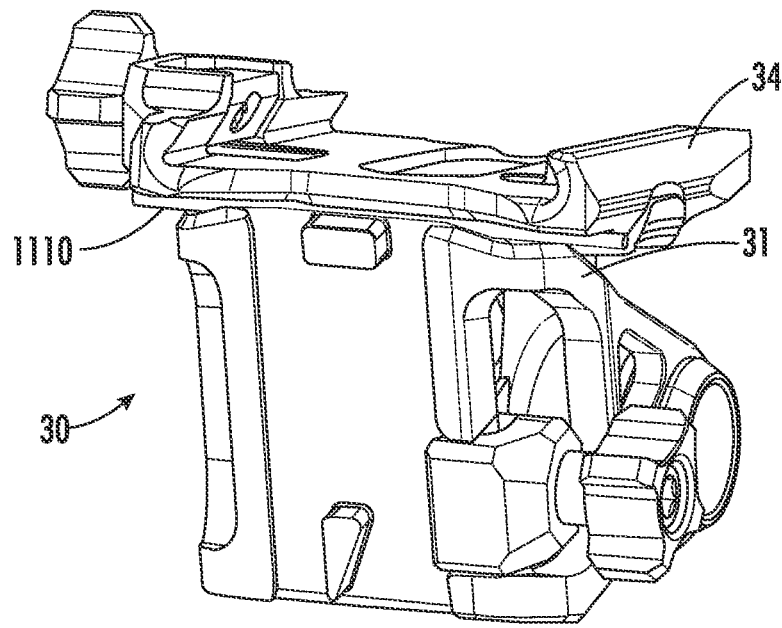
Figure 59:
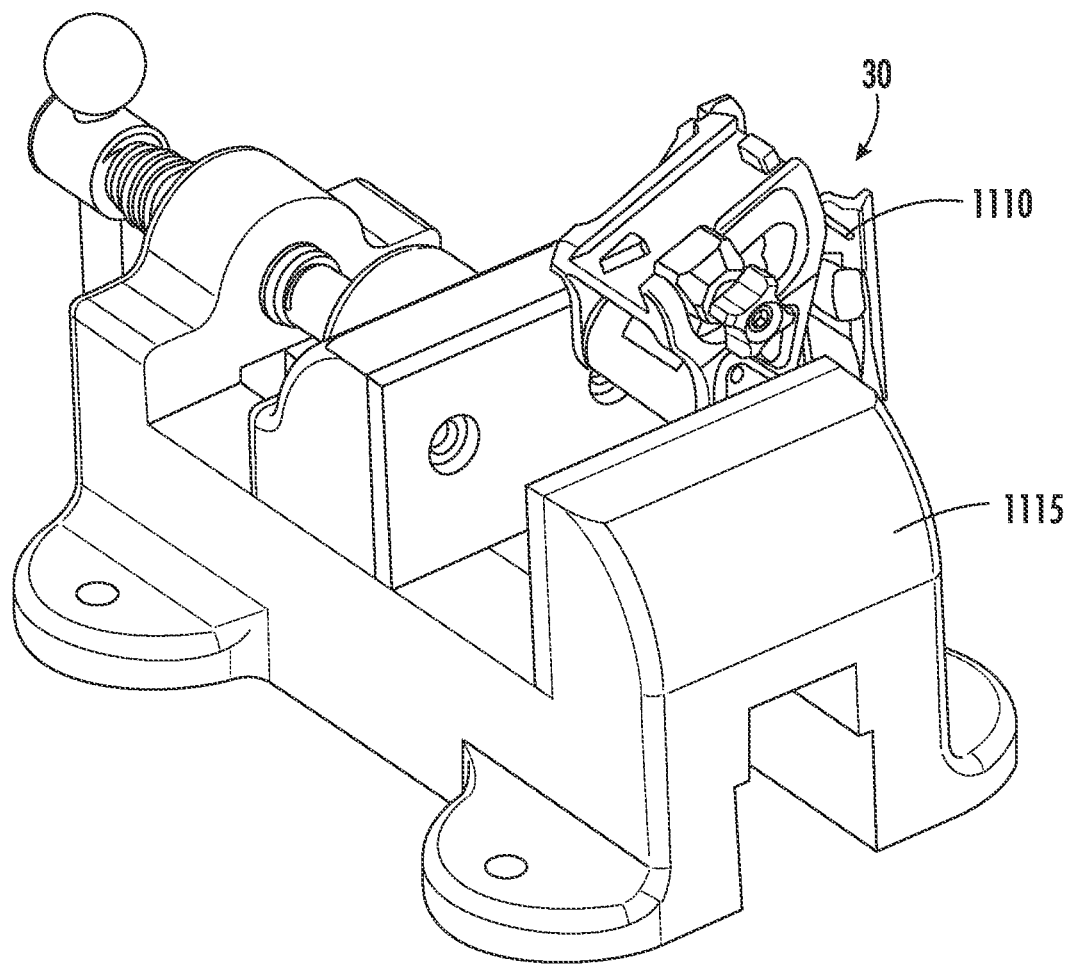
FIG. 59 is a perspective view of the gantry and carriage assembly of FIG. 58A and FIG. 58B fixed in a vise to prevent any movement during drilling of the fixation member hole according to embodiments of the present invention.
Figure 60:
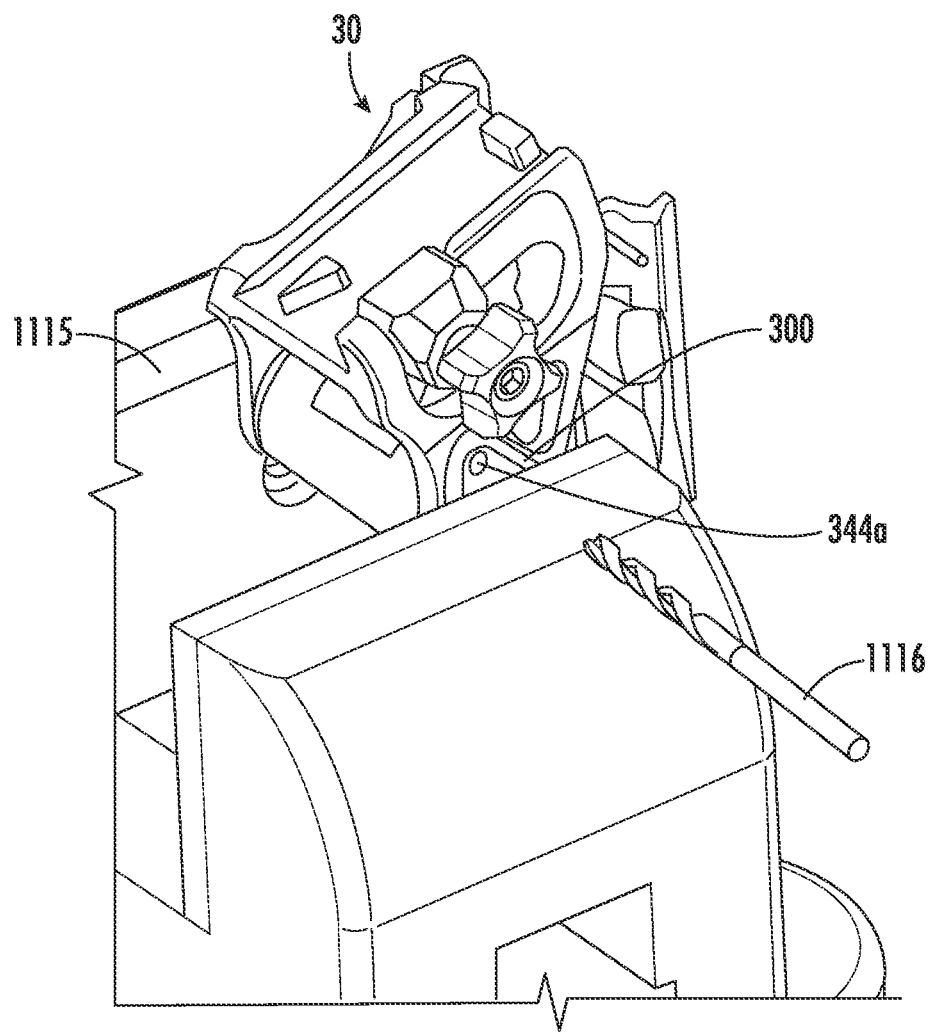
FIG. 60 is a perspective view of the gantry and carriage assembly fixed in the vise and using the hole in the hinge axle as a pilot hole to drill the fixation member hole in the gantry according to embodiments of the present invention.
Figure 61:
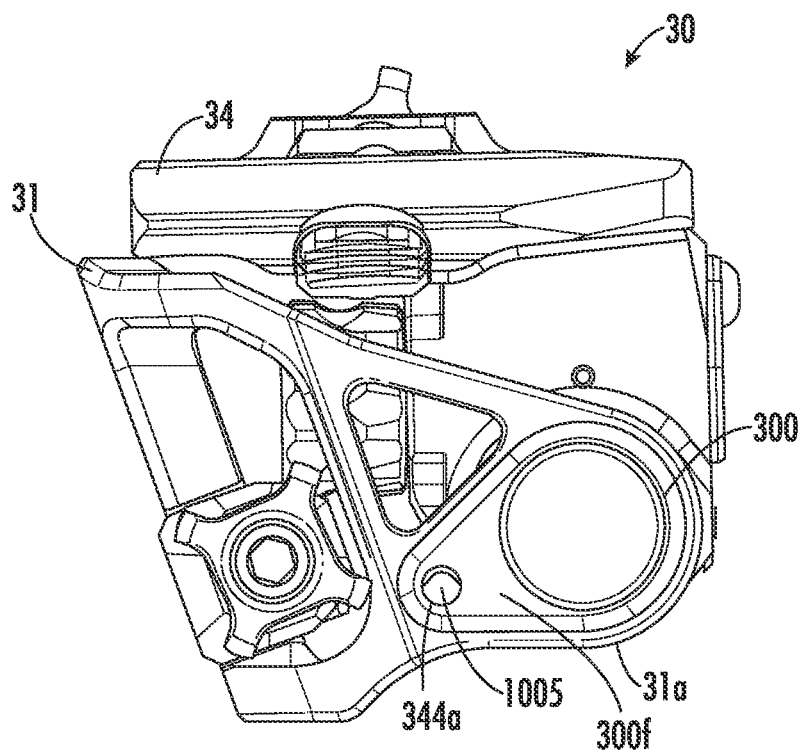
FIG. 61 is a side view of the gantry and carriage assembly after the fixation member hole has been drilled in the gantry according to embodiments of the present invention.

As a reference, FIG. 57 shows the gantry arm 31a without a formed/drilled hole 1005. After the hole 1005 is formed, the gantry and carriage assembly 30 can be removed from the vise 1115 (FIG. 61) and a fastener 344 is inserted through the pilot hole 344a (or formed hole) in the hinge axle 300 and into the fastener hole 1005 that has been formed at assembly into the arm 31a of the gantry 31 (FIG. 62). The shim 1110 may be removed from the gantry and carriage assembly 30 before, during or after the assembly 30 is removed from the vise 1115, thereby providing an assembly that accommodates manufacturing tolerances and provides a precise stow position, which can vary between different mounting vision systems [Block 1004]. In some embodiments, the step of rotating the carriage 34 relative to the gantry 31 into a stow position may be carried out with a floatable interlock member 341, 341', 341" in a stow detent 329 position.

Embodiments of the invention provide vision mounting systems 100 where the mount-helmet release is configured with part on the helmet and part on the goggle to eliminate the 2-in-1 assemblies of conventional systems which can reduce weight by separating the mount-helmet release mechanism into two parts with part (indirectly) on the helmet 11 and part (indirectly) on the goggle 50, using device releases 22, 39. As described herein, the mounting system 100 provides two release mechanisms: mount to helmet and device to mount. The vertical adjustment assembly 30v is part of the mounting system 100 to helmet 11 release mechanism and the fore/aft adjustment assembly 30f/a is part of the mounting system 100 to device (e.g., goggle) 50 release mechanism. Each of these assemblies (i.e., the vertical adjustment assembly 30v and the fore/aft adjustment assembly 30f/a) share one or more components within the vision mounting system 100. For example, the carriage 34 provides a fore/aft adjustment assembly 30f/a that is sized and configured to attach to a device mount plate 40 with the device goggle release 39. The gantry 31 cooperates with the shroud adapter 20 to provide the vertical adjustment assembly 30v comprising a knob 36 and is sized and configured to indirectly attach to a helmet 11 and provide the device helmet release 22.

Advantageously, embodiments of the present invention provide a torque reduction over conventional mounting systems and can reduce the mass while providing a rigid and reliable mounting system and which can provide a tilt agnostic stow position.

Some embodiments of the present invention have been illustrated herein by way of example. Many variations and modifications can be made to the embodiments without substantially departing from the principles of the present invention. All such variations and modifications are intended to be included herein within the scope of the present invention, as set forth in the following claims.

That which is claimed:

1. A vision mounting system comprising:
   a gantry;
   a carriage coupled to the gantry; and
   a selectable stow position sub-assembly coupled to one or both of the gantry and/or the carriage and configured to provide at least two different selectable stow positions of the vision mounting system to thereby provide a selectable stow position for a respective vision mounting system whereby the vision mounting system is configured to accommodate different configurations and/or types of vision systems,
   wherein the selectable stow position sub-assembly comprises a shaped aperture provided in one or both of the gantry and/or a hinge axle held by the carriage.

2. The vision mounting system of claim 1, wherein the selectable stow position sub-assembly further comprises a member that is configured to be held in the shaped aperture in either one of two or more different orientations to thereby provide at least first and second different stow positions as the at least two different stow positions depending on orientation of the member in the shaped aperture.

3. The vision mounting system of claim 1, wherein the shaped aperture is elongate in at least one dimension, and wherein the selectable stow position sub-assembly further comprises a fastener that is configured to be held in the shaped aperture in different lateral and/or longitudinal positions relative to the shaped aperture to thereby provide first and second different stow positions as the at least two different stow positions depending on a position of the fastener in the shaped aperture.

4. The vision mounting system of claim 3, wherein the fastener is configured to frictionally engage the shaped aperture to lock against the gantry and a flange of the hinge axle.

5. The vision mounting system of claim 1, wherein the shaped aperture is elongate in at least one dimension and/or has at least one dimension that is greater than a diameter of a fastener held therein.

6. The vision mounting system of claim 5, wherein the shaped aperture is held by an arm of the gantry or a flange of the hinge axle, wherein the fastener has a head and an end portion, and wherein the head faces inward from the aperture in the gantry and the end portion faces outward from the flange.

7. The vision mounting system of claim 1, wherein a hinge axle is held by the carriage, wherein the selectable stow position sub-assembly comprises at least one cam held by or defined by a flange of the hinge axle and/or an arm of the gantry whereby the at least one cam is configured to rotationally change a position of the hinge axle relative to the gantry to provide the at least two different stow positions for the selectable stow position.

8. The vision mounting system of claim 1, wherein the selectable stow position sub-assembly comprises at least first and second apertures extending through a flange of a hinge axle held by the carriage, with the flange coupled to an arm of the gantry, wherein a fixation member extends through only the first aperture to define a first stow position and the fixation member extends only through the second aperture to define a second stow position as the selectable stow position.

9. The vision mounting system of claim 1, wherein the selectable stow position sub-assembly comprises a plurality of circumferentially spaced apart apertures in a sleeve extending in the carriage, and wherein the sleeve is rotatable in the carriage and lockable in position therein in a desired orientation thereby providing different stow detent positions corresponding to one of the circumferentially spaced apart apertures to provide the at least two different stow positions.

10. The vision mounting system of claim 1, wherein the selectable stow position sub-assembly comprises a plurality of spaced apart apertures in a sleeve extending in the carriage, and wherein the carriage is positionally rotatable relative to the gantry then fixed in position using a subset of the spaced apart apertures to provide the at least two different stow positions.

11. A vision mounting system, comprising:
    a carriage;
    a gantry coupled to the carriage, wherein the carriage and gantry cooperate to provide an adjustable stow position that is fixed across a full tilt range of motion provided by the vision mounting system to thereby provide an adjustable stow position that is tilt agnostic and adjustable for different vision systems;
    a hinge axle in the carriage, wherein the carriage is rotatably coupled to the gantry to move between stow and deployed positions; and
    a floatable interlock member coupled to the hinge axle and configured to move radially between locked and unlocked positions to thereby lock the carriage in respective stow and the deployed positions and to release the carriage to rotate between the stow and deployed positions,
    wherein the floatable interlock member is configured to access a single one of at least two different selectable stow detents to provide the stow position to thereby optimize stow position for different vision systems.

* * * * *

UNITED STATES PATENT AND TRADEMARK OFFICE
CERTIFICATE OF CORRECTION

| | | |
|---|---|---|
| PATENT NO. | : 12,253,665 B2 | Page 1 of 1 |
| APPLICATION NO. | : 18/691133 | |
| DATED | : March 18, 2025 | |
| INVENTOR(S) | : Friedman et al. | |

It is certified that error appears in the above-identified patent and that said Letters Patent is hereby corrected as shown below:

In the Specification

Column 16, Line 33: Please correct "341" to read --34I--

Signed and Sealed this
Eleventh Day of November, 2025

John A. Squires
*Director of the United States Patent and Trademark Office*